March 20, 1934.  W. J. PRICE ET AL  1,951,371
APPARATUS FOR MANUFACTURING MATCH BOOKS
Filed Oct. 21, 1929   31 Sheets-Sheet 1
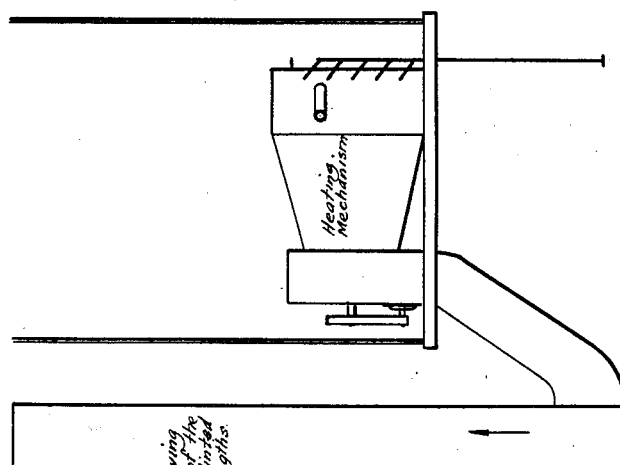
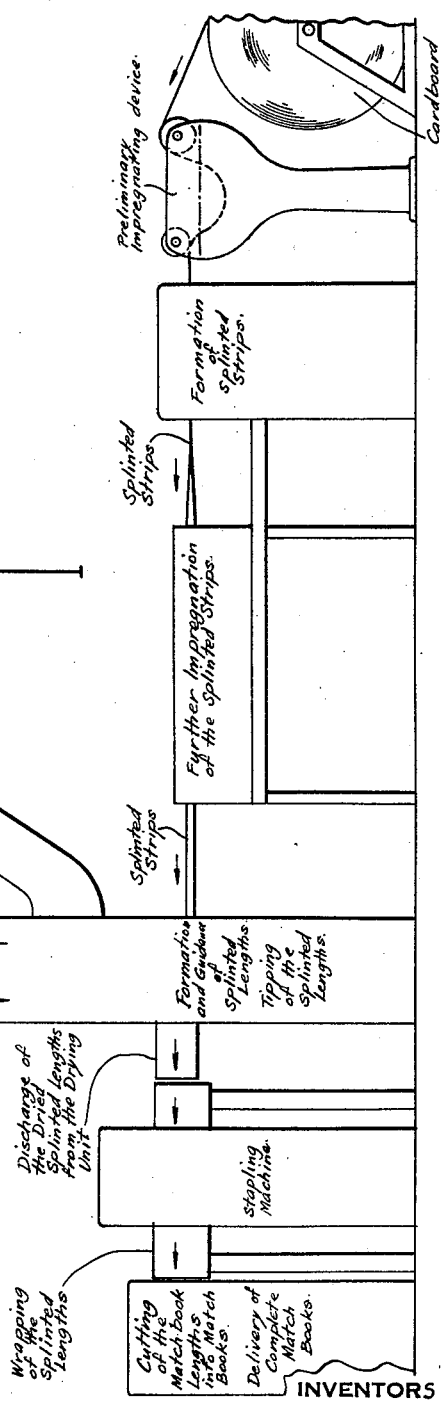
INVENTORS
W. JOHN PRICE,
BY WILLIAM ANSCOTT,
ATTORNEY March 20, 1934. W. J. PRICE ET AL 1,951,371
APPARATUS FOR MANUFACTURING MATCH BOOKS
Filed Oct. 21, 1929 31 Sheets-Sheet 2
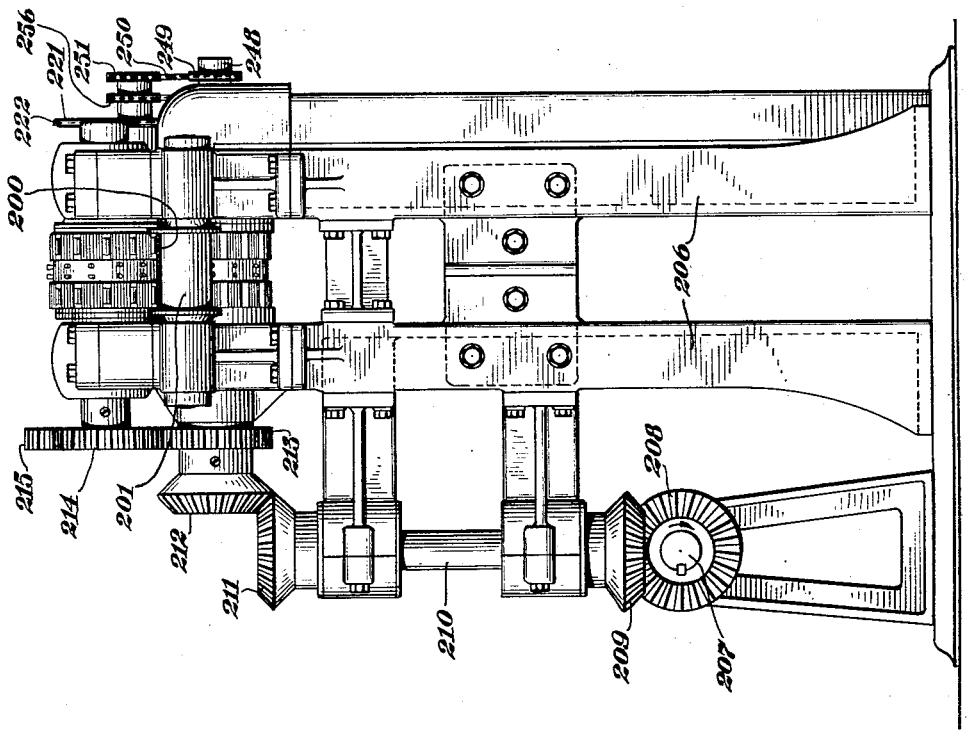
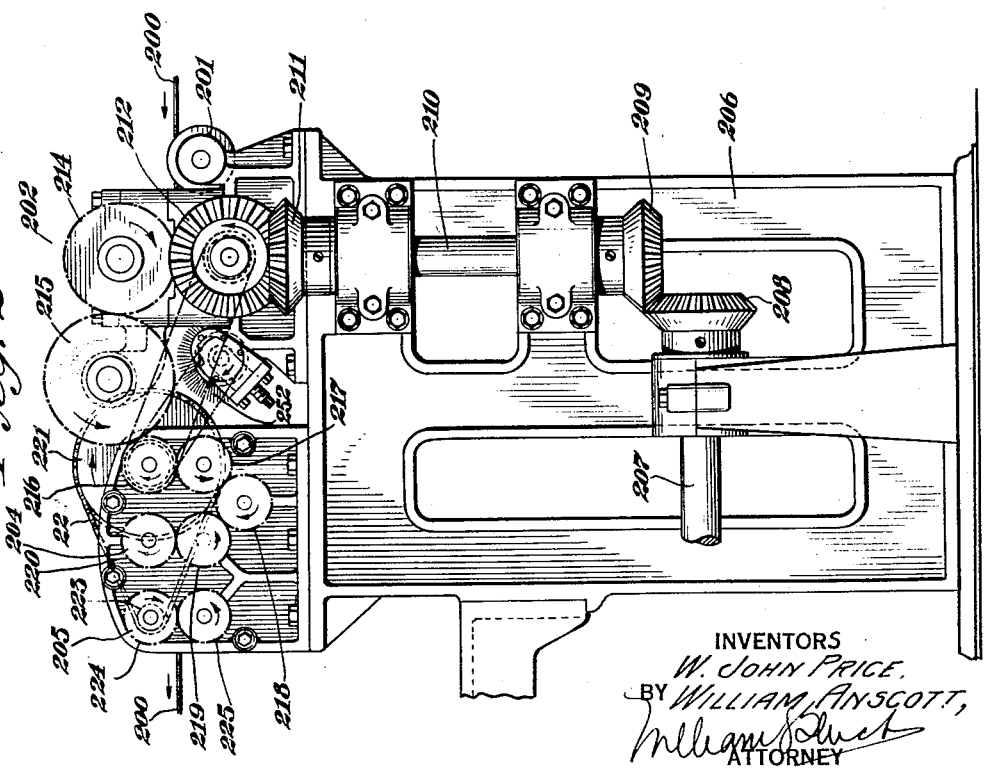
INVENTORS
W. JOHN PRICE.
BY WILLIAM ANSCOTT,
ATTORNEY

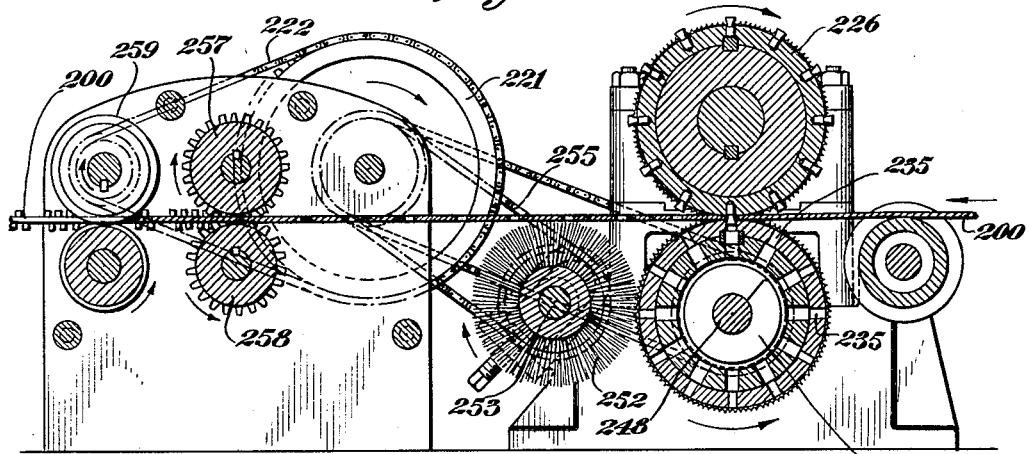
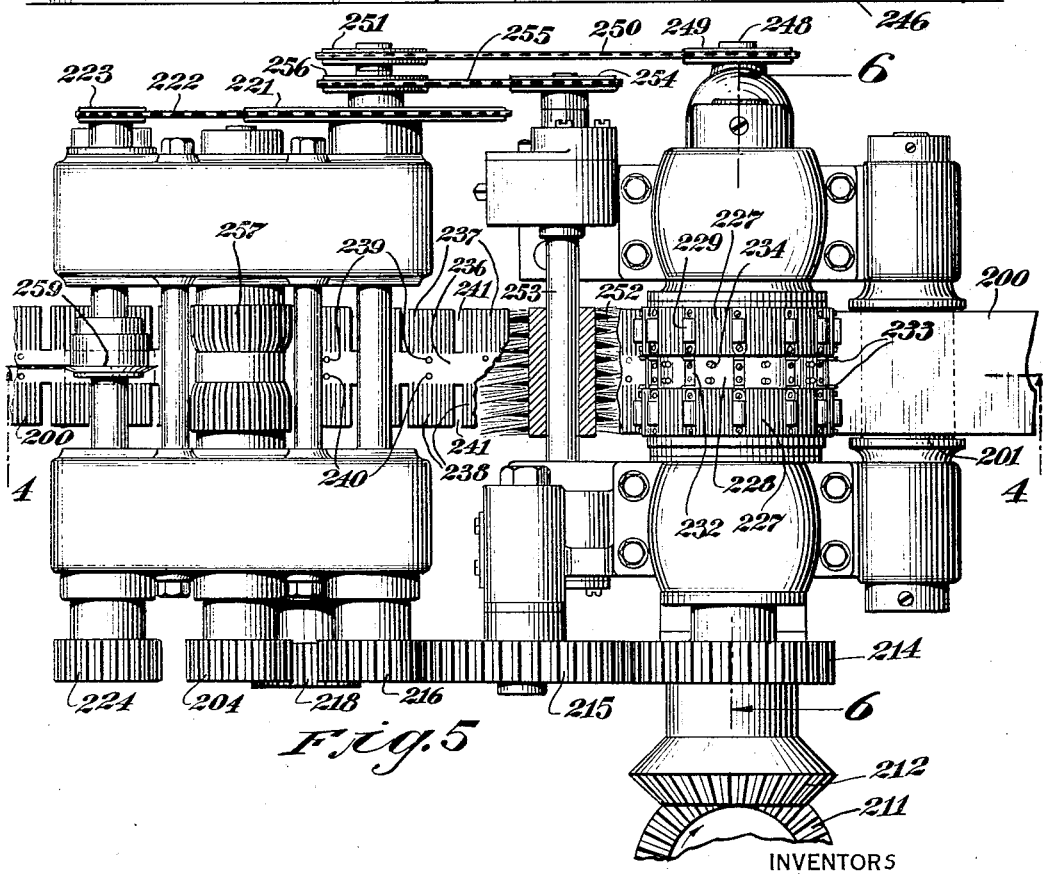

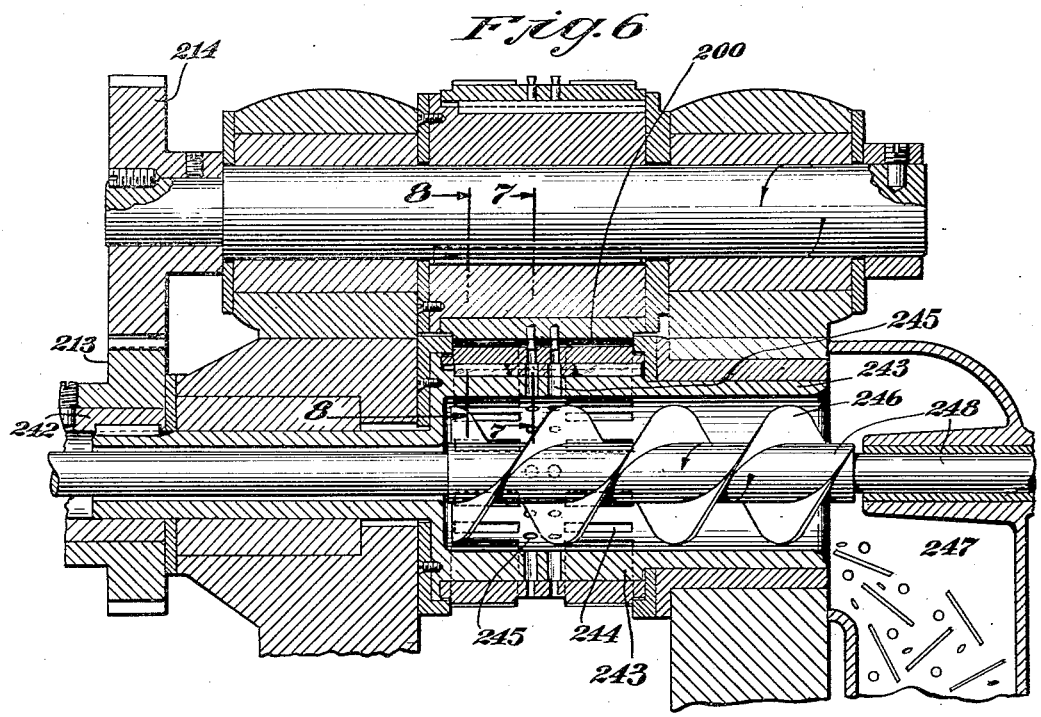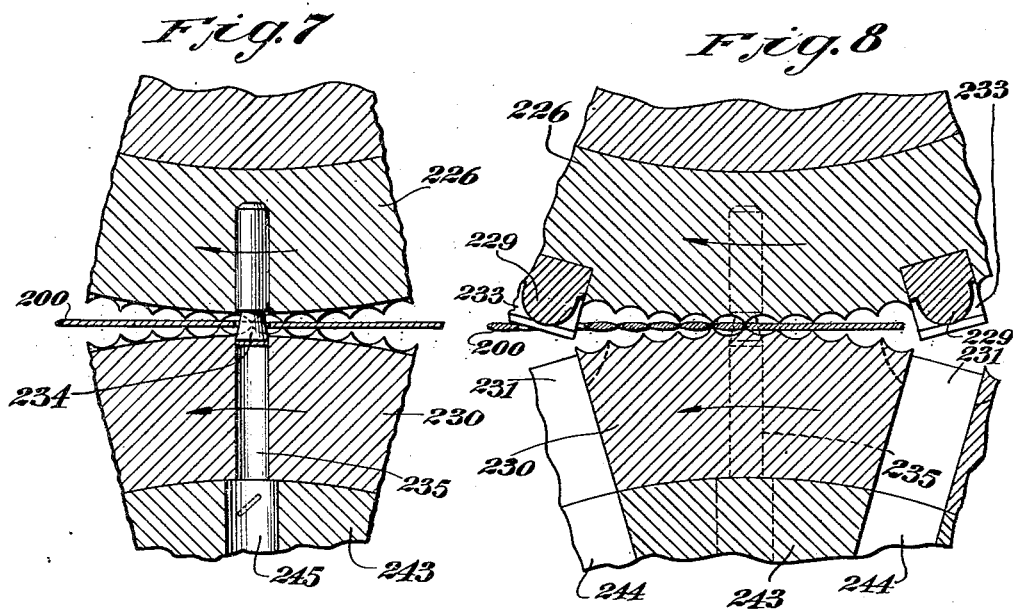

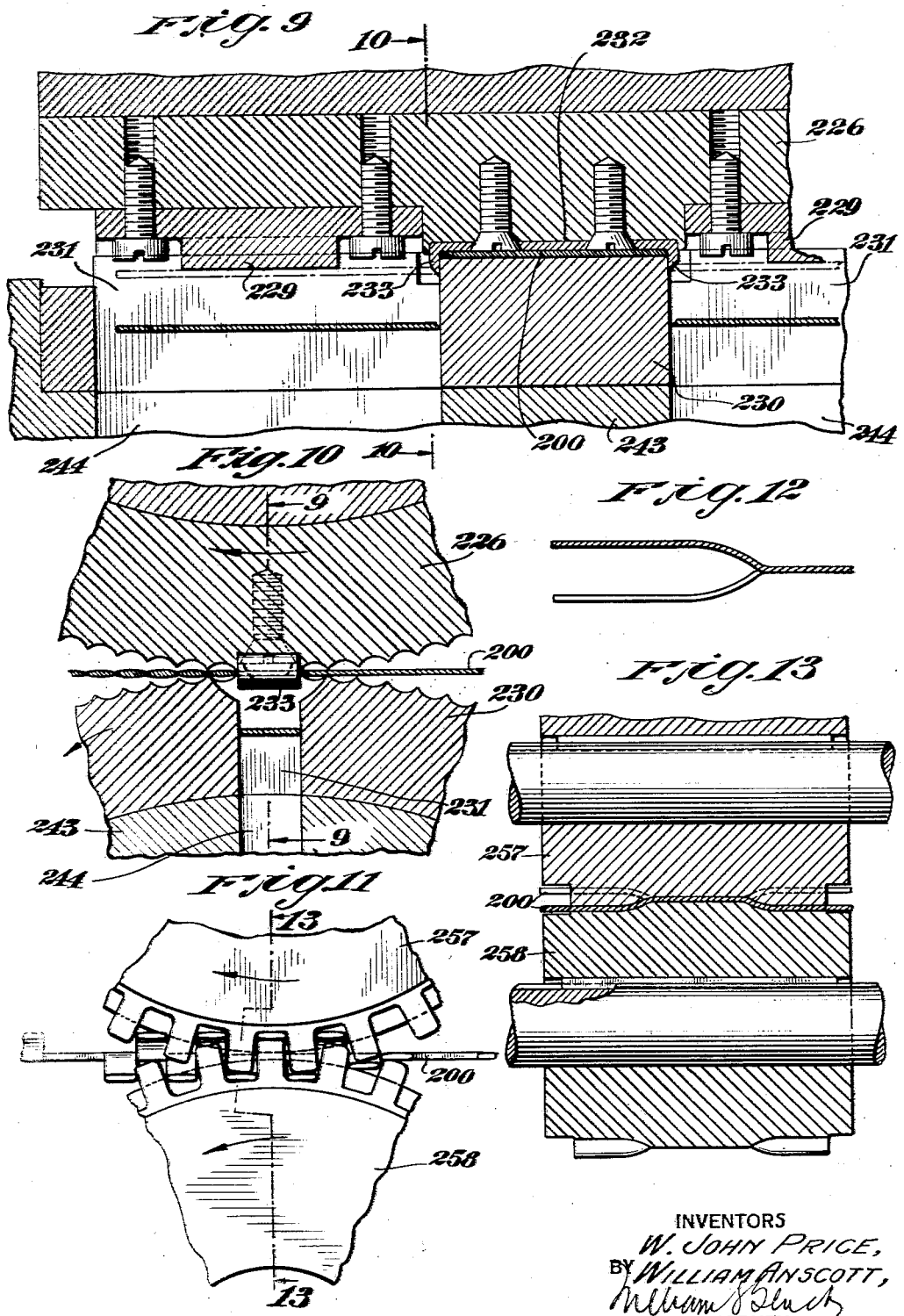

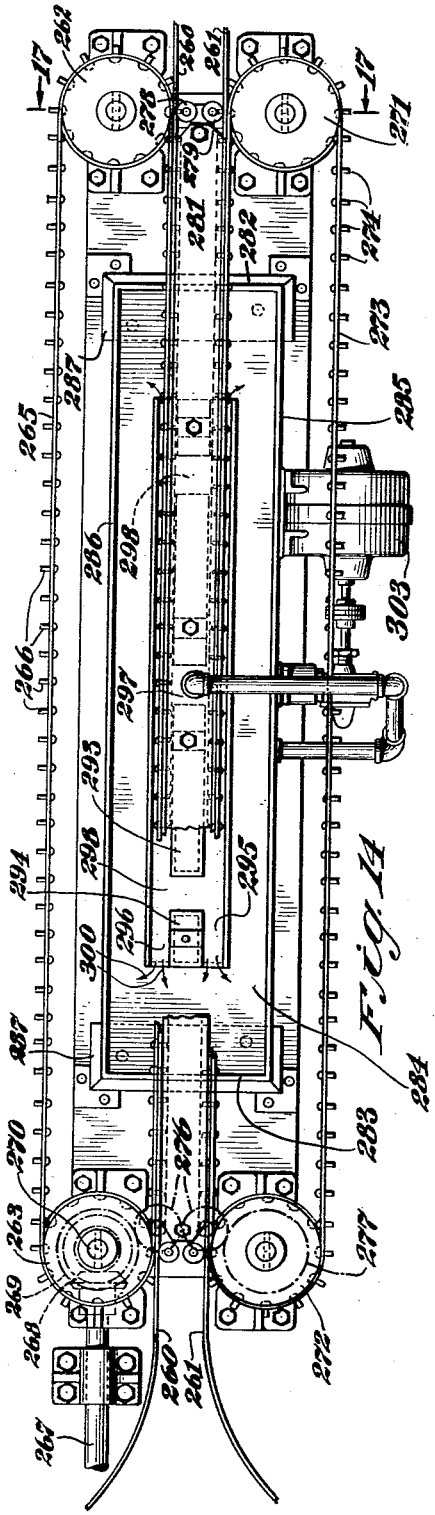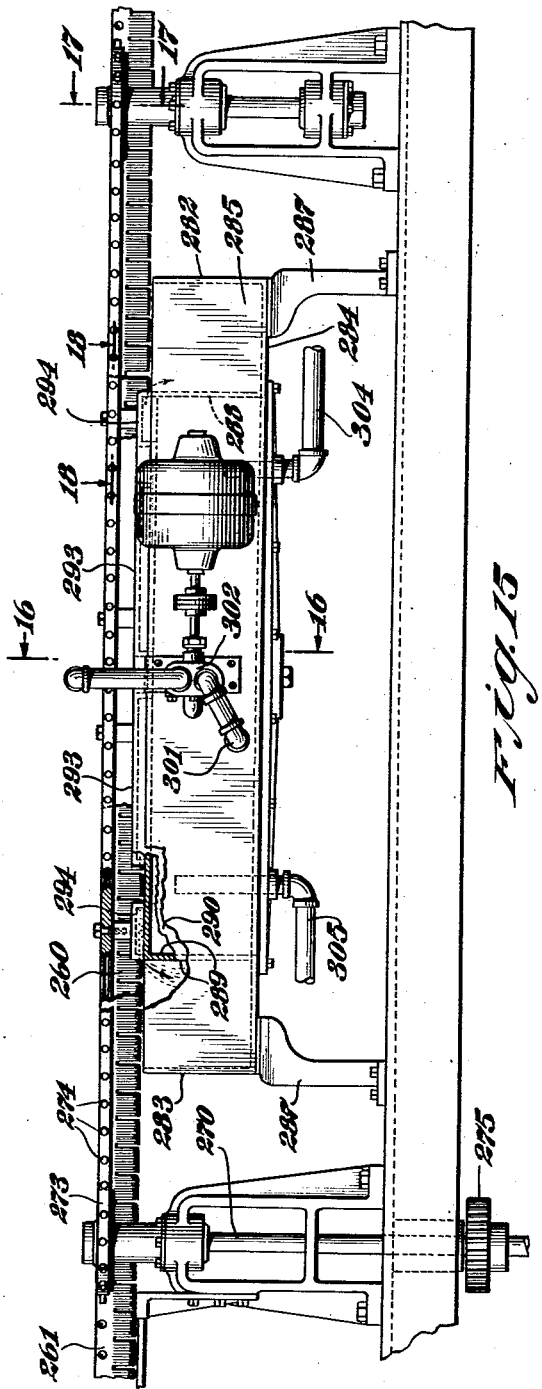

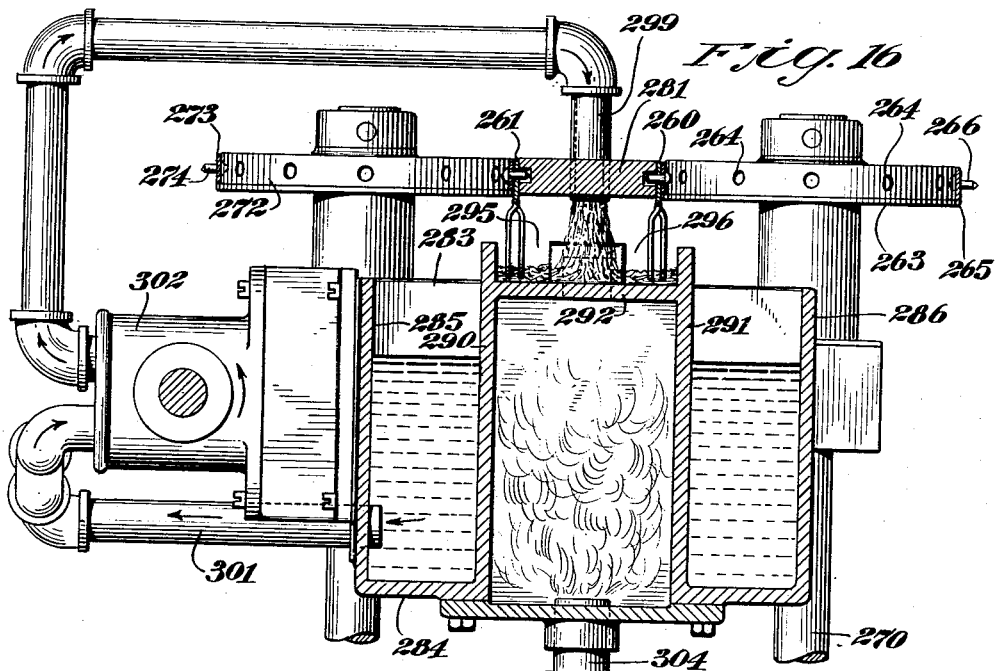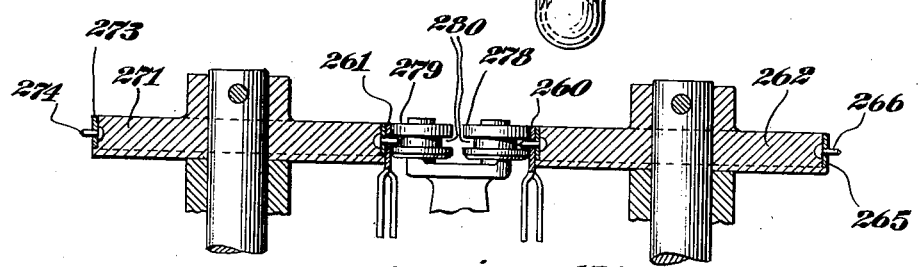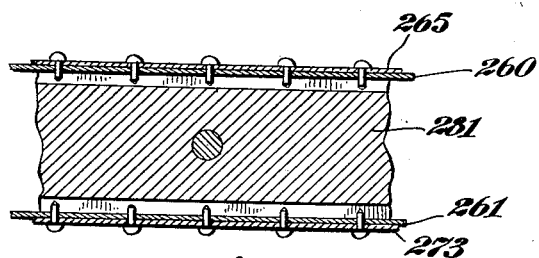

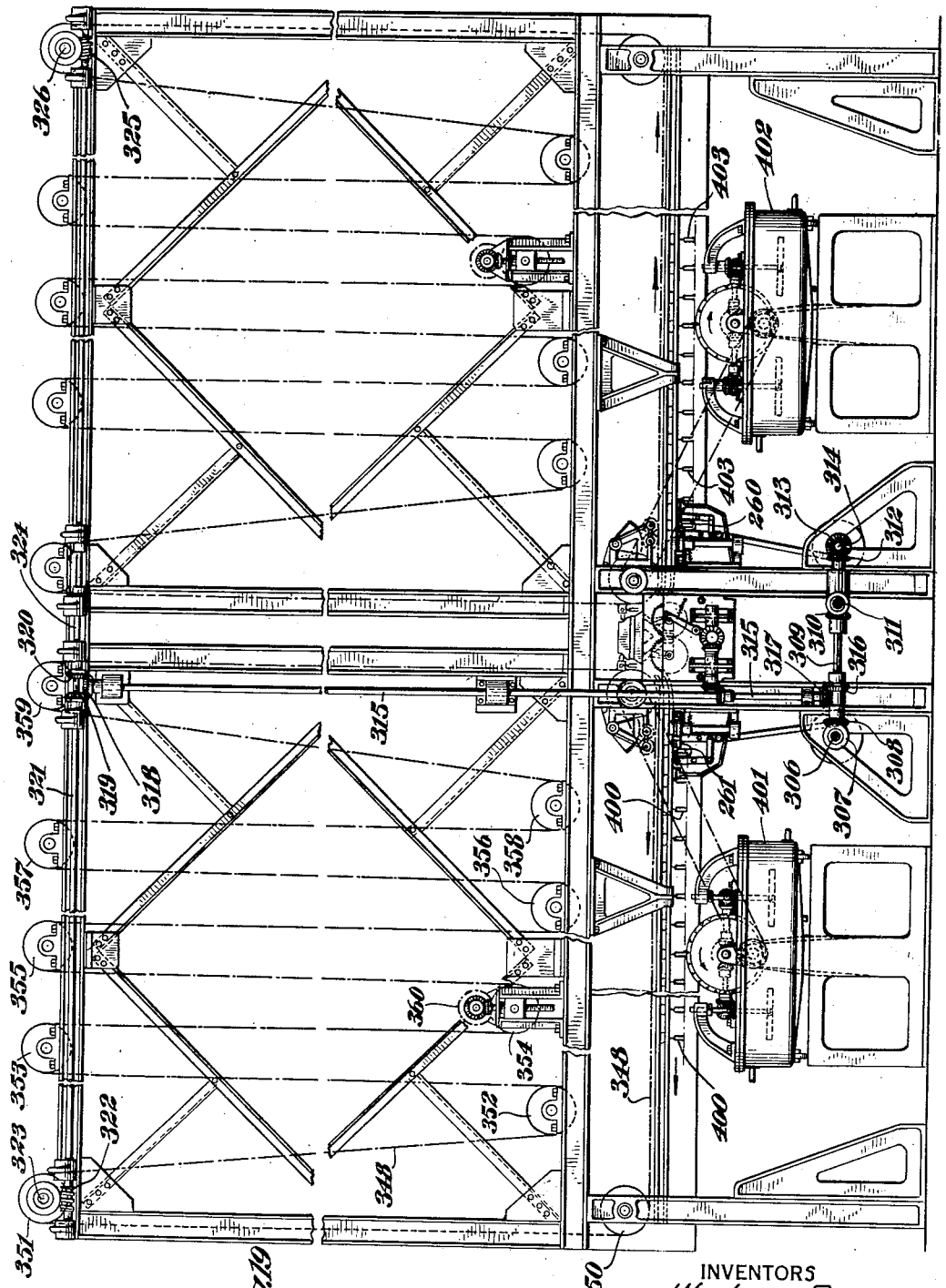

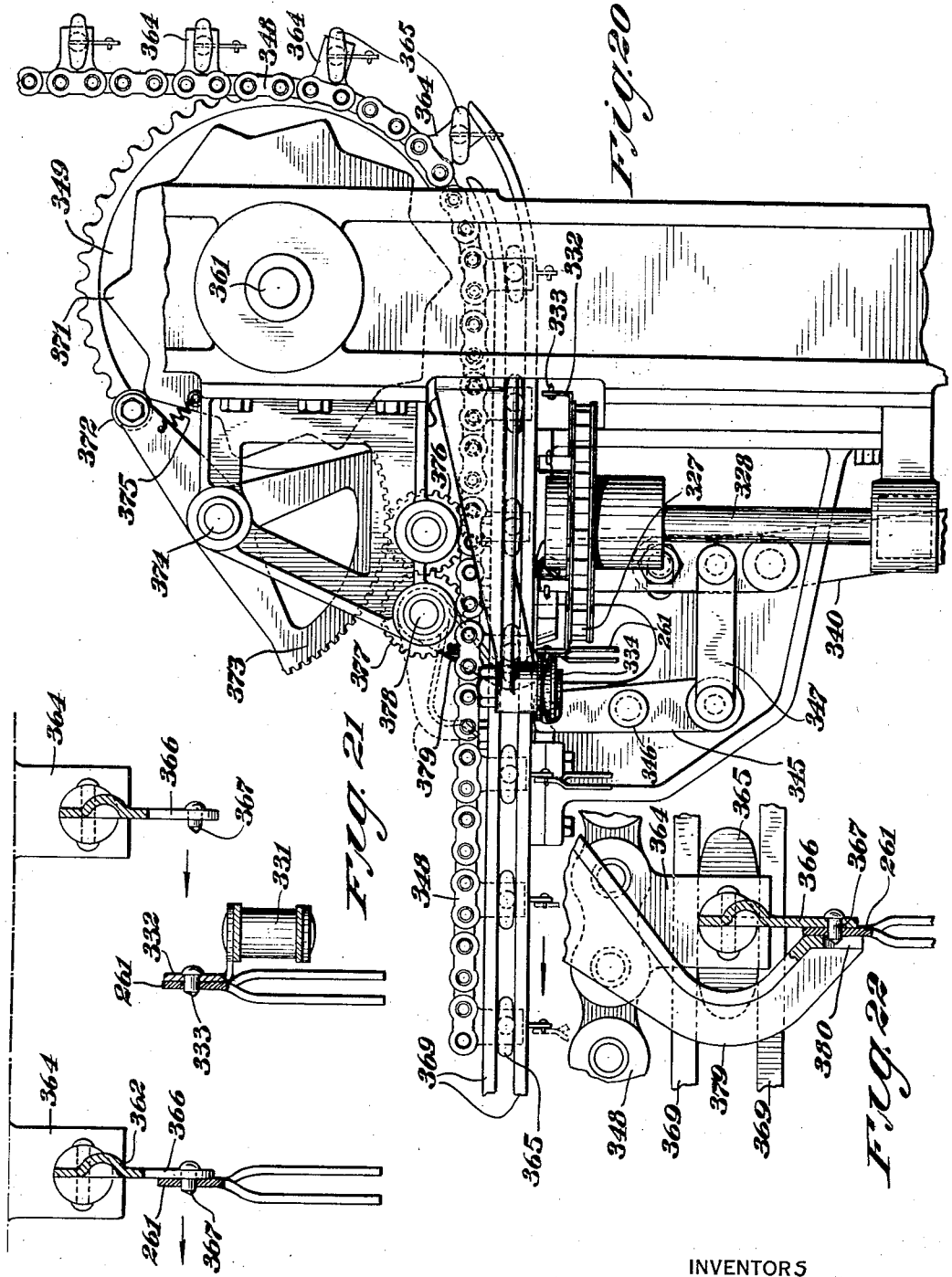

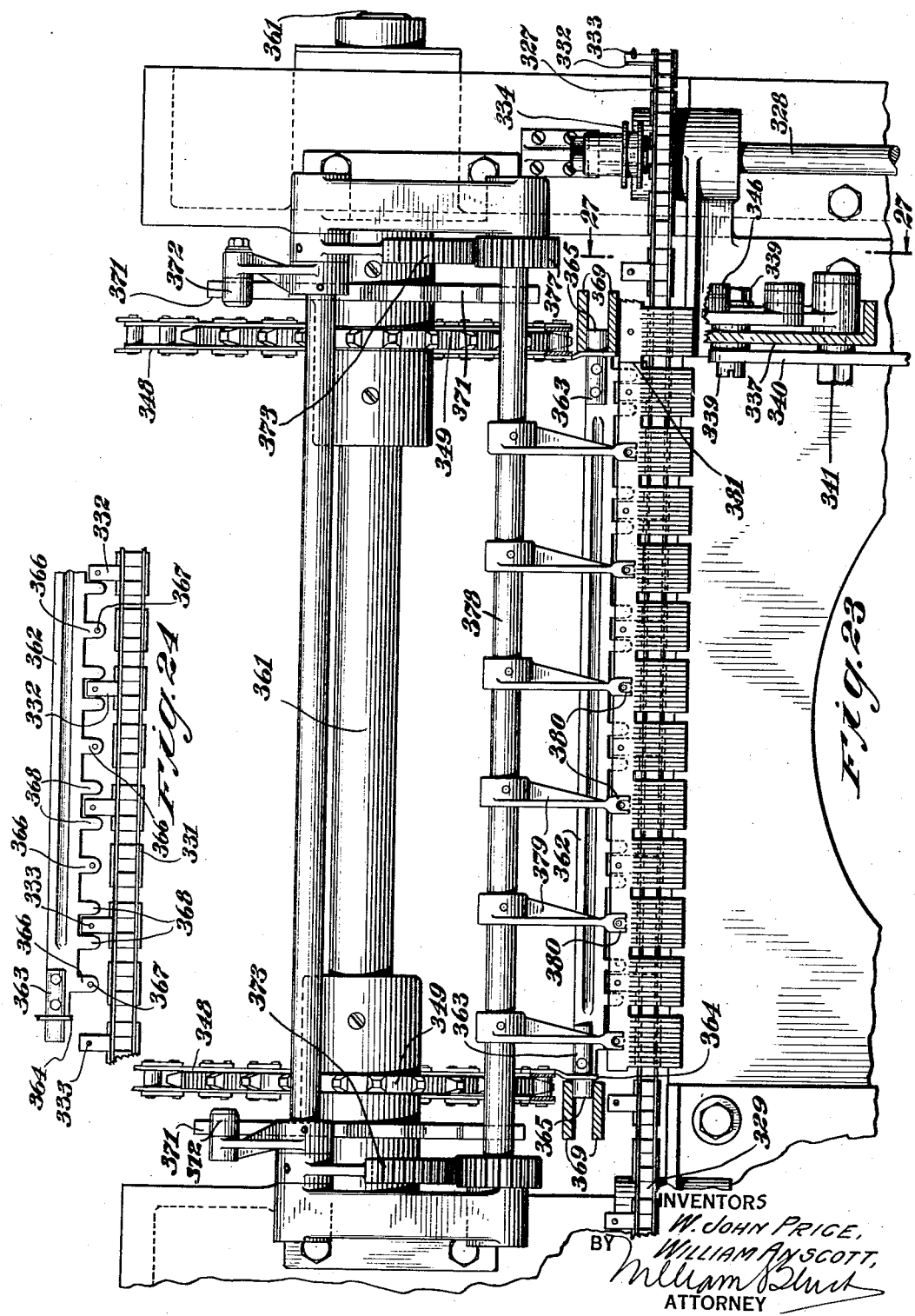

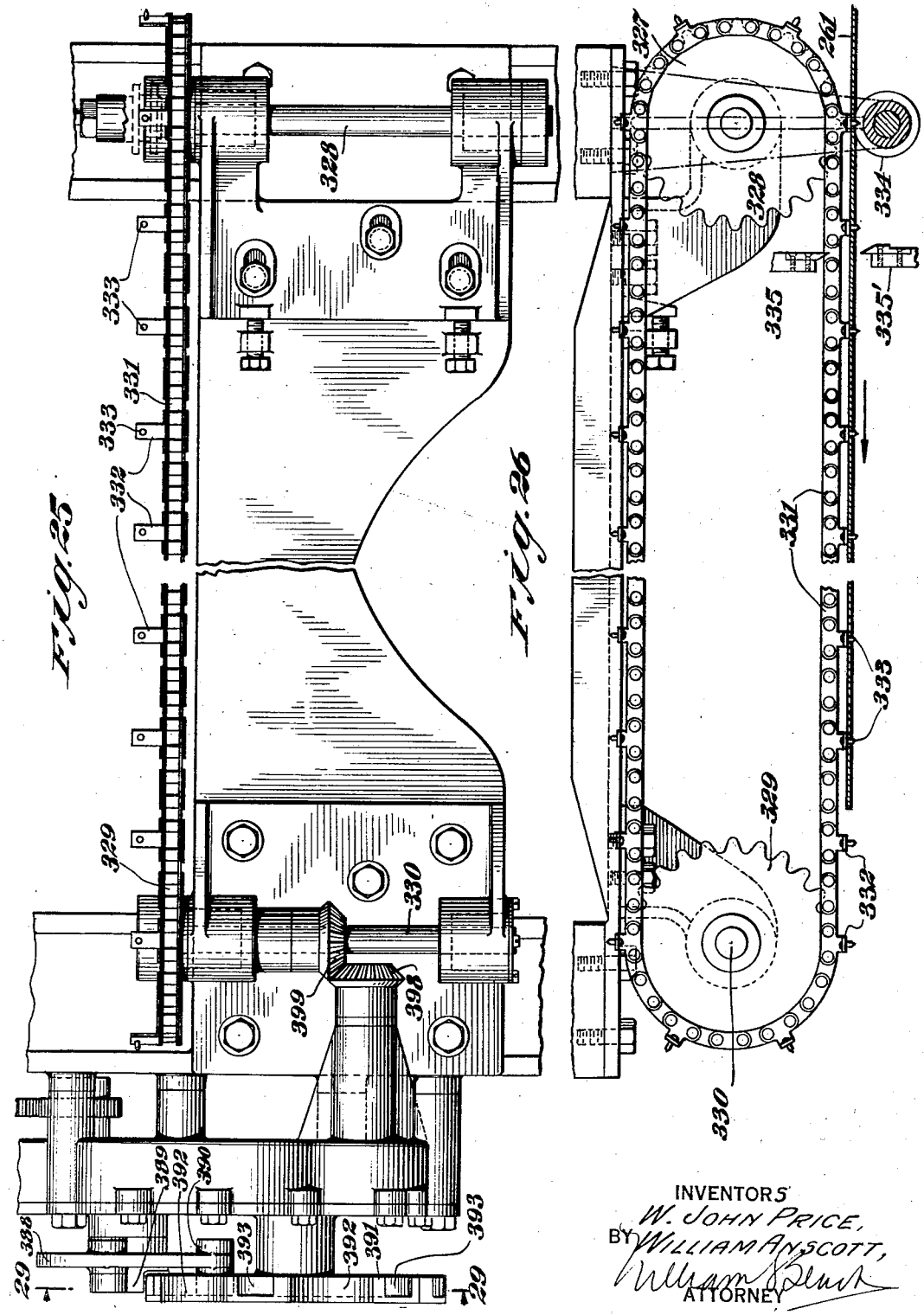

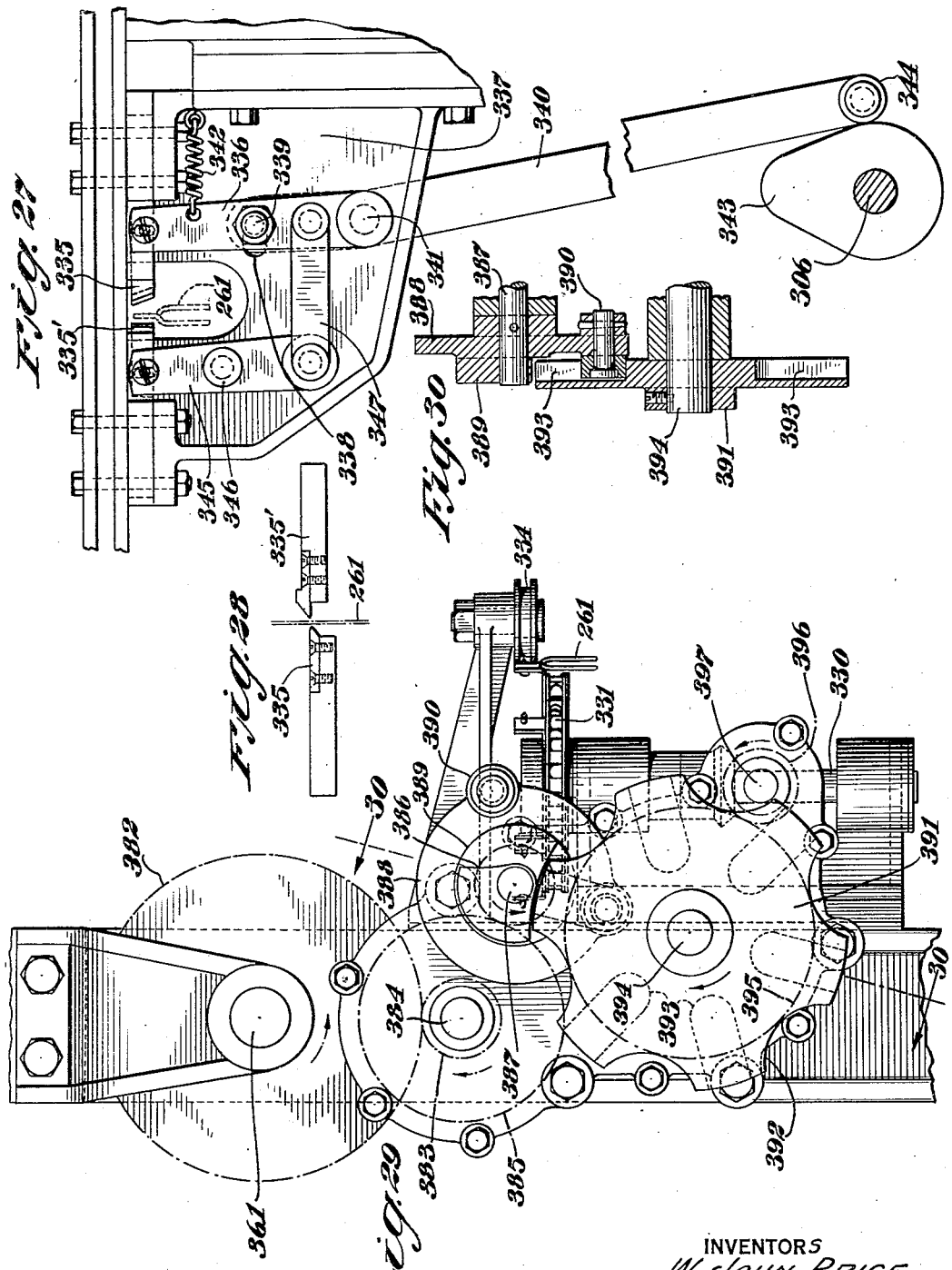

March 20, 1934. W. J. PRICE ET AL 1,951,371
APPARATUS FOR MANUFACTURING MATCH BOOKS
Filed Oct. 21, 1929 31 Sheets-Sheet 13
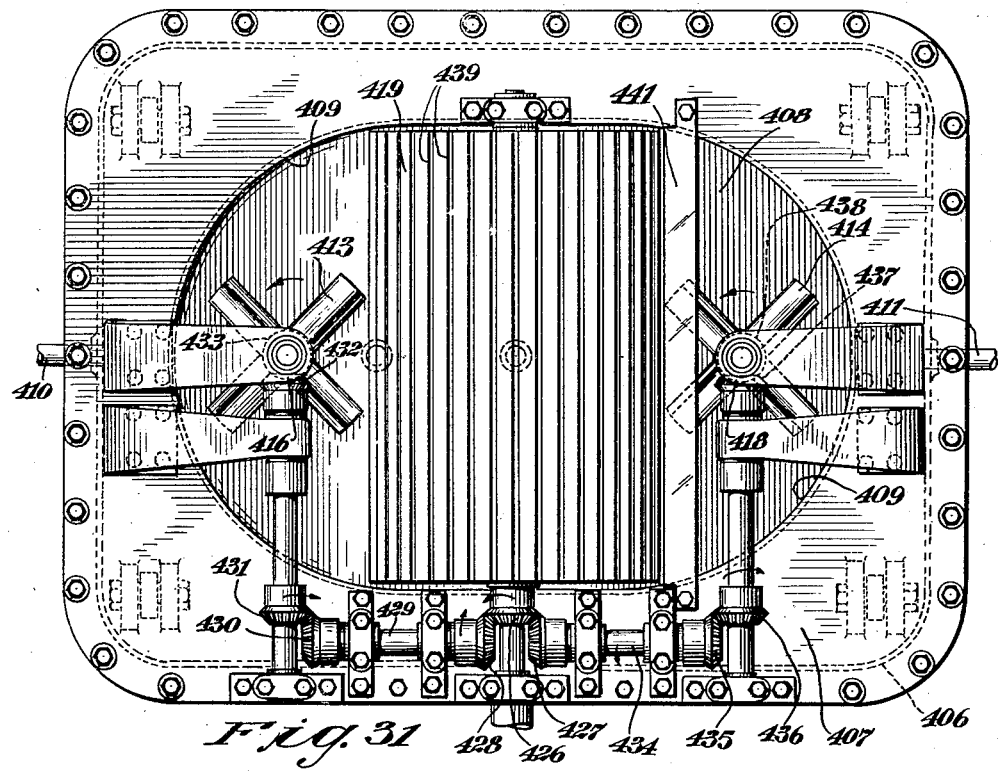
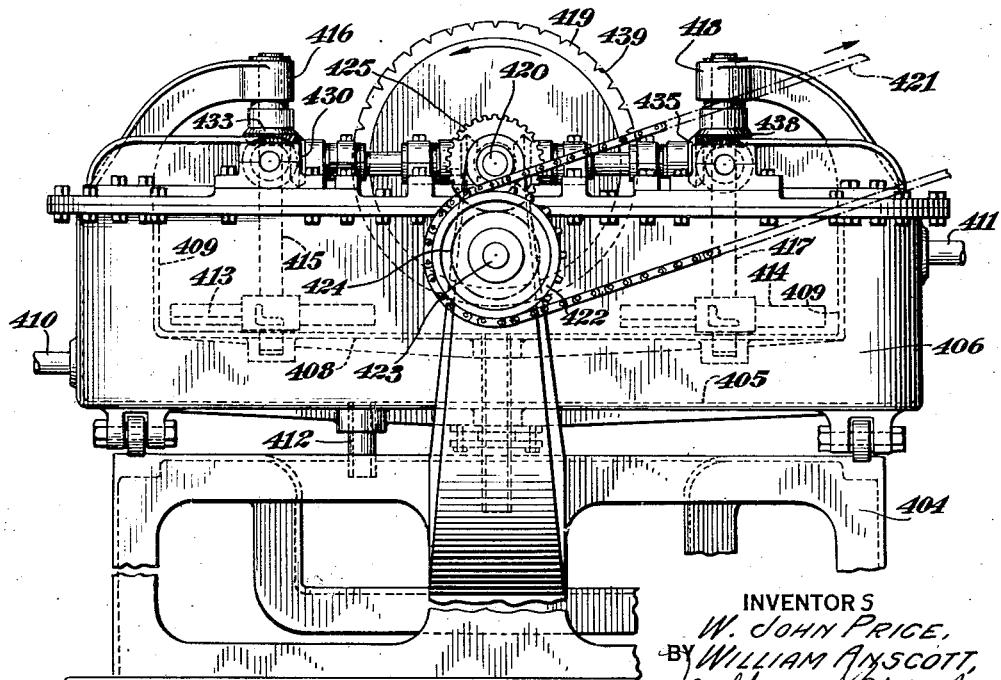

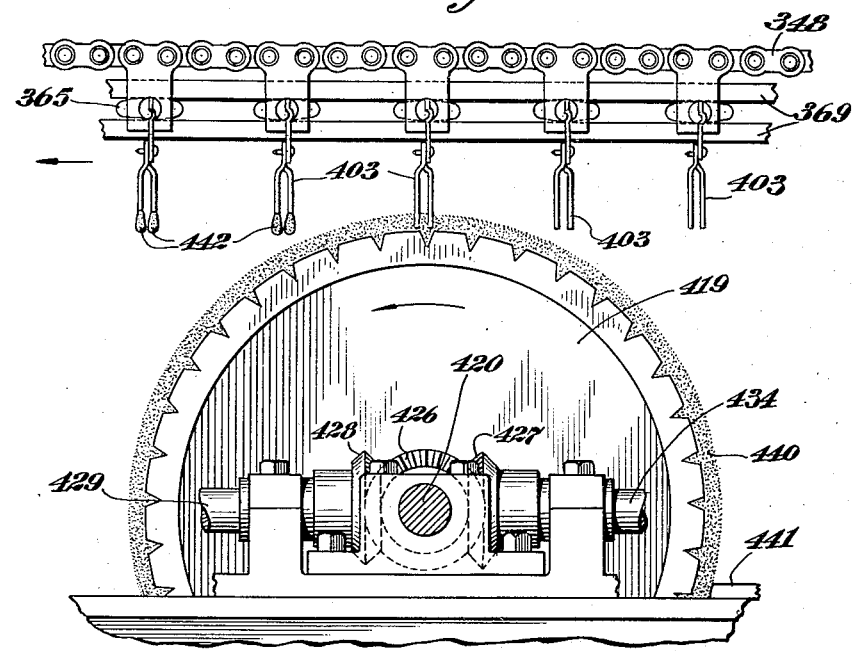
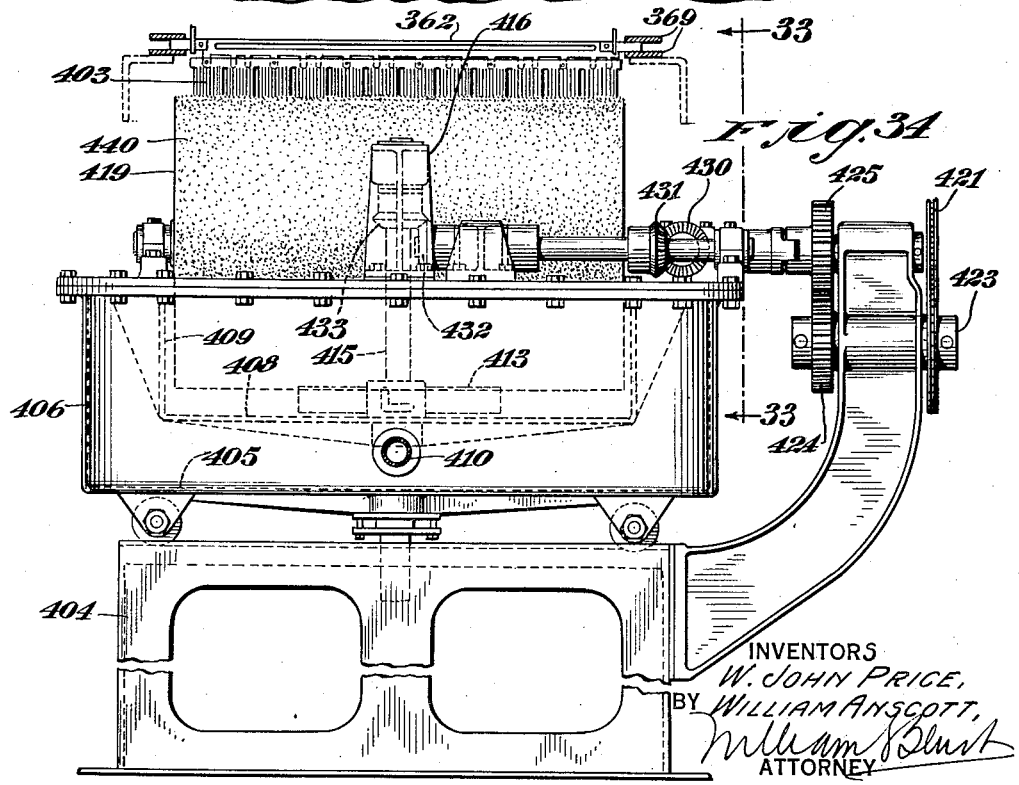

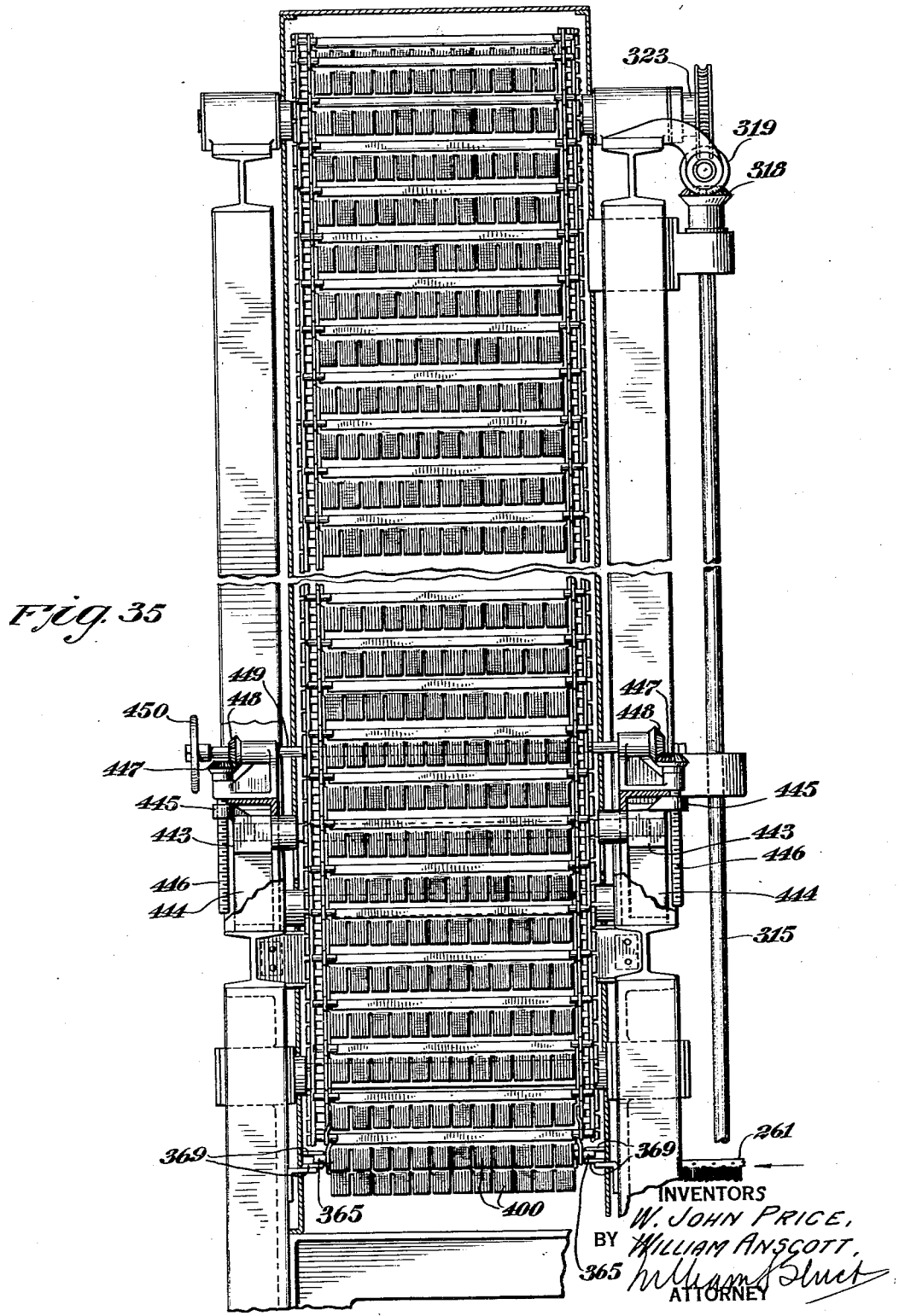

March 20, 1934.  W. J. PRICE ET AL  1,951,371
APPARATUS FOR MANUFACTURING MATCH BOOKS
Filed Oct. 21, 1929   31 Sheets-Sheet 16
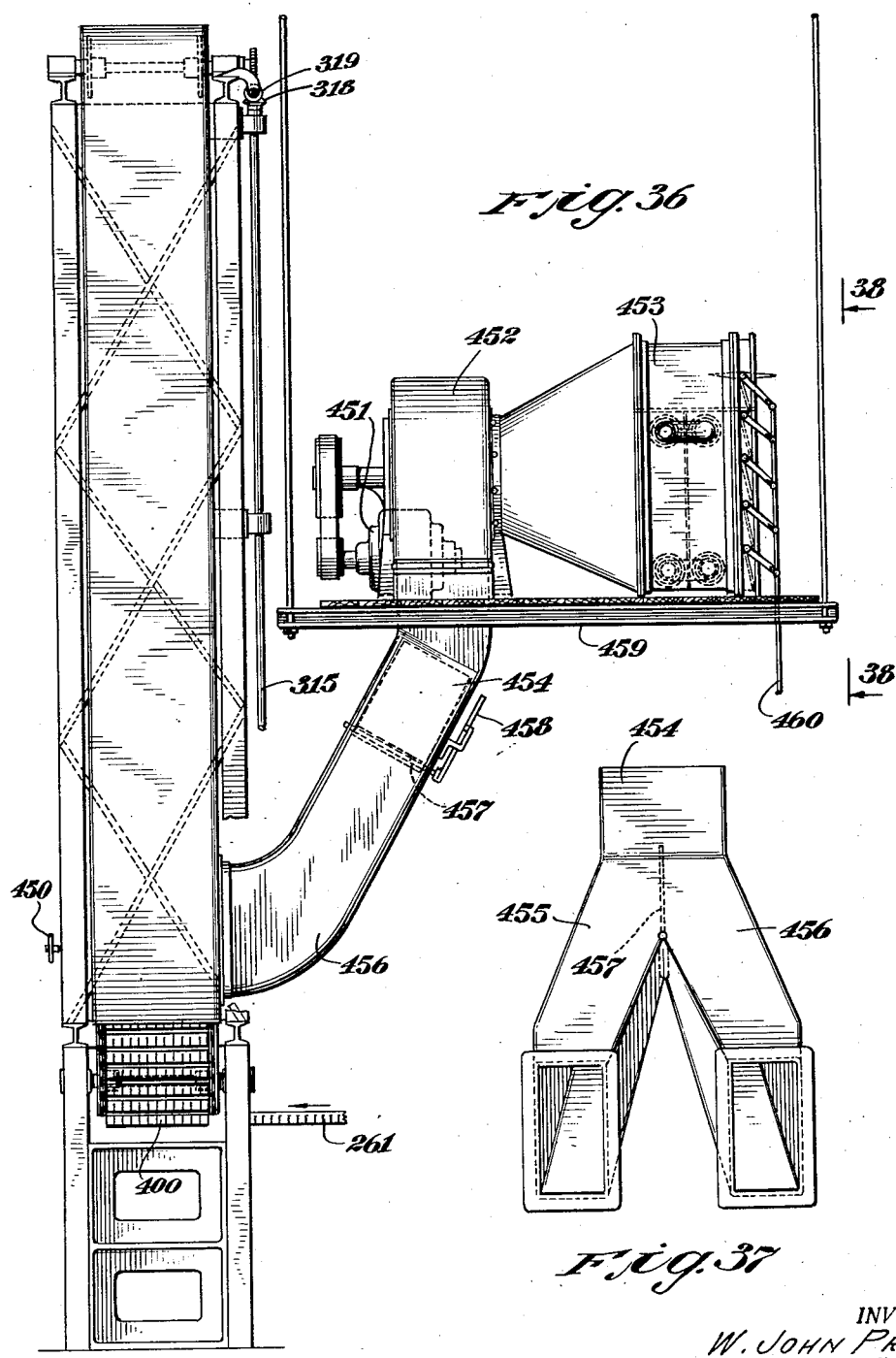
INVENTORS
W. JOHN PRICE,
BY WILLIAM ANSCOTT,
ATTORNEYS.

March 20, 1934. W. J. PRICE ET AL 1,951,371
APPARATUS FOR MANUFACTURING MATCH BOOKS
Filed Oct. 21, 1929   31 Sheets-Sheet 17
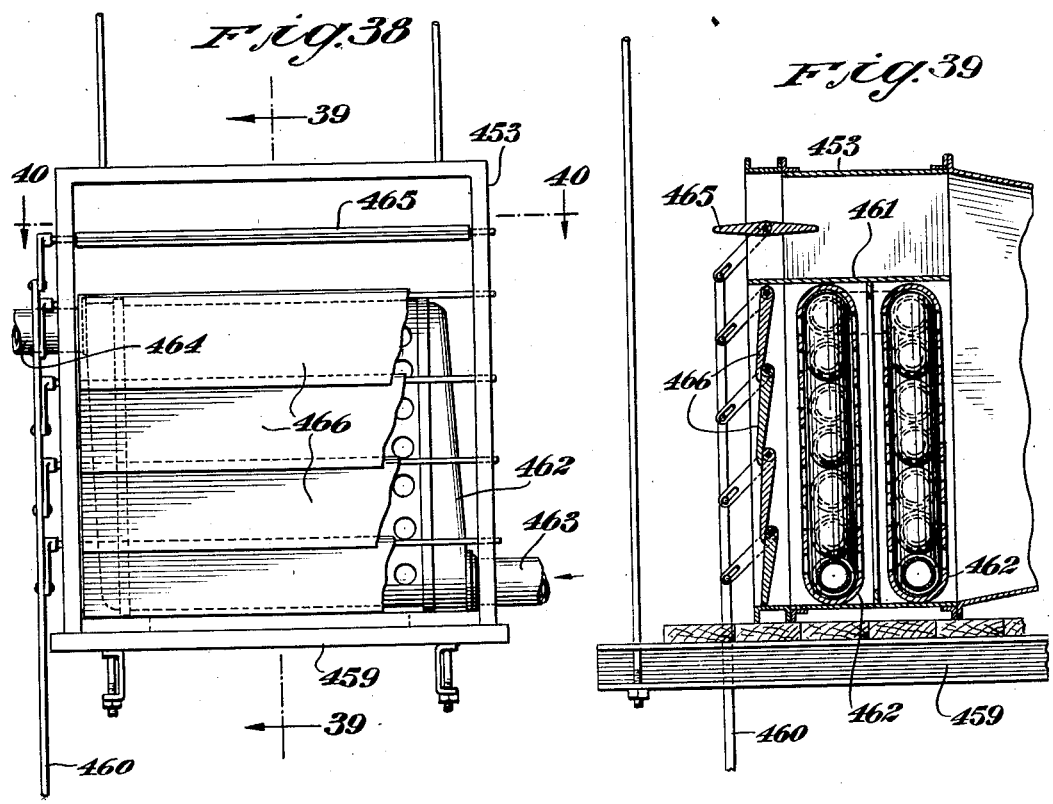
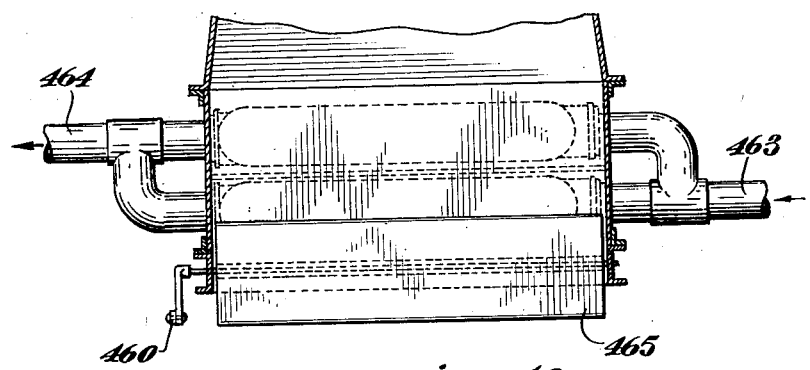
INVENTORS
W. JOHN PRICE,
BY WILLIAM ANSCOTT,
ATTORNEYS.

Fig. 41

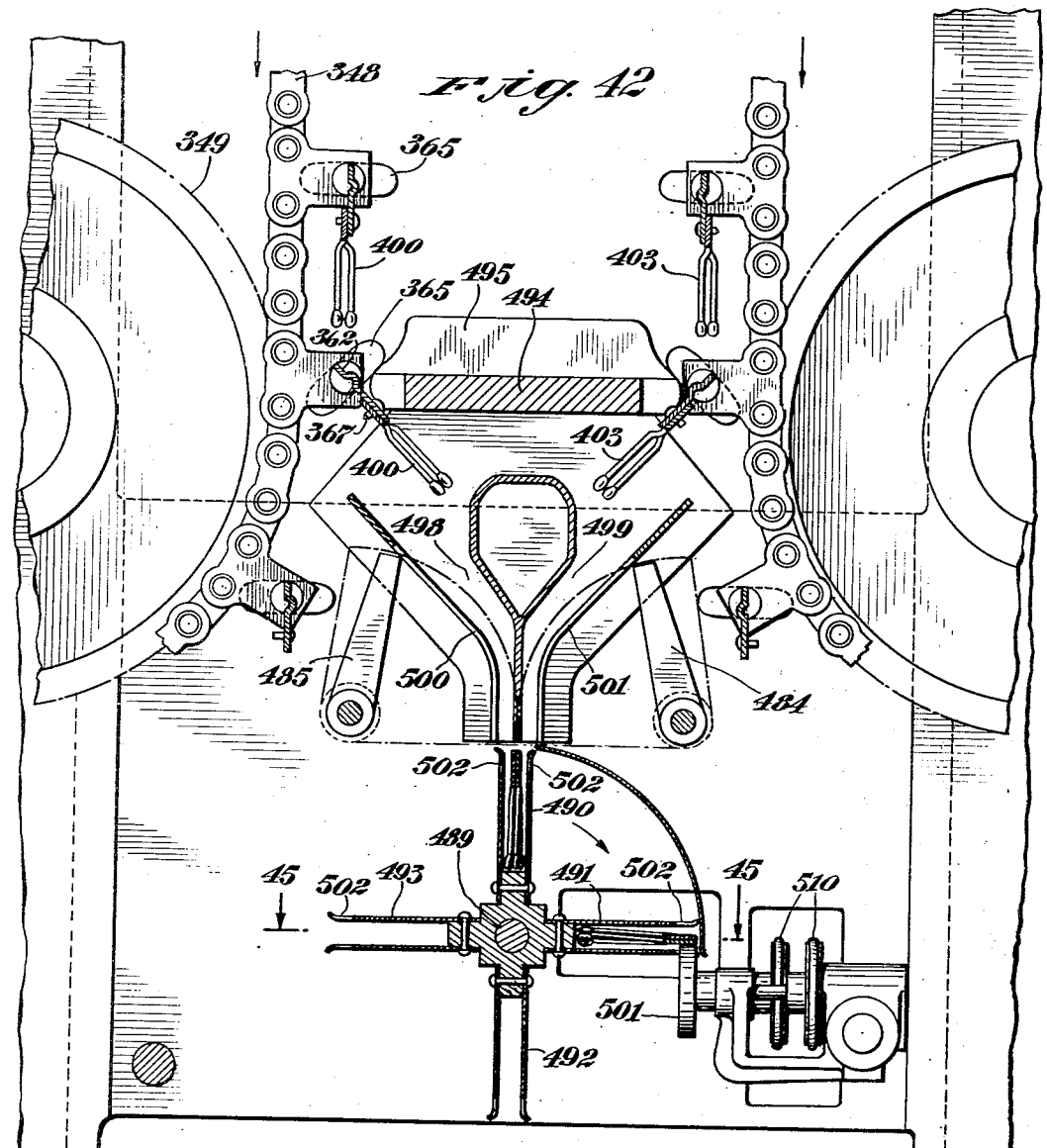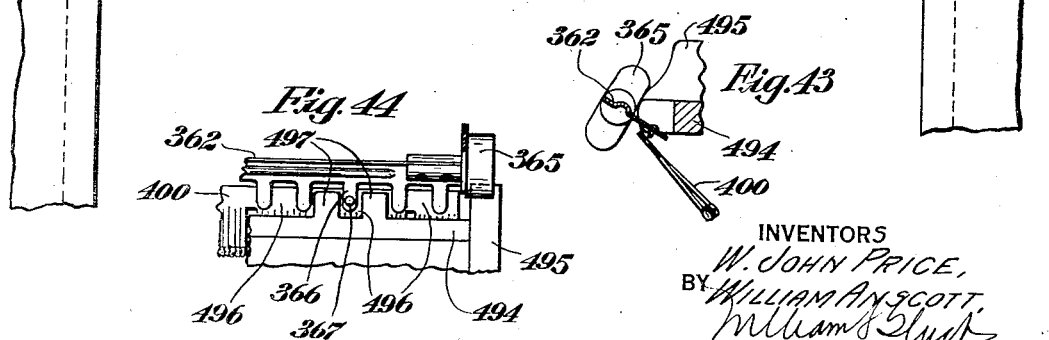

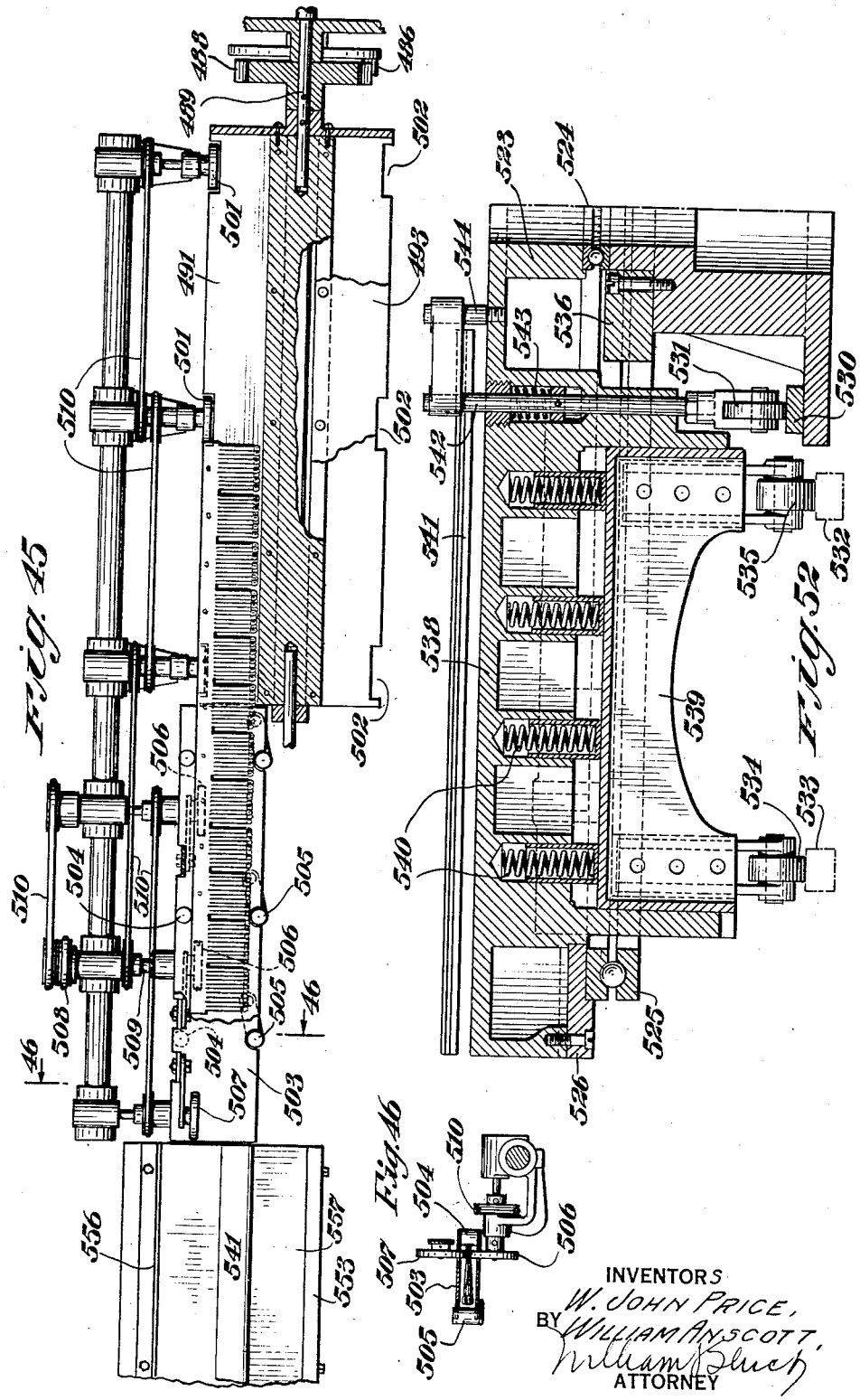

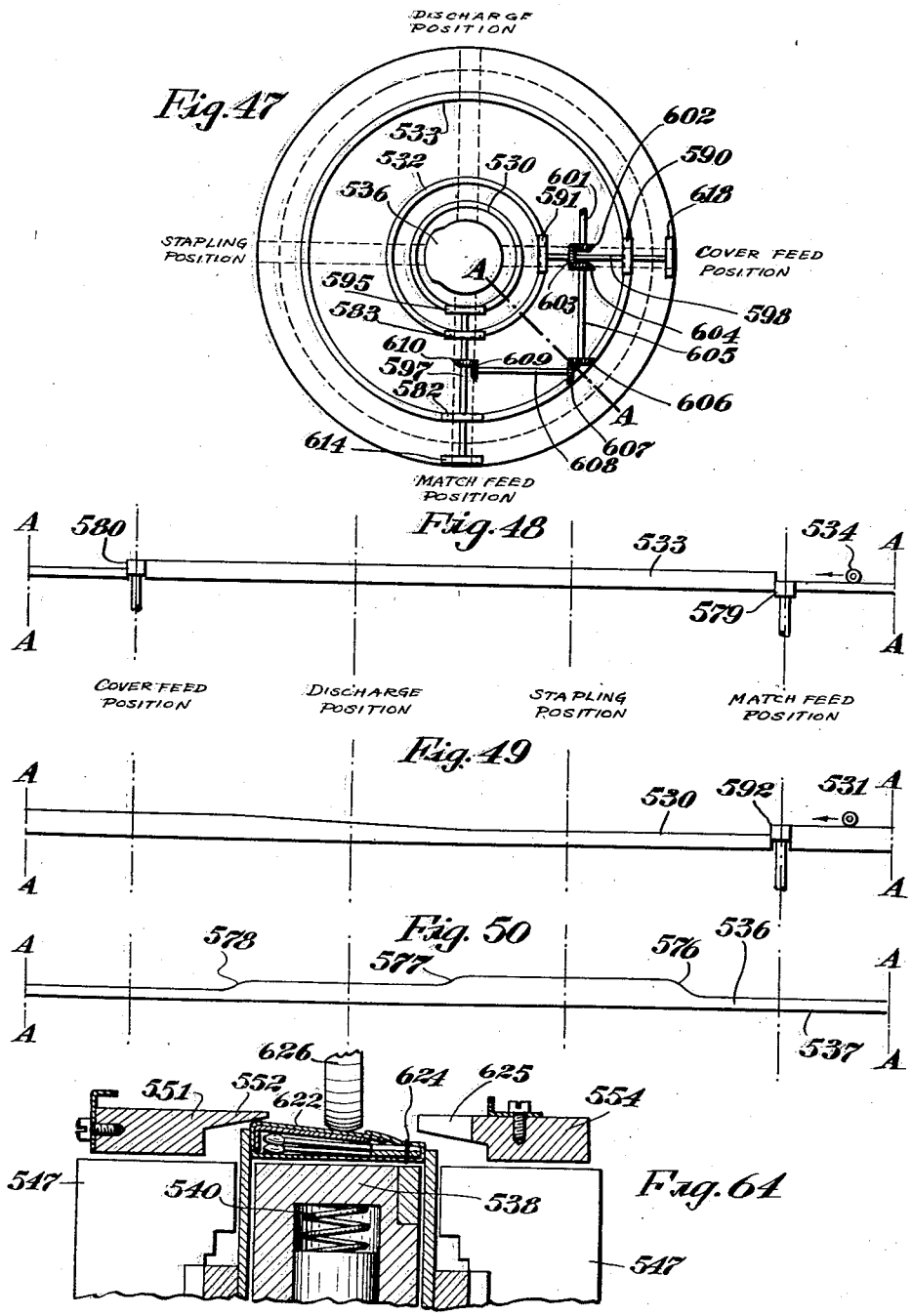

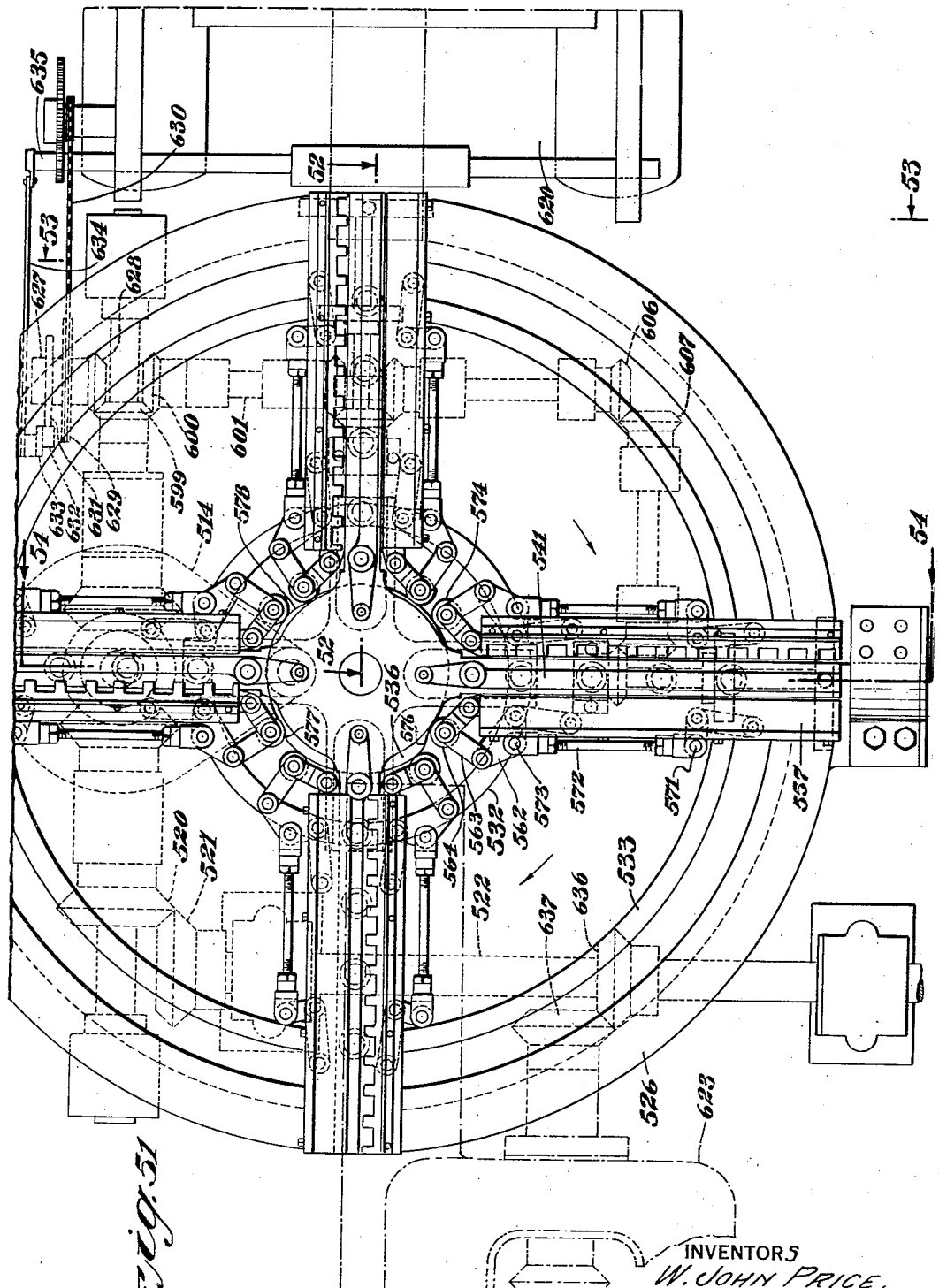

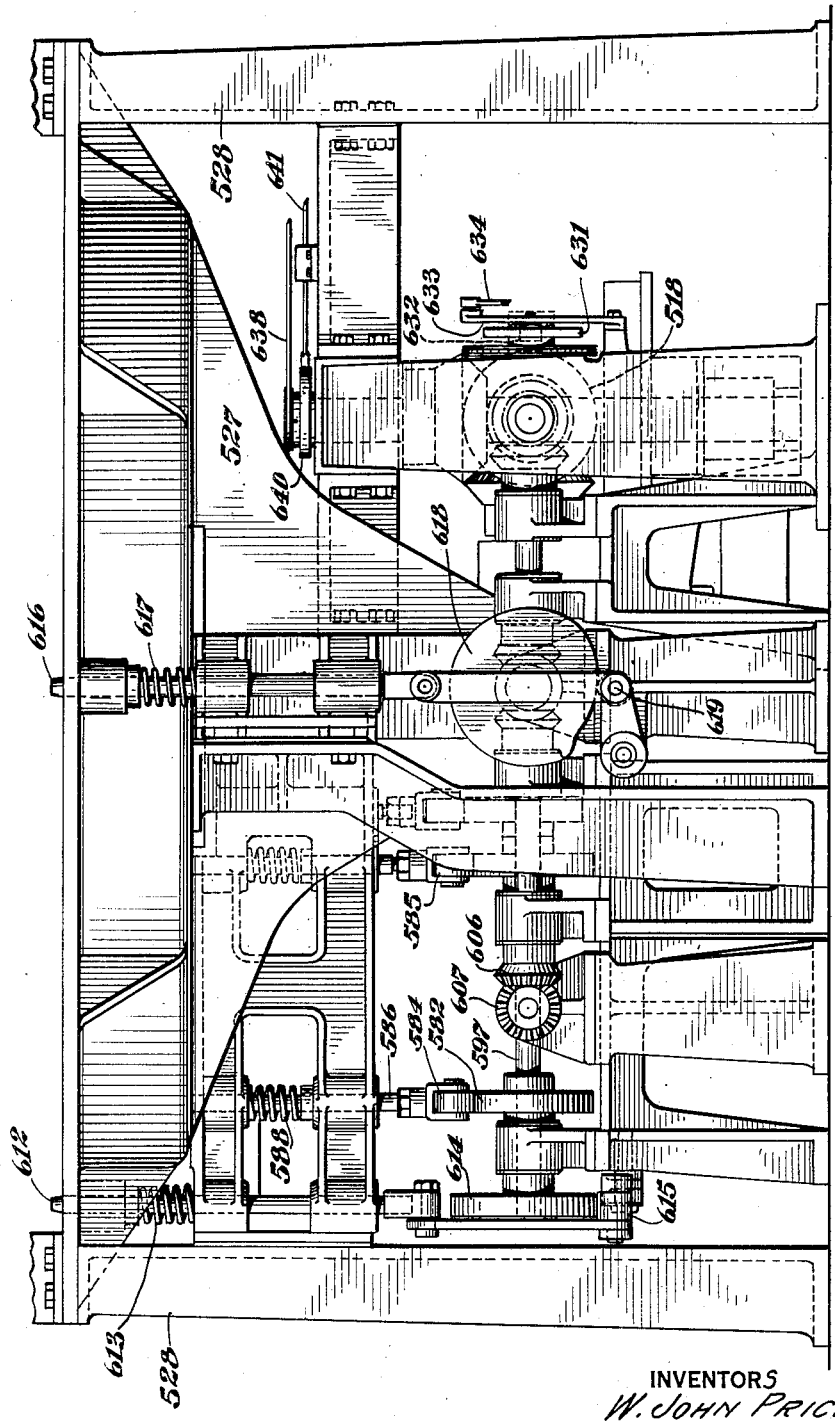

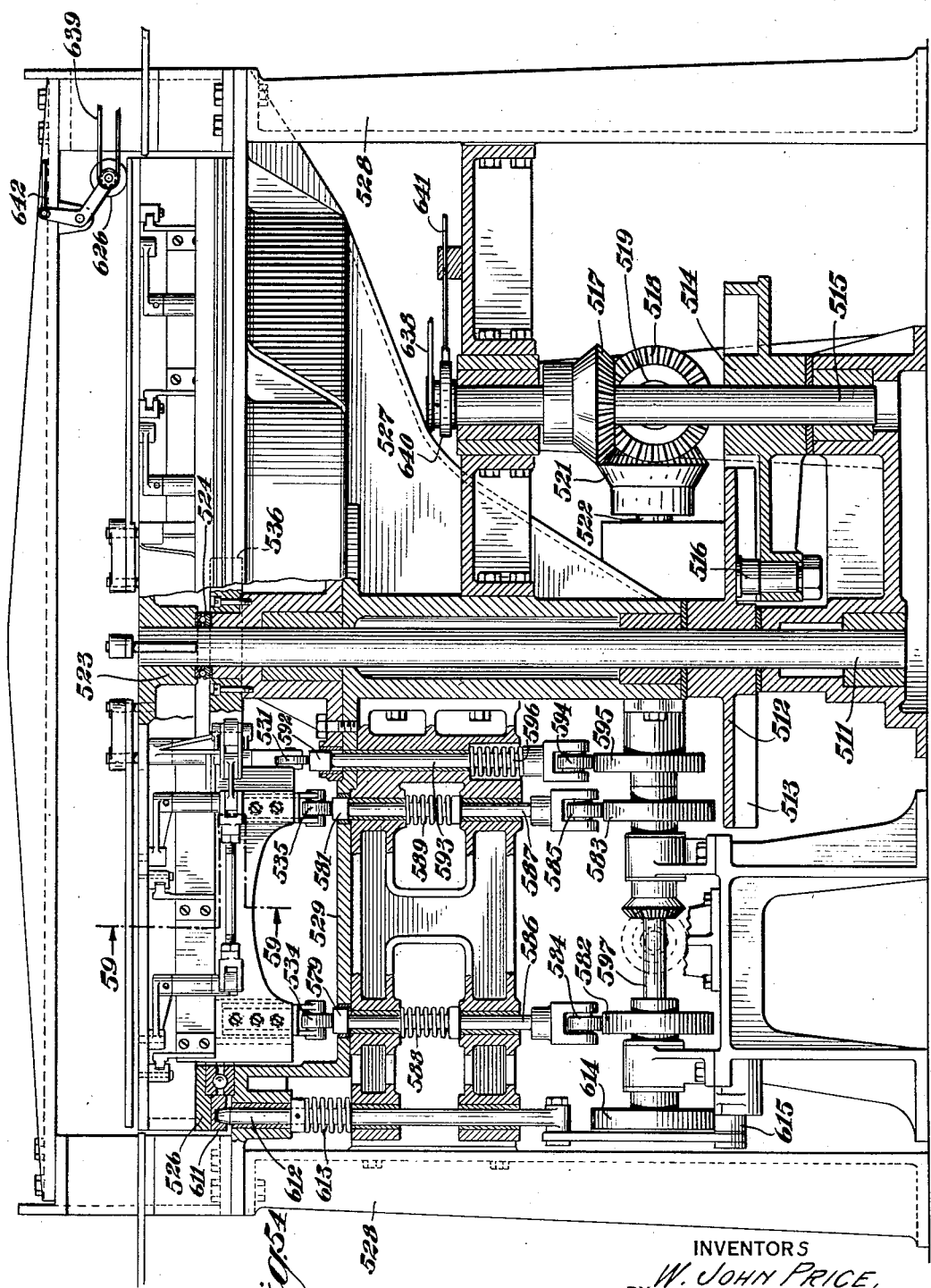

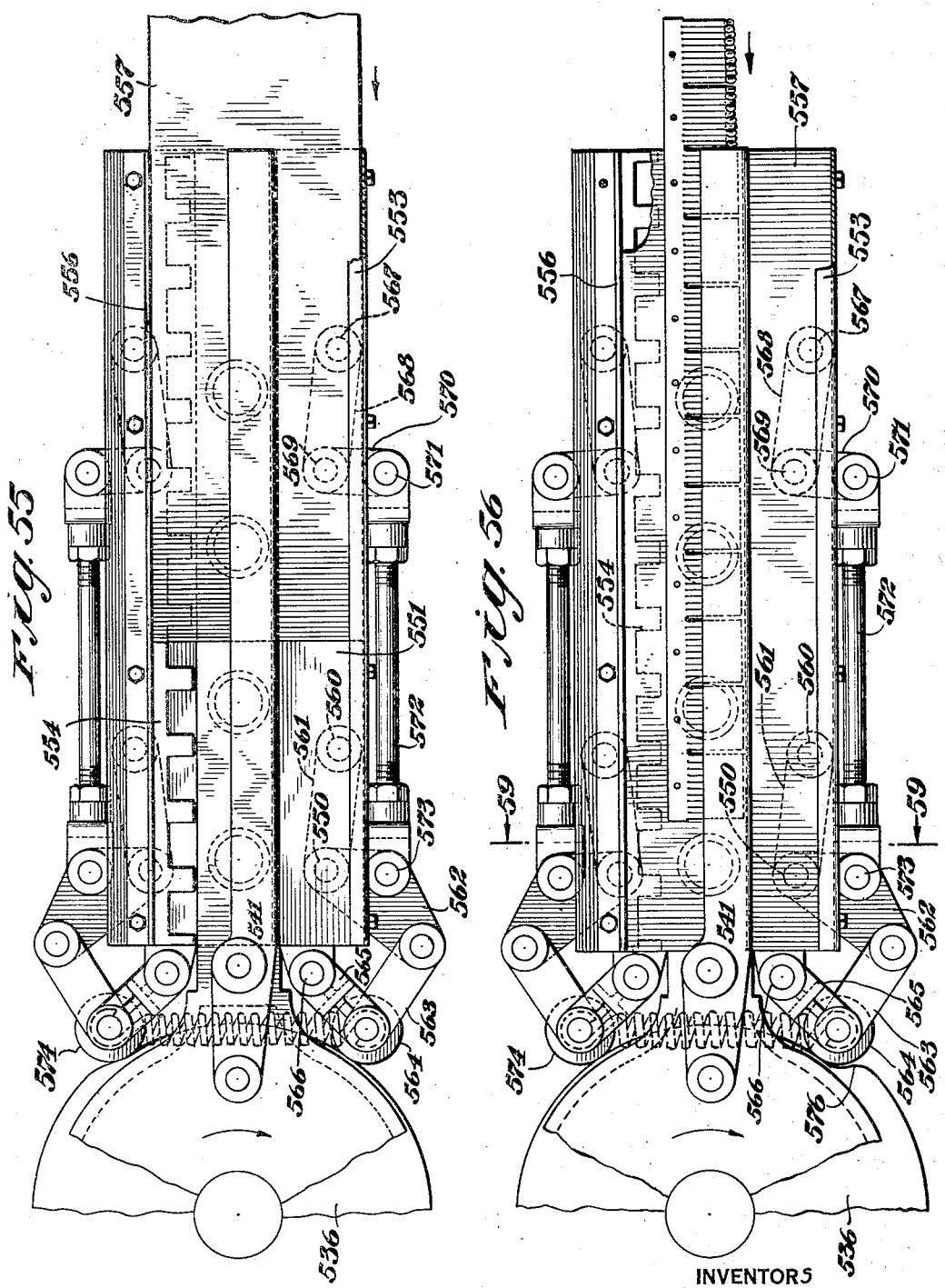

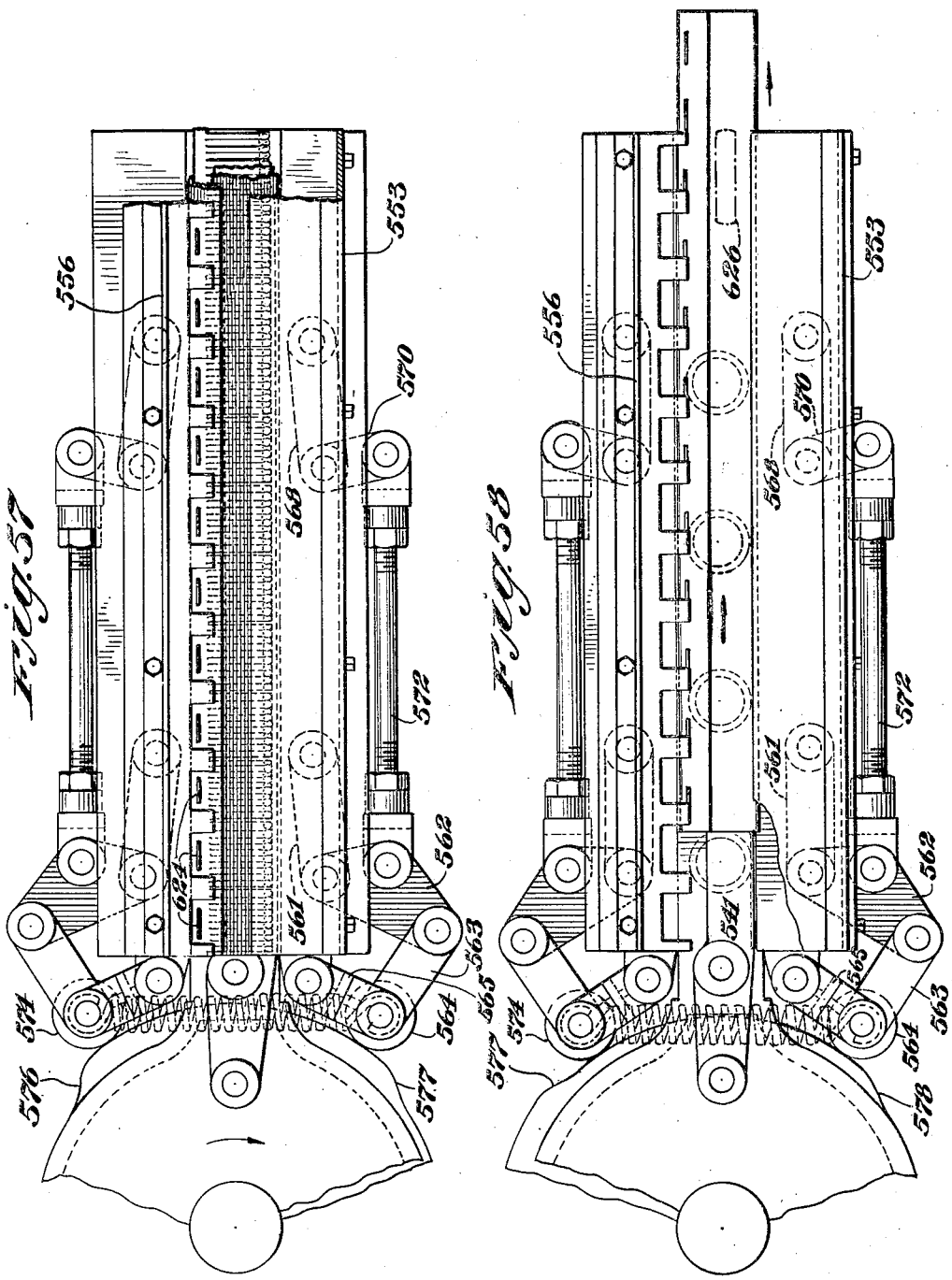

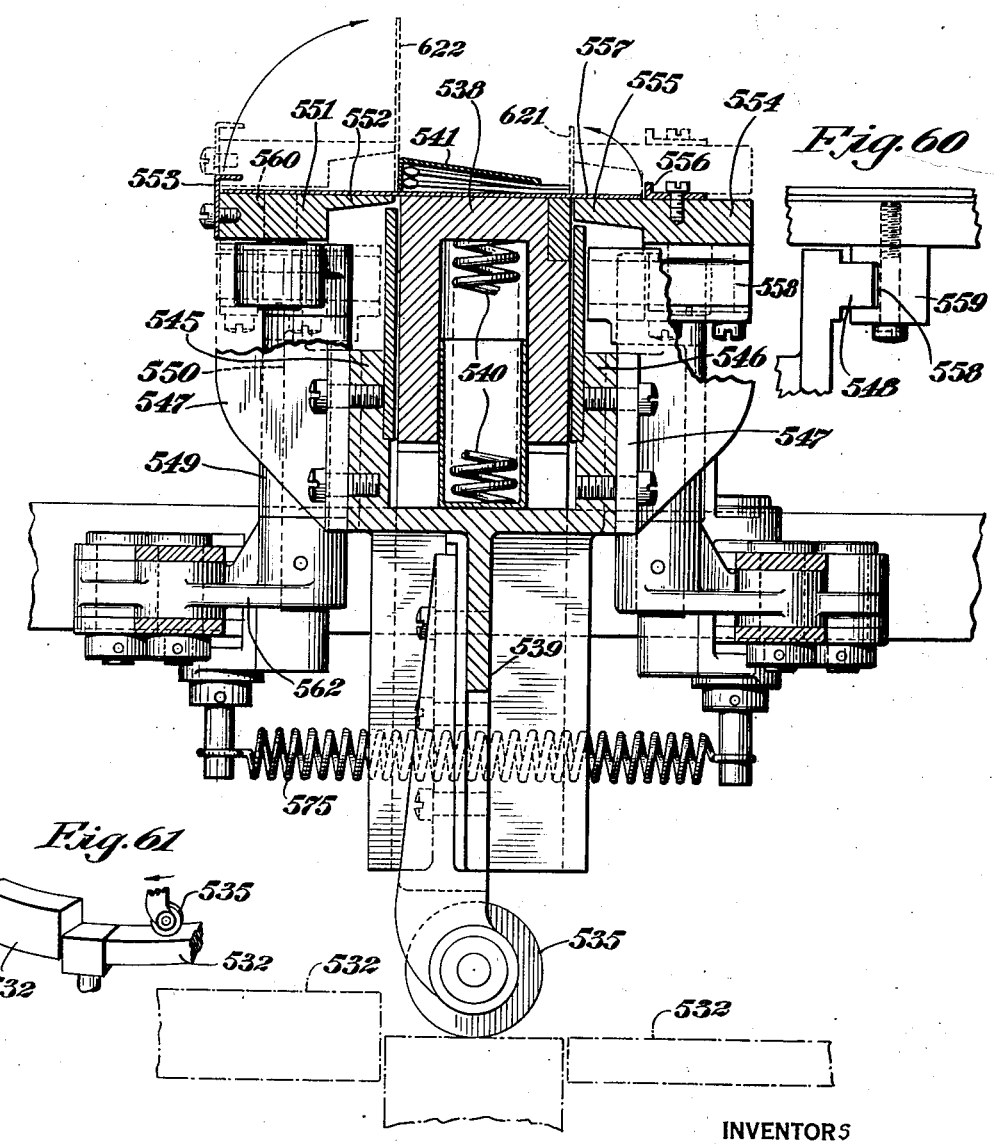

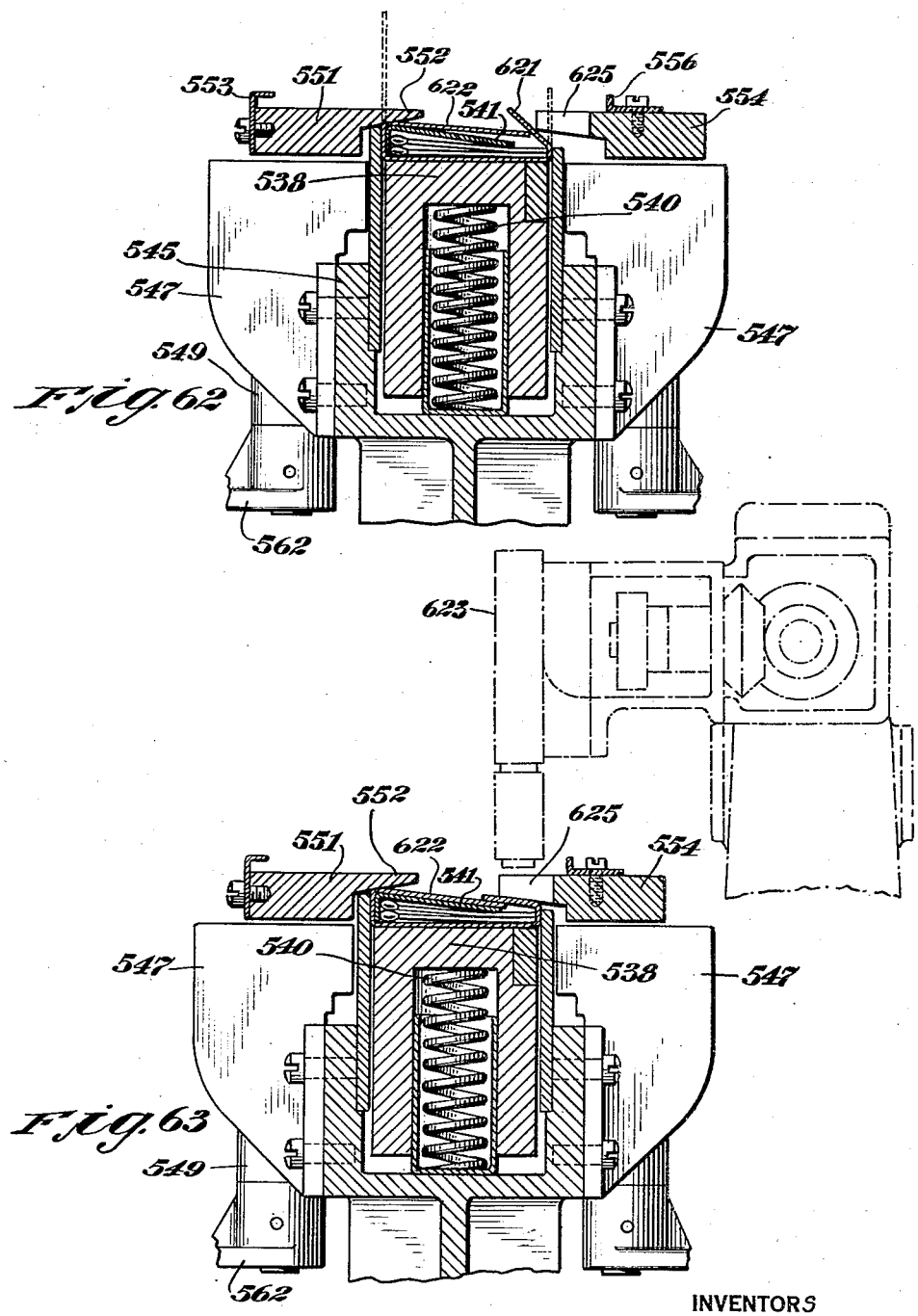

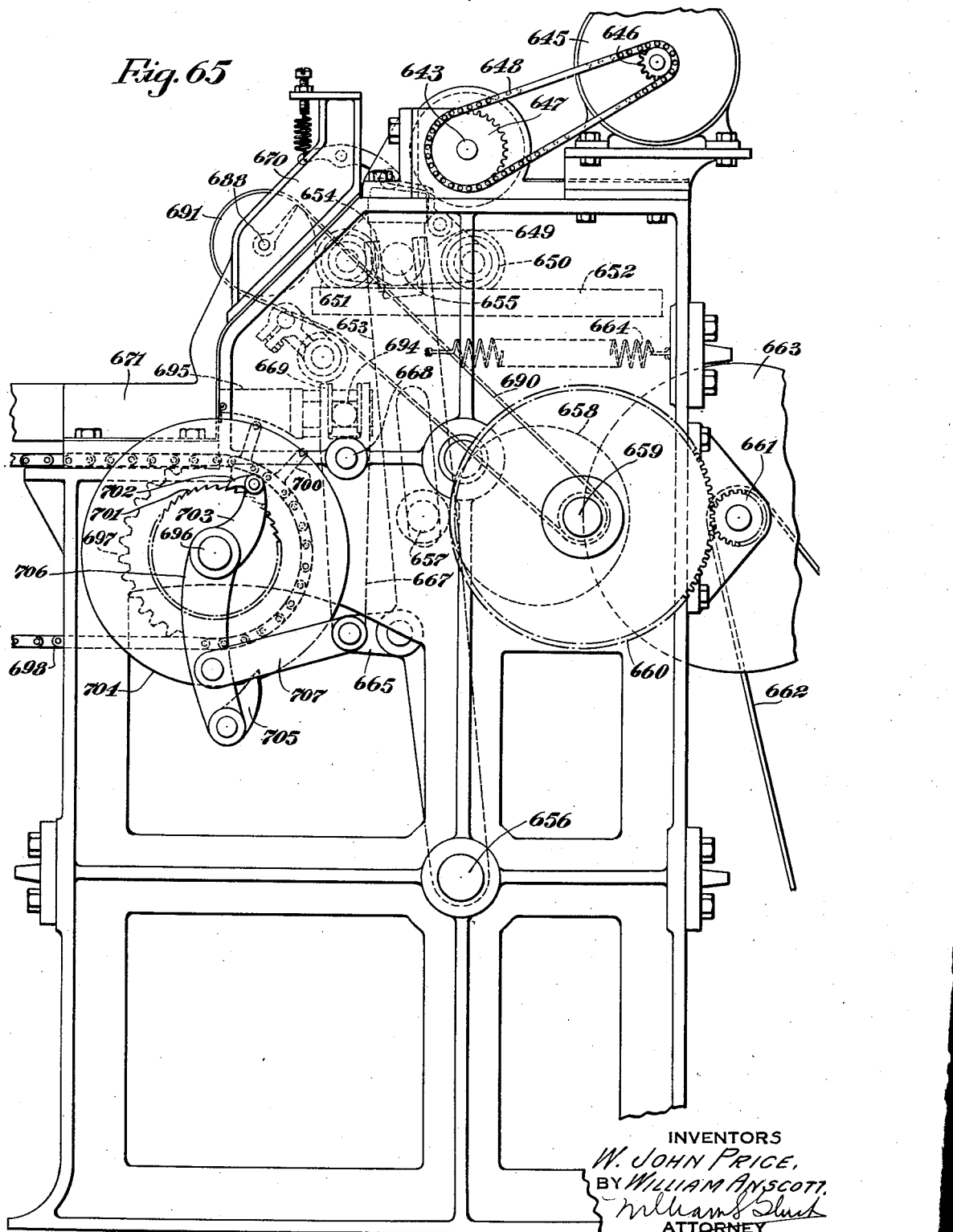

March 20, 1934.   W. J. PRICE ET AL   1,951,371
APPARATUS FOR MANUFACTURING MATCH BOOKS
Filed Oct. 21, 1929   31 Sheets-Sheet 30
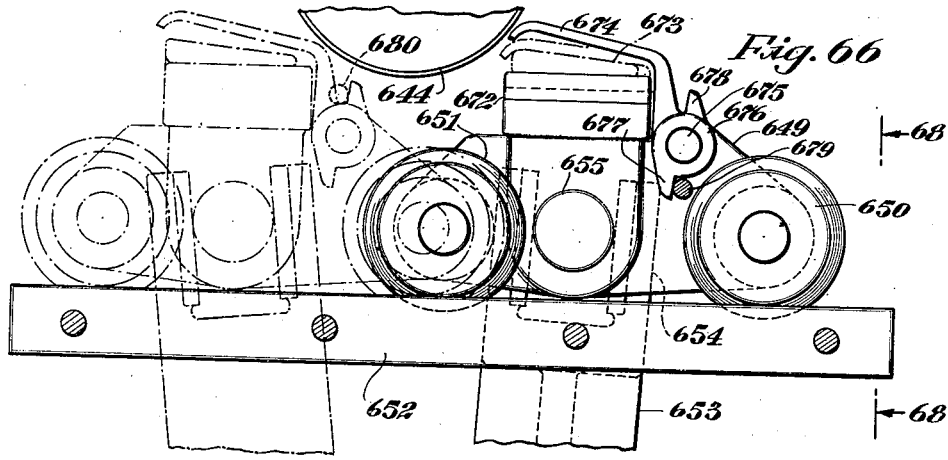
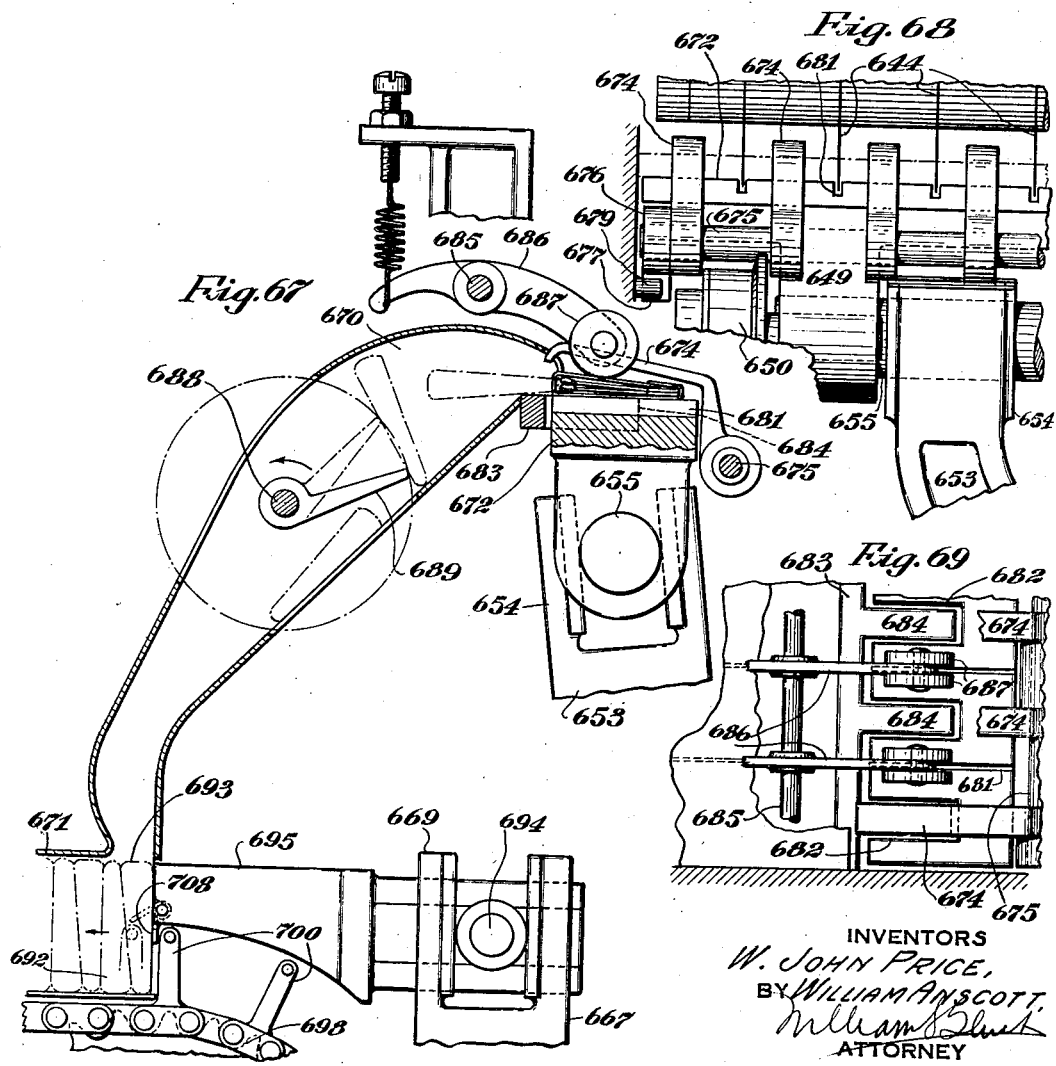
INVENTORS
W. JOHN PRICE,
BY WILLIAM ANSCOTT.
ATTORNEY March 20, 1934.  W. J. PRICE ET AL  1,951,371
APPARATUS FOR MANUFACTURING MATCH BOOKS
Filed Oct. 21, 1929    31 Sheets-Sheet 31
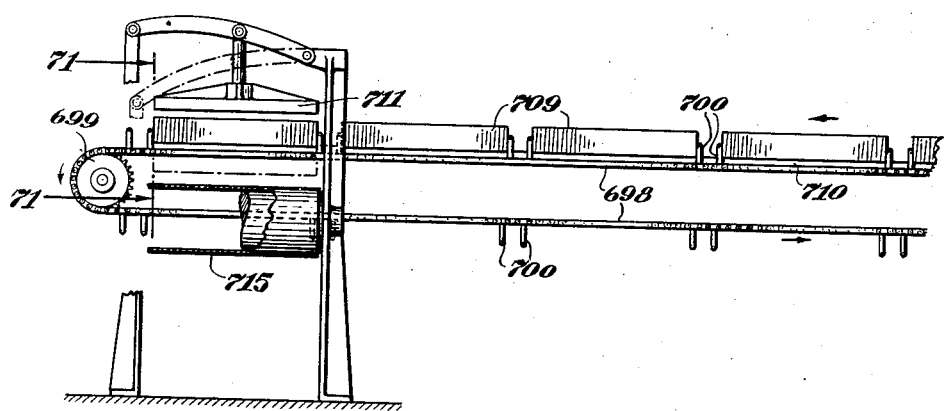
Fig. 70
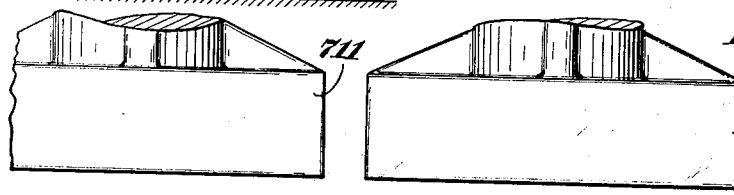
Fig. 71
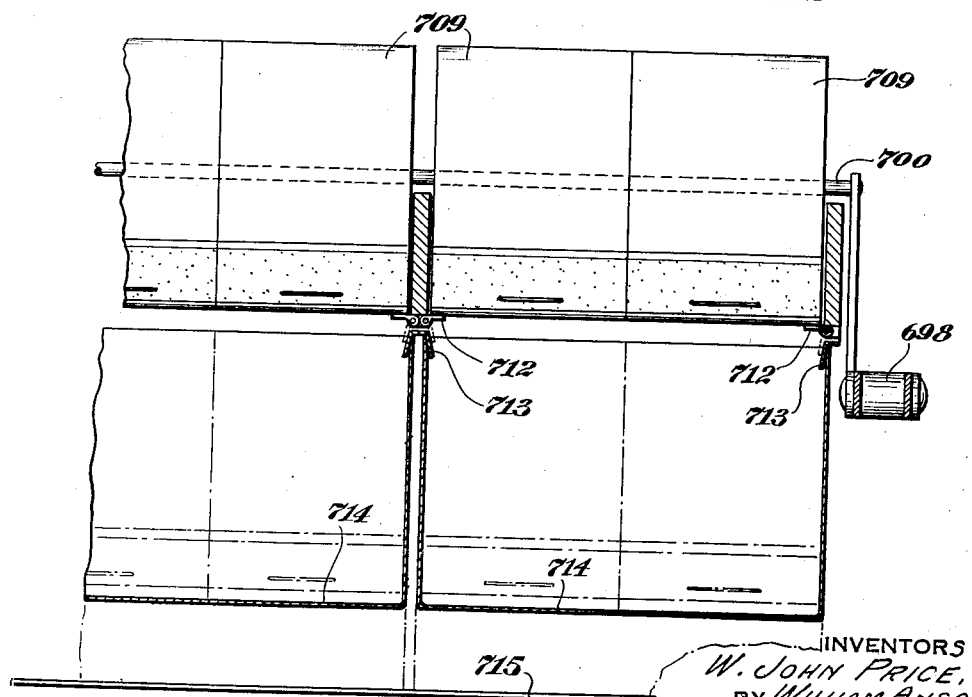
INVENTORS
W. JOHN PRICE,
BY WILLIAM ANSCOTT,
ATTORNEY Patented Mar. 20, 1934

1,951,371

UNITED STATES PATENT OFFICE 1,951,371

APPARATUS FOR MANUFACTURING MATCH BOOKS

W. John Price and William Anscott, Brooklyn, N. Y., assignors to Oval Match Company, Inc., Brooklyn, N. Y., a corporation of New York Application October 21, 1929, Serial No. 401,293

26 Claims. (Cl. 93—1)

Our present invention relates to match-making machinery, and has particular reference to a machine for manufacturing match books.

The term "match book" as used herein refers to that article of commerce in common use wherein a cardboard cover encloses a group of cardboard splints or paper matches. The cover is substantially rectangular and one of the short ends is doubled back upon itself and is stapled or otherwise suitably attached to the bottom unsplinted portion of the cardboard filler. The latter comprises two superimposed elements each of which has a rear unsplinted portion engaged by the cover, as above mentioned, and a group of staggered and tipped splints adapted to be torn off in succession and to be employed as matches. The body of the paper cover extends around the heads of the splints to enclose the latter and is then tucked in beneath the doubled-back attaching end previously mentioned.

A general object of our present invention is to provide a machine for manufacturing match books of the foregoing character in a continuous and highly efficient manner.

A more particular object lies in providing a unitary machine whose continuous operation results in the continuous delivery of fully completed match books of the foregoing character. In other words, the employment of our machine involves nothing more than the supplying of stock from which the filler portion of the finished match books are made, the stock from which the paper cover blanks are made, and the several impregnating mediums which are involved in the course of manufacture. These elements being supplied or fed to the machine, the latter operates in a continuous and unitary manner to treat, cut, impregnate, and assemble the various components of the finished match book and to deliver fully completed match books in large quantities.

Before describing the details of our invention, we will premise that machines heretofore employed have all served to accomplish one or more isolated steps of manufacture. For example, certain machines have heretofore served to produce the filler portions of the match books, others have been employed for drying purposes and the like, and still others have served to assemble these component parts and to deliver the finished match books. In accordance with our present invention, the necessity for setting up and operating independently operated machines or instrumentalities is dispensed with, and the subsequent cost of manufacture has been materially reduced and the overall efficiency considerably increased.

Our machine is of necessity of a somewhat complicated nature, and we will therefore proceed to describe the same in a step by step manner. It will be understood that the details herein illustrated and to be described are of an illustrative character, serving to explain the general nature of our invention and the unitary character of our machine. Similarly, it will be obvious, as the specification is read, that a number of phases of our invention are not limited to the detailed construction to be described, but are of a far wider character and scope.

In the accompanying drawings, illustrating a machine which embodies the numerous generic and specific features of our invention, the numerous figures have been grouped in a manner which corresponds to the description which is to follow. The drawings may thus be specifically described as follows—

A. In general

Figure 1 is a diagrammatic side view of our entire machine showing the relative arrangement of the several component parts thereof;

Figure 1A is a perspective view of a completed match book of the character turned out by the machine of Figure 1;

B. The formation of splinted strips

Figure 2 is a view taken in the same direction as Figure 1, showing upon an enlarged scale the mechanism for cutting and similarly treating the match stock;

Figure 3 is a view taken from the right of Figure 2;

Figure 4 is a cross-sectional view upon an enlarged scale taken in the same direction as Figure 2, showing the treatment of the match stock in greater detail;

Figure 5 is a plan view of the mechanism shown in Figure 4;

Figure 6 is a cross-sectional view taken substantially along the line 6—6 of Figure 5;

Figure 7 is a fragmentary cross-sectional view taken substantially along the line 7—7 of Figure 6;

Figure 8 is a fragmentary cross-sectional view taken substantially along the line 8—8 of Figure 6;

Figure 9 is a cross-sectional view taken in the same direction as Figure 6 and subtsantially along the line 9—9 of Figure 10;

Figure 10 is a fragmentary cross-sectional view taken substantially along the line 10—10 of Figure 9;

Figure 11 is an enlarged fragmentary side view of the splint-staggering device;

Figure 12 is an enlarged cross-sectional view of the match stock, showing the manner in which the splints are staggered;

Figure 13 is a cross-sectional view taken substantially along the line 13—13 of Figure 11;

C. *The treatment of splinted strips*

Figure 14 is a plan view of the apparatus in which the splinted strips previously formed are treated with an impregnating medium;

Figure 15 is a side view of the apparatus of Figure 14;

Figure 16 is a cross-sectional view on an enlarged scale taken substantially along the line 16—16 of Figure 15;

Figure 17 is an enlarged cross-sectional view taken substantially along the line 17—17 of Figures 14 and 15;

Figure 18 is an enlarged cross-sectional plan view taken substantially along the line 18—18 of Figure 15;

D. *The formation and guidance of splinted lengths*

Figure 19 is a view taken from the right of Figure 1, showing the general arrangement of the drying unit and the apparatus for forming and guiding splinted lengths through a tipping apparatus;

Figure 20 is a view taken in the same direction as Figure 19 showing the manner in which one of the splinted strips is formed into splinted lengths;

Figure 21 is a diagrammatic representation of certain portions of the mechanism of Figure 20, this view being taken in the same direction as Figure 20;

Figure 22 is an enlarged detail view taken in the same direction as Figure 20;

Figure 23 is a view taken from the left of Figure 20;

Figure 24 is an enlarged detail view taken in the same direction as Figure 23;

Figure 25 is a view taken in the same direction as Figure 23 and showing certain mechanism omitted from the left end of Figure 23 because of lack of space;

Figure 26 is a plan view of certain of the mechanism shown in Figures 23 and 25;

Figure 27 is an enlarged detail view of the cutting device, taken in the same direction as Figure 20;

Figure 28 is a detail plan view of the cutting blades of Figure 27;

Figure 29 is a view taken in the direction 29—29 of Figure 25;

Figure 30 is a cross-sectional view taken substantially along the line 30—30 of Figure 29;

E. *The tipping of the splinted lengths*

Figure 31 is a plan view of one of the vats for tipping the splinted lengths;

Figure 32 is a side view of the same, this view being taken from the rear of Figure 19;

Figure 33 is a view taken in the same direction as Figure 32 showing certain of the parts on an enlarged scale, this view being taken substantially along the direction 33—33 of Figure 34;

Figure 34 is an end view taken from the left of Figure 32 and from the right of Figure 19;

F. *The drying of the splinted lengths*

Figure 35 is an elevational view taken from the left of Figure 19, showing certain details of the drying unit;

Figure 36 is a view taken in the same direction as Figure 35 on a slightly reduced scale, showing the adjustable heating mechanism;

Figure 37 is a detailed view of a portion of the heating mechanism taken from the left of Figure 36;

Figure 38 is an enlarged elevational view taken substantially in the direction 38—38 of Figure 36;

Figure 39 is a cross-sectional view taken substantially along the line 39—39 of Figure 38;

Figure 40 is a horizontal cross-sectional view taken substantially along the line 40—40 of Figure 38;

G. *The discharge of the dried splinted lengths from the drying unit*

Figure 41:
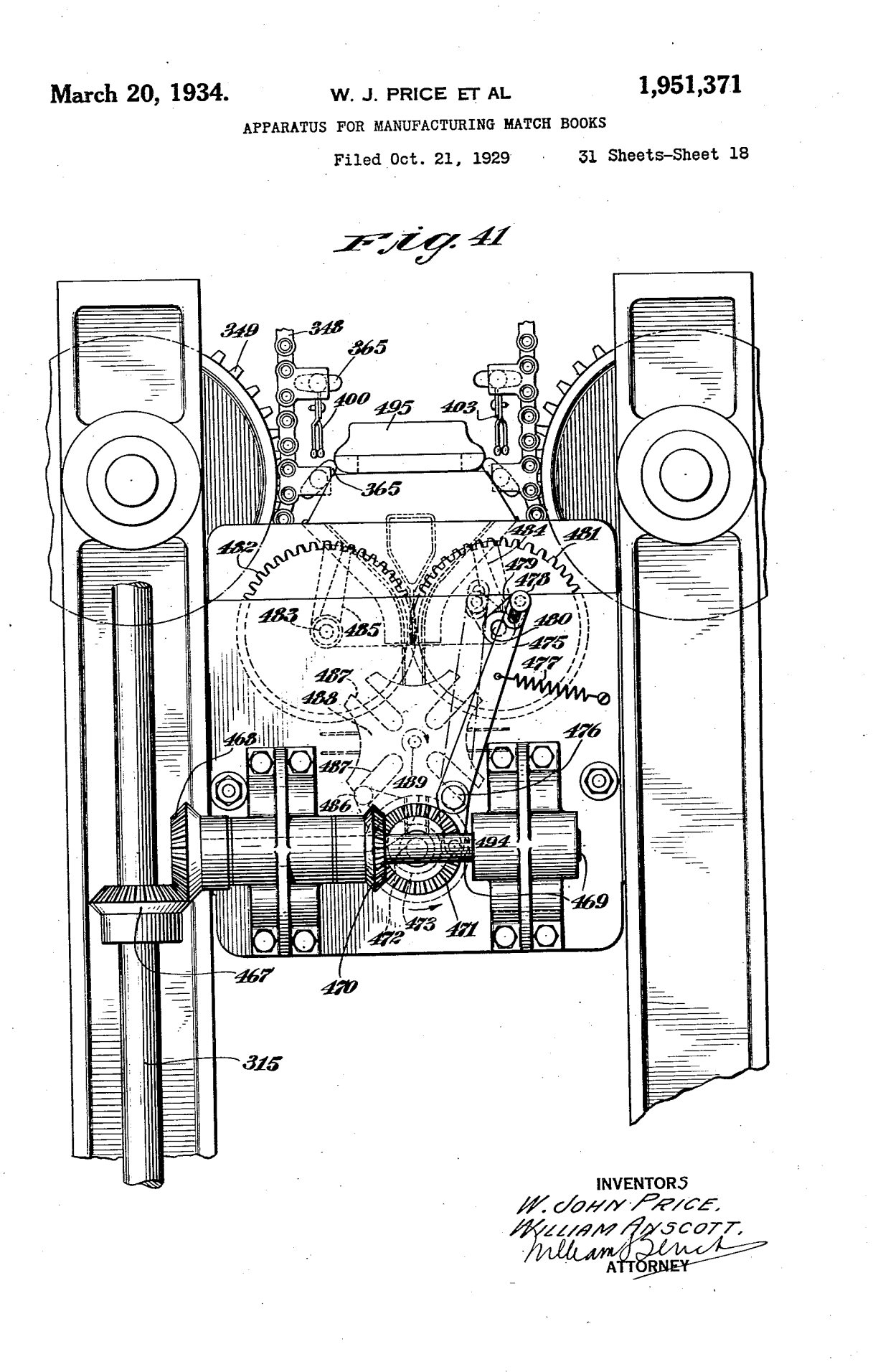

Figure 41 is an enlarged view taken in the same direction as Figure 19, showing certain of the mechanism for discharging the splinted and dried lengths in pairs from the drying unit;

Figure 42 is a view taken in the same direction as Figure 41 on a still larger scale, showing in cross-section the detailed manner in which the lengths are discharged;

Figure 43 is a fragmentary view taken in the same direction as Figure 42, showing one of the splinted lengths in the course of removal;

Figure 44 is a fragmentary plan view of Figure 43;

Figure 45 is a cross-sectional plan view taken substantially along the line 45—45 of Figure 42;

Figure 46 is a cross-sectional view taken substantially along the line 46—46 of Figure 45;

H. *The wrapping of the splinted lengths*

Figure 47 is a diagrammatic plan view of the main portion of the mechanism for wrapping the splinted lengths;

Figure 48 is a developed side view of each one of two of the tracks shown in Figure 47;

Figure 49 is a similar developed view of another one of the tracks shown in Figure 47;

Figure 50 is a developed view of the main central cam of Figure 47;

Figure 51 is a plan view of the rotatable table shown diagrammatically in Figure 47;

Figure 52 is a cross-sectional view taken substantially along the line 52—52 of Figure 51;

Figure 53 is a side view taken substantially along the line 53—53 of Figure 51;

Figure 54 is a cross-sectional side view taken substantially along the line 54—54 of Figure 51;

Figure 55 is an enlarged fragmentary plan view of one arm of the table of Figure 51 during the application of a cover blank;

Figure 56 is a similar view of the same arm during the application of the splinted lengths;

Figure 57 is a similar view of the same arm after the stapling operation;

Figure 58 is a similar view of the same arm during the discharge of the wrapped match book length;

Figure 59 is a cross-sectional view taken substantially along the line 59—59 of Figure 54 immediately after the procedure of Figure 56 has been accomplished. This view is also taken along the line 59—59 of Figure 56;

Figure 60 is a fragmentary end view of the portion immediately to the left thereof in Figure 59;

Figure 61 is a fragmentary perspective view of the bottom portion of Figure 59 in association with the track;

Figure 62 is a view similar to Figure 59 showing the parts in an advanced relationship;

Figure 63 is a view similar to Figures 59 and 62 showing the parts in a further advanced relationship;

Figure 64 is a similar view showing the parts in process of discharging the match book length;

I. *The cutting of the match book lengths into match books and the delivery of the latter*

Figure 65 is a side elevational view showing the essential elements of the cutting machine;

Figure 66 is an enlarged detail view taken in the same direction as Figure 65;

Figure 67 is an enlarged detail view, partly in cross-section, taken in the same direction as Figure 65;

Figure 68 is a fragmentary end view taken in the direction 68—68 of Figure 66;

Figure 69 is a fragmentary plan view of the mechanism of Figure 67;

J. *The packing of the match books*

Figure 70 is a view taken substantially in the same direction as Figure 65, showing part of the mechanism for packing the match books;

Figure 71 is an enlarged cross-sectional view taken substantially along the line 71—71 of Figure 70.

A. *In general*

In Figure 1, we have shown the relative arrangement of the several component parts of the machine. A supply of cardboard stock approximately three and one-half inches wide constitutes the material from which the filler portion of the finished match books will ultimately be made. This stock is fed first through a preliminary impregnating device which serves to impart to the cardboard stock a smooth and finished appearance and surface, and which enables the subsequent impregnation and treatment to achieve the desired ends with greater efficiency.

The impregnated stock then enters a machine which accomplishes what will hereinafter be termed "The formation of the splinted strips". In this machine, the cardboard stock is divided into two continuous strips, each of which has one edge formed into groups of staggered splints.

The two splinted strips are then given a further impregnation treatment, hereinafter referred to as "The treatment of the splinted strips", this impregnation serving to apply an additional coating of paraffin or the like for an extent of about one-half inch to each strip.

The splinted strips are then fed into a mechanism which accomplishes what will hereinafter be referred to as "The formation and guidance of splinted lengths".

The splinted strips are here severed into splinted lengths and the latter are successively applied to suitable carrying bars.

These bars transport the splinted lengths to a tipping apparatus, which is not visible in Figure 1, where each splint is provided with the well known ignitable tip.

The tipped splinted lengths are then passed through a drying unit suitably associated with a heating mechanism for efficiently drying the lengths and rendering them ready for application to the cover blanks.

Having been discharged from the drying unit, the dried and tipped splinted lengths are fed into a mechanism where they are wrapped or enclosed in cover blanks, and firmly stapled thereto. The operation of this mechanism results in match book lengths adapted to be severed into twelve completed match books; and this is accomplished by passing the match book lengths into a machine for cutting them and also delivering the completed match books in staggered relationship.

The completed match book which the operation of our machine produces is shown in Figure 1A and consists of the well-known cover blank which envelops the tipped and splinted cardboard filler, the cover blank having the shorter or narrower flap at one end and the longer or cover flap at the other end. The cover flap, as is well known, is adapted to be tucked beneath the shorter flap when the match book is closed, and to be opened up when one or more of the tipped paper matches is to be torn off. As is also well known, the shorter flap of the cover blank is coated with a suitable igniting material upon which the matches are struck. A staple extends through the coated shorter flap of the cover blank, through the unsplinted edge of the cardboard filler, and through the rear portion of the cover blank to hold the parts in proper assembly.

We will now proceed to describe in detail how the foregoing steps are carried out by the several elements of our machine, and will refer first to the manner in which the preliminarily impregnated cardboard stock is formed into splinted strips.

B. *The formation of splinted strips*

Referring to Figures 2 and 3, the impregnated cardboard stock 200 is fed over a guiding roller 201 into sandwiched relationship between the superposed pair of rollers 202, thence into successive sandwiched relationship between the superposed rollers 204 and 205. All of these roller pairs are arranged in a compact manner upon a suitable pedestal or the like 206 and serve to treat the stock entering this portion of the machine so as to provide a pair of opposed splinted strips suitable for further treatment.

The roller pairs 202—205 are suitably driven from the driving shaft 207 by means of the beveled gears 208, 209, the shaft 210, and the beveled gears 211 and 212. The latter is associated with a spur gear 213 and with the lower roller of the pair 202. The gear 213 meshes with the gear 214, the latter being mounted upon the shaft which carries the upper roller of the pair 202. The gear 214 meshes with an intermediate gear 215 which transmits its rotation to a gear 216. Meshing with the gear 216 is the gear 217.

The roller pair 204 is driven from the gear 217 by means of the intermediate gear 218 and the gear 219, the later driving the lower roller of the pair 204. The upper roller of the latter pair is driven by the gear 220 which meshes with the gear 219.

The roller pair 205 is driven from the shaft of the gear 216 by means of the sprocket wheel 221, the chain 222, and the sprocket wheel 223, the latter being mounted upon the shaft of the upper roller of the pair 205. Carried by the latter shaft is the gear 224 which meshes with the gear 225, the latter being mounted on the shaft of the lower roller of the pair 205.

The manner of driving as described above is most clearly observed in Figures 2 and 3, particularly with the aid of the arrows in Figure 2.

Referring now to Figures 4–10, we will describe the function and operation of the pair of superposed rollers 202.

The passage of the stock strip 200 through these rollers results in the formation of spaced groups of splints on each of the opposite edges of the stock strip 200, and also in the formation of two parallel rows of openings in the intermediate or central portion of the stock strip 200.

The upper of the rollers is designated in Figures 4 and 5 by the reference numeral 226. It has a width only slightly greater than the width of the stock strip 200, and it comprises the two outer serrated portions 227 and the medial unserrated portion 228.

The serrations of each of the portions 227 are arranged in groups of approximately ten, the spaces between such groups being occupied by rounded proturberances 229. Referring for the moment to Figure 8, we will point out that the lower complementary roller 230 is provided with similar serrations which are arranged in similar and complementary groups, the spaces between the latter groups being wholly unoccupied and defining the radial passages 231. Reference to Figure 8 will disclose how the sandwiched passage of the stock strip 200 between the serrated portions of these rollers will serve to cut each of the opposite edges of the stock strip 200 to provide spaced groups of splints. During the movement of the rollers 226 and 230, the protuberances 229 will successively enter the corresponding passages 231.

Aligned with the protuberances 229 on the roller 226 are the knife elements 232. Each of these knife elements has a pair of blades 233 arranged in alignment respectively with the inner edges of the serrated portions 227. In this way, the passage of the stock strip through these rollers will cause spaced portions of the stock strip to be severed completely, the gap remaining being exactly equal to the space which would have been occupied by two adjacent splints had the knives 233 been absent. The protuberances 229 serve to push the severed portions out of the plane of the stock strip 200 and into the passages 231.

In the unserrated central portion of the upper roller 226 there are arranged a set of punching projections 234. These projections are arranged in pairs, and each pair is circumferentially between each pair of adjacent protuberances 229. In the complementary lower roller, a set of openings 235 are provided into which the projections 234 pass as the rollers move. The circular portions of the stock punched out by these projections are caused to be discharged in a manner presently to be described.

The operation of the foregoing two rollers and their effect upon the stock strip 200 is most clearly observed in Figure 5, the central portion of this figure including an illustration of the nature of the strip 200 after its passage through these rollers. For example, referring to the central portion of Figure 5, it will be noted that the stock strip 200 has been treated to provide a longitudinal unsplinted midportion 236, spaced groups of outwardly disposed splints 237 on one longitudinal edge, similarly spaced and constructed groups of splints 238 on the opposite edge, a set of longitudinally spaced openings 239, and a set of similar longitudinally spaced openings 240. The openings 239 are arranged in a line substantially parallel to the openings 240. Each of the spaces 241 between the groups of splints is equal in width to the width of two splints.

Referring now to Figures 4 and 6, we will describe the mechanism for facilitating the discharge of the strip portions which have been severed from the stock by means of the knives 233, the serrations, the protuberances 229, and the projections 234.

The shaft 242 upon which the gear 213 is mounted is a hollow shaft, and the size of the bore increases perceptibly toward the rear of the machine, i. e., toward the right in Figure 6. This enlarged portion 243 of the hollow shaft 242 is provided with a group of rectangular passages 244 which form continuations of the passages 231 previously mentioned, and the portion 243 is similarly provided with a group of substantially circular openings 245 which form continuations of the openings 235 previously mentioned. The pieces to be discharged are thus forced initially into the interior of the shaft portion 243.

Within this interior, a worm conveyor 246 is continuously rotating, thereby serving to force the discharged strips into a chute 247 from which they are ultimately discharged. The conveyor 246 is carried by a shaft 248 which extends through the hollow shaft 242. The shaft 248 is driven from the rear of the machine, as seen most clearly in Figure 3 by means of a sprocket wheel 249 and a chain 250, the latter leading from a sprocket wheel 251 carried at the rear end of the shaft upon which the sprocket wheel 221 is mounted.

For the purpose of keeping the serrations of the rollers 226 and 230 continuously clean we provide a constantly rotating brush 252 which is mounted upon a shaft 253, the latter being driven from the rear of the machine by means of a sprocket wheel 254 and a chain 255. The chain 255 is driven by a sprocket wheel 256 carried by the shaft which carries the sprocket wheels 221 and 251.

The function and operation of the roller pair 204 is most clearly illustrated in Figures 4, 5, 11, 12, and 13, and lies in staggering the splints of each group. Two complementary rollers 257 and 258 are provided with longitudinally arranged ribs, as shown most clearly in Figure 5, so that as the stock strip passes between these rollers the splints of each group will be alternately forced into permanent position upwardly and downwardly. The operation of these rollers will be clear upon reference to Figure 11. Figure 12 is an enlarged detail view taken as a cross-section across the stock strip 200 to show the upward bending of one splint and the downward bending of an adjacent splint.

The function of the superposed rollers 205 is merely to sever the stock strip along a central longitudinal line as observed most clearly in Figure 5. A constantly rotating knife 259 is mounted in association with a suitable groove provided in the lower roller so that the passage of the stock strip beneath the knife and above the grooved roller will cause the medial severance or splitting of the splinted strips into spaced and similar portions. The necessity for driving the circular blade 259 at a considerable speed explains the reason for the fact that the knife 259 is driven by the chain 222 instead of by means of a continuation of the gear chain.

The foregoing description, in conjunction with the drawings relating to this portion of the machine, will now render clear the exact nature of the stock strip leaving the left-hand portion of Figure 2. The stock strip has been severed into identical and opposed strips each of which will hereinafter be referred to as a "splinted strip". Each of these splinted strips has a rear unsplinted portion provided with a row of longitudinally spaced openings (239 or 240); and each of the splinted strips has a forward portion cut and shaped to provide spaced groups of staggered splints.

C. *The treatment of the splinted strips*

Referring for the moment to Figure 1, it will be noted that the two splinted strips are rotated through 90° and separated from each other so that as they approach the portion of the machine presently to be described they are arranged in two spaced and parallel vertical planes, the splints extending downwardly.

In Figures 14–18, these two splintered strips are designated by the reference numerals 260 and 261.

The function of the apparatus illustrated in Figures 14–18 is to impregnate the ends of the splints for a distance of approximately one-half inch with an additional wax material. It will be recalled that the match stock was initially impregnated in its entirety. The present impregnation is a second treatment of this character and affects only the ends of the splints.

A pair of horizontally arranged wheels 262 and 263 are each provided with a set of recesses 264 arranged at spaced intervals around the circular peripheries of these wheels. The distances between the recesses 264 are equal to the distances between the openings 239 in the splinted strip 260.

An endless belt 265 extends around the wheels 262 and 263 and is provided with a set of spaced outwardly projecting pins 266. Each pin has a rearwardly projecting head adapted to enter any one of the recesses 264 as the belt travels around either of the wheels 262 and 263. This means that the pins 266 are similarly spaced by distances equal to the distances between the openings 239.

The wheels 262 and 263, along with the belt 265, are driven in any suitable manner, as for example, by means of the driving shaft 267 which carries the beveled gear 268, the latter meshing with a beveled gear 269 carried by the vertical shaft 270 upon which the wheel 263 is mounted.

A similar and corresponding set of wheels 271 and 272 is arranged at the forward portion of the machine, together with endless belt 273 provided with the projections 274. The latter projections are spaced by distances equal to the spaces between the openings 240 of the splinted strip 261.

The belt 273 may be driven by suitable gearing, as for example, from the spur gear 275 on the shaft 270 through the spur gears 276 to the spur gear 277, the latter being mounted upon the vertical shaft which carries the wheel 272.

Interposed between the wheels 262 and 271 are the guide rollers 278 and 279. These rollers are shown most clearly in Figure 17 and are provided with circumferential channels 280 adapted to permit passage of the projections 266 and 274 as the belts pass between the wheel 262 and the roller 278, on the one hand, and between the wheel 271 and the roller 279, on the other hand.

The strips 260 and 261 are threaded respectively between one of the rollers 278, 279 and the corresponding one of the wheels 262, 271. This is most clearly shown in Figure 17. During this passage of the strips 260 and 261, each of the latter is firmly engaged by the corresponding belt. Thus, the pins 266 are caused to enter the openings 239, and the pins 274 are caused to enter the openings 240. The strips 260 and 261 are thus carried in a continuous manner toward the left in Figures 14 and 15. After the strips pass beyond the wheels 263 and 272, they are released by the pins of the belts, as shown at the left ends of Figures 14 and 15.

Extending from the wheels 262, 271 at the right, to the wheels 263, 272 at the left, is a guiding plate 281 which is substantially flat and horizontal and which is provided with a longitudinal channel in each of its opposite longitudinal edges. These channels are shown most clearly in Figure 16 and permit the accommodation of the pins 266 and 274 during the transportation of the splinted strips from the right toward the left in Figures 14 and 15.

Also located between the wheel pairs at the right and left is an apparatus wherein a supply of molten wax or other impregnating material is suitably maintained in a molten condition and at a constant level so that as the strips 260 and 261 pass through this apparatus, the tips of the splints are thoroughly impregnated for the contemplated distance.

Thus, it will be seen that I have provided a tank having end walls 282 and 283, a bottom wall 284, and outer side walls 285 and 286, this tank being suitably mounted upon pedestals 287 or the like.

Extending from the bottom wall 284 is an inner tank or chamber having the end walls 288 and 289, and the side walls 290 and 291. This container is also provided with a top wall 292. The top wall 292 is not entirely flat, being provided with the upwardly extending portions 293 and 294 shown most clearly in Figure 15. The side walls 290 and 291 extend upwardly beyond the top wall 292, as the result of which two longitudinal channels 295 and 296 are provided. These channels are open at their opposite ends since the end walls 288 and 289 of the inner tank do not extend any higher than the top wall 292. Furthermore, the channels 295 and 296 are in communication through the space 297 (between the portions 293), and through the space 298 (between each portion 293 and its adjacent portion 294).

The parts are so positioned and arranged that the splinted strips 260 and 261 will pass respectively through the channels 296 and 295 with the extreme ends of the splints barely clearing the upper surface of the wall 292.

Molten wax is caused to fill the channels 296 and 295 and a constant predetermined level is maintained by controlling the rate at which the wax is fed to these channels. In the illustrated form, I have shown a pipe 299 opening downwardly into the space 297, whereby the wax pours downwardly as shown most clearly in Figure 16, spreading sideways into the channels 295 and 296. The wax flows out of the channels through the opposite ends thereof as indicated by the arrows 300, thereby collecting in the outer tank, and more particularly, in the space surrounding the inner tank or chamber. The wax is drawn off through a pipe 301 which leads to a suitable pump 302, the latter returning the supply of wax to the pipe 299 as indicated clearly by the arrows. The pump 302 may be driven in any suitable manner, and I have illustratively shown a separate motor 303 for this purpose.

The wax is maintained in a constantly molten condition by filling the inner tank or chamber with steam, this steam being supplied through the bottom wall 284 by means of a conduit or pipe 304, and is led off by a similar pipe 305. It is to be noted that the steam heats not only the side walls 290 and 291 and the end walls 288 and 289, but also the top wall 292 and the walls of the upwardly extended portions 293 and 294. Where desired, additional wax may be supplied in a similar manner at the points 298.

The splinted strips 260 and 261 having thus been impregnated for a distance of approximately one-half inch from the ends thereof, they are guided from the left of the apparatus just described and are caused to diverge, as shown most clearly in Figure 14, preparatory to entering the apparatus which severs them into splinted lengths, each length having approximately twelve groups of splints. This apparatus will now be described.

D. The formation and guidance of splinted lengths

Referring for the moment to Figure 19, we will state that the apparatus therein illustrated is designed to receive the two splinted strips, sever them into separate splinted lengths, guide these lengths through apparatus designed to place the ignitible tips upon the splints, carrying the tipped splinted lengths through a drying unit, and finally deliver the dried lengths to an apparatus for associating them with the cover blanks.

It is understood that suitable framework is provided throughout, and no specific reference is had to the same except where it relates to the construction and operation of the apparatus.

We will refer first to the horizontal shaft 306 which is the same shaft as that designated by the reference numeral 207 in Figure 2. The motive power may advantageously be applied to this shaft. For driving the mechanism of the apparatus illustrated in Figure 19, the shaft 306 is provided with a beveled gear 307 meshing with a gear 308 mounted upon a horizontal transverse shaft 309. The latter carries a beveled gear 310 which drives a shaft 311 parallel to and to the rear of the shaft 306, the shaft 311 being the same shaft as that designated 267 in Figure 14. The shaft 309 also carries the beveled gear 312 which meshes with a similar gear 313 mounted upon a shaft 314 parallel to the shaft 306.

The apparatus of Figure 19 is substantially symmetrical about a medial vertical line, each half being designed to operate upon one of the splinted strips. Accordingly, a description of either half of this apparatus, wherever such detailed description occurs hereinafter, will be deemed a description at the same time of the corresponding other half.—Before describing such details, we will point out, however, that the driving force of the shaft 306 is transmitted to the apparatus of Figure 19 by means of the vertical shaft 315, the latter deriving its power from the shaft 309 through the beveled gears 316 and 317. The shaft 315 terminates at its upper end in a beveled gear 318 which meshes with the two opposed and separate beveled gears 319 and 320. The gear 319 is mounted on the horizontal shaft 321 extending toward the left and carrying the worm 322, the latter driving a worm wheel mounted upon the shaft 323 and rotating the latter in a clockwise direction as the same is viewed in Figure 19. The gear 320 is mounted upon a similar shaft 324 extending toward the right and carrying the worm 325, the latter driving a worm wheel on the shaft 326 and causing the latter to rotate in a counter-clockwise direction. It will be understood that the particular arrangement of driving shafts and gears, as illustrated herein, may be altered at will and has no vital significance with respect to our apparatus as a whole.

The strips 260 and 261 may be seen entering the apparatus of Figure 19 at the right and left of the center line thereof and the manner in which these strips are received and subsequently treated will now be described with particular reference to the strip 261.

Figure 20 is taken in the same direction as Figure 19 and illustrates more clearly the manner in which the strip 261 is guided past the left periphery of a horizontally mounted wheel 327 mounted upon a vertical shaft 328. The wheel 327 is driven intermittently in a manner presently to be described.

Referring for the moment to Figures 25 and 26, we will point out that the wheel 327 is in the nature of a sprocket wheel and constitutes one of a pair of such wheels, the complementary wheel designated by the reference numeral 329 being mounted upon a vertical shaft 330. Extending around the wheels 327 and 329 is an endless chain 331, certain uniformly spaced links of which are provided with the upstanding arms 332. Each of these arms is provided with an outwardly projecting pin 333 very similar to the pins previously described in connection with the chains 265 and 273. The arms 332 are so spaced that the pins 333 will enter the openings 240 in the strip 261, but it is to be particularly noted that these pins enter only alternate openings 240.

Mounted adjacent to the wheel 327 is a guide roller 334 similar to the guide roller 279 of Figure 17. The strip 261 passes between the roller 334 and the wheel 327 in the manner shown most clearly in Figure 26 and the chain is driven until the left end of the strip 261 reaches a point closely adjacent to the wheel 329, at which time the chain stops moving and the mechanism now to be described becomes operative.

Adjacent to the wheel 327 we provide a pair of complementary cutters or blades 335 and 335', and as soon as the strip has stopped moving these cutters become operative to cut off that length of strip which lies to the left of the cutters as viewed in Figure 26. The operation of these cutters is most clearly illustrated in Figures 23, 27, and 28. The cutter 335 is pivoted to an arm 336 mounted on the forward side of the web 337 forming part of the supporting structure. This web is provided with an opening 338 and a bolt or similar fastening device 339 extends through the opening 338 and firmly secures a midportion of the arm 336 to the upper end of a lever 340 positioned on the other side of the web 337. A fixed pivot pin 341 extends through the web 337 into association with both the lower end of the arm 336 and a midportion of the arm 340. In this way, an oscillation of the arm 340 will cause a corresponding oscillation of the cutter 335. More particularly, it is to be noted that the arm 336 is normally held toward the right (in Figure 27) by means of the spring 342, and that a cam 343 mounted upon the shaft 306 actuates a follower 344 on the lower end of the lever 340 to counteract the action of the spring 342 at periodic intervals.

The cutter 335' is mounted upon an arm 345 similar to the arm 336, and the arm 345 is fixedly pivoted at its midportion 346 and has its lower end linked by the element 347 to the arm 336. In this way, the oscillation of the lever 340 causes the cutters 335 and 335' to work simultaneously toward each other at predetermined times to sever the strip 261.

Simultaneously with the cutting of the splinted length (which is the term hereinafter to be applied to the lengths of splinted material severed by the cutters 335 and 335'), mechanism becomes operative to remove the splinted length from the chain 331 and transfer it to one of a series of carriers. These carriers are provided on uniformly spaced links of a relatively long and endless chain 348 which extends downwardly from the upper part of the device around a sprocket wheel 349. The path of travel of the chain 348 is clearly shown in Figure 19, and we will point out that after passing from the center of the device toward the left and around a sprocket wheel 350, this chain travels upwardly and around a sprocket wheel 351 mounted upon the shaft 323 previously referred to. Thereafter, the chain 348 travels downwardly and upwardly through the drying unit and successively around the sprockets 352—359 inclusive, thence downwardly again toward the sprocket 349 as shown in Figure 20. We have shown the sprocket 354 provided with a take-up device 360 for controlling the tautness of the chain 348.

Although we have referred to the chain 348 in the singular, and have similarly referred to the several sprockets as though they were singular, the chain is, as a matter of fact, composed of two parts, as shown most clearly in Figure 23, and each sprocket is similarly composed of two component sprocket wheels mounted upon a common connecting shaft. For example, in Figure 23, it is clearly shown that the left and right portions of the sprocket 349 are mounted upon the common intermediate shaft 361.

The two portions of the chain 348 are spaced from each other by substantially the length of the splintered material severed by the cutter previously mentioned, and the carriers previously referred to consist of bars 362 extending transversely between the spaced portions of the chain. Thus, in Figure 23, we have shown one of the bars 362 provided at its opposite ends with the journal portions 363, each of which passes through a bearing 364 carried by one of the chain portions. On the outside of the bearing 364 the journal portion 363 alters its shape and becomes substantially elliptical as shown in Figure 20, these elliptical ends being designated in Figure 20 and elsewhere by the reference numeral 365.

The bars 362 are provided with a set of depending fingers 366, each of which has a pin 367 similar to the pins 333, and the fingers 366 are spaced by distances exactly equal to the distances between the arms 332. The fingers 366 are so positioned, however, that when the chain comes to rest the fingers 366 will be exactly between the arm 332, and the pins 367 are therefore adapted to enter the vacant openings 340 in the splinted length.

Each of the bars 362 is further provided with an additional set of fingers 368 arranged in pairs and devoid of the pins 367. The fingers 368 are so positioned that each pair thereof will sandwich one of the arms 332 when the chain 331 comes to rest.

Between the sprockets 349 and 350 we arrange a pair of guideways for the elliptical portions 365. Each of these guideways consists of two spaced plates 369 shown most clearly in Figures 20 and 23, and these plates are separated from each other by a distance substantially equal to the small axis of each of the elliptical portions 365. Accordingly, as seen most clearly in Figure 20, the bars 362 are retained in a position wherein the depending fingers 366 and 368 are substantially vertical, during the passage of the bars from the sprocket 349 to the sprocket 350. After the bars leave the sprocket 350, they are already carrying the splinted lengths and the weight of each of the latter is sufficient to keep its corresponding bar 362 in the same position throughout the travel of the latter.

In addition to the foregoing mechanism, we provide upon the shaft 361 of the sprocket 349 a cam wheel 371 which actuates a follower 372 at periodic intervals. The follower 372 is mounted upon the rear end of a gear segment 373 journaled at its midportion 374. A spring 375 serves to hold the follower 372 against the periphery of the cam wheel 371. The segment 373 meshes with a gear 376, and the latter meshes in turn with a similar gear 377 on the shaft 378 of which a set of arms 379 are provided for facilitating the transfer of the splinted lengths from the chain 331 onto the bars 362.

Each of the arms 379 is provided at its end with a fork 380 adapted to cooperate with one of the pins 367. The shaft 378 is oscillated by means of the segment 373 between the full-line position of Figure 20 and the dotted position shown in this figure.

From the description given, the operation will be clear. The chain 331 having stopped moving, the advancement of the chain 348 brings one of the bars 362 forwardly against the rear of the splinted length. The pins 367 enter the vacant holes 240, and at the same time the arms 379 move downwardly and facilitate the passage of the pins 367 through these vacant holes. The arms 379 then are withdrawn and the continued forward movement of the bar 362 causes it to carry with it the severed splinted length. The fingers 368 on each side of the pins 333 facilitate the removal of the splinted length from the latter pins. As a result, a complete transfer will have been effected from the chain 331 to one of the bars 362, and in the succeeding movements of the bar 362, the splinted length will be carried along for further treatment. During its passage from the sprocket 349 to the sprocket 350, the vertical disposition of the splinted length will be assured by the guidance of the elliptical portions 365 in the guideways 369, and thereafter the weight of every splinted length will serve to retain its vertical disposition. This procedure is diagrammatically illustrated in Figure 21, an empty carrier being shown at the right advancing toward the chain 331 on which a splinted length is supported, and the same splinted length being shown at the left after it has been withdrawn from the pins 333 and transferred to the pins 367. In Figure 22, the cooperation between one of the arms 379 and one of the pins 367 is clearly shown. In Figure 23, all of the arms 379 are in their operative positions, effecting a transfer of the splinted length which has just been cut along the line 381.

In Figures 25, 29, and 30, we have illustrated the means for causing an intermittent operation of the sprocket wheels 329 and 327. A gear 382 mounted on the shaft 361 drives a relatively smaller gear 383 which is mounted on a shaft 384 which carries also a gear 385. The latter meshes with a gear 386 on the shaft 387 of which a Geneva movement gear 388 is mounted. The latter has a central cutaway hub 389 and a peripheral roller 390, and cooperates with a Geneva gear 391 provided with the arcuate peripheral recesses 392 and the elongated recesses 393. When the roller 390 enters one of the elongated recesses 393, it rotates the gear 391, and at alternate times the hub 389 engages within one of the arcuate recesses 392 and holds the gear 391 against rotation. In Figure 29, the full-line representation shows the gear 391 held against rotation, and the roller 390 is shown in dotted lines in the position it assumes when cooperating with one of the recesses 393. The gear 391 is mounted upon a shaft 394 which carries a relatively large spur gear 395 meshing with and driving a smaller spur gear 396. The latter is on a shaft 397 carrying at its end a beveled gear 398, the latter meshing with a beveled gear 399 on the shaft 330 of the sprocket 329. The Geneva movement is so designed that the chain 331 will travel through a distance equal to the length of splinted material to be cut into a splinted length, and so that the chain 331 will discontinue its movement for a sufficient period of time to allow one of the bars 362 to come from behind and pick off the severed splinted length.

Again referring for the moment to Figure 19, it will be seen that the series of splinted lengths designated in this Figure and hereinafter to be referred to by the reference numeral 400 encounter during their passage from the sprocket 349 to the sprocket 350 a mechanism designated generally by the reference numeral 401. This is the apparatus which tips the splints with the ignitible material, and this apparatus will now be described. However, to emphasize the symmetry of the device, the detailed description of the tipping apparatus will be given in connection with the right-hand apparatus designated generally by the reference numeral 402. The splinted lengths 403 carried to and past the apparatus 402 have been severed from the initial splinted strip 260 in the same manner as that above described in connection with the splinted strip 261.

E. The tipping of the splinted lengths

Mounted in any suitable manner upon a foundation 404 is a double-chambered vat most clearly illustrated in Figures 32 and 34. This vat has an outer bottom wall 405 and upstanding outer walls 406, and also a top wall 407.

Within this outer vat is an inner chamber having a bottom wall 408 and upstanding side walls 409. The top wall 407 above referred to extends no further than the upstanding wall 409, thereby leaving the inner chamber open at the top.

The material with which the splinted lengths are to be tipped is contained within the inner chamber and steam is caused to pass through the outer chamber so as to keep this material in a suitable plastic condition. We have illustratively shown how the steam may enter the outer chamber by means of an inlet pipe 410 and leave the same by means of an outlet pipe 411. A drip pipe 412 may also be provided.

The material in the inner chamber is constantly agitated by means of two paddle wheels or the like 413 and 414 mounted for rotation about vertical axes and positioned closely adjacent to the bottom wall 408 of the inner chamber. Thus, the wheel 413 is mounted on the lower end of a vertical shaft 415 journaled at the top in a bearing 416, and the wheel 414 is mounted on the lower end of a similar vertical shaft 417 journaled at the top in a bearing 418.

Extending transversely across the inner chamber is a drum 419 constantly rotated in the direction of the arrow of Figure 32 by mechanism presently to be described. This drum is mounted upon a horizontal shaft 420 suitably journaled at its opposite ends, and at such a height that the lower portion of the drum 419 dips constantly into the tipping material. The drum is of such a size and is so positioned that the splinted lengths approaching the same, as shown most clearly in Figure 33, will pass tangentially across the drum, barely touching the latter.

The drum 419 and the paddle wheels 413 and 414 are driven by means of a chain 421 leading from the shaft of the sprocket wheel 349 previously mentioned. The latter shaft, as will be remembered, was caused to rotate by the movement of the chain 348 passing around it. The chain 421 drives a sprocket wheel 422 mounted upon a shaft 423 parallel to and a little beneath the shaft 420. A gear 424 on the shaft 423 meshes with a similar gear 425 on the end of the shaft 420. Also mounted on the latter shaft is a beveled gear 426 meshing simultaneously with the two lateral beveled gears 427 and 428. The gear 428 is mounted upon a shaft 429 and causes a driving of the wheel 413 by means of the beveled gears 430, 431, 432, and 433. Similarly, the beveled gear 427 drives the paddle wheel 414 through the shaft 434 and the beveled gears 435, 436, 437, and 438.

The periphery of the drum 419 is provided with a set of axially parallel grooves 439 which facilitate the picking up, by this drum, of the material in the inner chamber. Upon reference to Figures 33 and 34, it will be seen that this material forms a small film 440 on the outside of the drum 419 as the latter emerges from the chamber. Mounted adjacent to the drum 419 at the point at which it emerges, we provide a plate 441 which serves as a doctor for the purpose of limiting the thickness of the film 440 to a predetermined uniform amount. This thickness is such that when the splinted lengths 403 pass over the top of the drum 419, the extreme tips of the splints will pass through the film 440 and will pick up certain of the material to form the well known ignitible tips designated in Figure 33 by the reference numeral 442.

The splinted lengths having thus been tipped, they now continue on their passage around the several sprocket wheels previously described and enter the drying unit proper, which will now be described.

F. The drying of the splinted lengths

In Figure 35, the splinted strip 261 may be seen at the lower right-hand corner entering the mechanism which severs this strip into the splinted lengths 400. In this figure may also be seen the vertical shaft 315 carrying at its upper end the beveled gear 318 meshing with the beveled gear 319, the latter serving to rotate the worm wheel mounted upon the shaft 323.

At the lower portion of this figure may also be seen the guideways 369 and between them the elliptical portions 365 of the bars 362. Upon reaching the left ends of the guideways 369 (as viewed in Fgure 19), the splinted lengths 400 are guided around the sprocket wheel 350 and thence upwardly toward the sprocket wheel 351.

The take-up device designated generally by the reference numeral 360 in Figure 19, and associated with the sprocket wheel 354, is shown in greater detail in Figure 35. The shaft of the sprocket 354 is journaled at its ends in bearings 443 adjustable vertically in guideways 444. This adjustment is effected by means of the fingers 445 bearing downwardly upon the bearings 443 and mounted for vertical adjustment upon the screw-threaded shanks 446. Each of the latter carries at its upper end a beveled gear 447 adapted to be rotated by a beveled gear 448, the latter being mounted upon a horizontal shaft 449 which carries at its ends a hand-wheel 450. By adjustment of the hand-wheel 450, the shanks 446 may be rotated by any desired amount, thereby shifting the fingers 445 downwardly or upwardly and thereby shifting the bearings 443 accordingly and effecting a tightening or loosening of the chain 348.

In passing through the drying unit, the splinted and tipped lengths are subjected to the treatment of air heated to any desired degree. In Figure 36, we have shown the general arrangement of a heating mechanism which consists of a motor 451 driving a fan or blower 452. The inlet of the latter communicates with a chamber 453 through which the air is caused to be drawn from the right of Figure 36. The heated air is blown downwardly by the fan 452 into a conduit 454 which splits into the two parts 455 and 456, as shown most clearly in Figure 37. The part 455 communicates with the right portion of the drying unit as viewed in Figure 19, and serves to supply the air to the splinted lengths 403; whereas the conduit 456 supplies the heated air to the splinted lengths 400. A valve or deflecting plate or device 457 is so mounted at the juncture of the conduit portions 455 and 456 that the adjustment thereof by means of a hand-controlled lever 458 or the like will direct the air into one or the other or both of the drying unit halves.

The motor 451 and the other portions of the heating mechanism are preferably mounted upon a suspended platform or the like 459, whereas a control bar 460 extends downwardly into an accessible position.

In Figures 38–40, we have shown some of the details of the heating mechanism. The chamber 453 through which the air enters the fan or blower 452 is divided into upper and lower portions by the horizontal partition 461. Beneath the latter are the perforated chambers 462 within which a set of steam pipes or the like are mounted. For example, steam may be admitted to these pipes through an inlet conduit 463 and may be drawn off through an outlet conduit 464.

The control bar 460 is articulated to a louver plate or valve 465 pivotally mounted at the inlet end of the upper part of the chamber 453, and also to a set of complementary louver plates 466 pivotally mounted at the inlet end of the lower portion of the chamber 453. These valves or plates are so mounted that when the plates 466 are opened, the plate 465 approaches a closed position, and vice versa. Thus, in Figures 38–40, we have shown the plates 466 completely closed and the plate 465 completely opened, whereby air will be drawn only through the upper portion of the chamber 453. By adjusting the rod 460, any desired relative closures may be effected so as to heat the air to any desired degree. For example, the rod 460 may be shifted upwardly to a point where, if desired, the plate 465 might be entirely closed and the plates 466 entirely opened, whereby any air entering the drying unit will first be caused to pass over the heating coils in the lower portion of the chamber 453.

G. *The discharge of the dried splinted lengths from the drying unit*

In Figure 41, we have shown the lower portion of the vertical shaft 315. Mounted upon this shaft is a beveled gear 467 meshing with a similar gear 468, the latter being mounted upon a horizontal shaft 469. The intermeshing of a gear 470 with a beveled gear 471 serves to constantly rotate a shaft 472 extending rearwardly as viewed in Figure 19 and Figures 41 and 42. Mounted upon this shaft is a cam 473 and also the actuating portion of a Geneva movement presently to be described.

The cam 473 acts upon a follower 474 mounted upon the lower end of a lever 475 pivoted at 476 and normally held in the full-line position of Figure 41 by means of the spring 477. The free end of the lever 475 is slotted and engages with a pin 478 carried on the end of a small crank 479 mounted upon a shaft 480. Carried by the shaft 480 is a gear 481 which meshes with a similar gear 482 symmetrically positioned, the latter being mounted upon a shaft 483 parallel to the shaft 480.

The purpose of the cam arrangement just described is to oscillate the shaft 480 through a counter-clockwise arc of about 90° at predetermined times, and the purpose of the gearing 481—482 is to accomplish a similar oscillation, through a clockwise arc, however, of the shaft 483. Thus, the extreme left-hand position of the lever 475 has been shown in dot and dash lines in Figure 41.

The purpose of oscillating the shafts 480 and 483 is to produce a similar arcuate movement at predetermined times of the radial fingers 484 and 485 carried respectively by these shafts.

The Geneva gear carried by the shaft 472 is provided with the customary roller 486 which engages successively in the elongated recesses 487 of the Geneva gear 488 mounted for rotation upon a shaft 489, the latter being positioned slightly above the shaft 472 and parallel to the latter.

The foregoing movements will be more clearly understood after reference is had to Figures 42–44. Mounted upon the shaft 489 is a device which consists of four identical radial chambers 490, 491, 492, and 493. Before describing the other mechanism of Figure 42, we will point out that this device is intermittently rotated through 90° so that the chambers 490–493 are successively positioned in the receiving position (occupied by the chamber 490 in Figure 42) and the discharge position (occupied by the chamber 491 in Figure 42).

At the left of Figure 42, we have shown the sprocket wheel 349 previously described, particularly in connection with Figure 20. The chain 348 is moving downwardly around the wheel 349 after having completed its travel through the drying unit. One of the splinted lengths 400 is shown in a vertical position after having been completely dried and ready to be discharged. At the right of Figure 42 we have shown the corresponding mechanism of the right-hand portion of the drying unit, one of the dried splinted lengths 403 being shown in a symmetrical position.

Between the sprocket wheel 349 and the corresponding sprocket wheel of the right-hand portion of the drying unit we provide a fixed comb-plate 494 provided with the upstanding flanges 495 so positioned as to be encountered by the elliptical ends 365. Only one of the flanges 495 is shown in Figure 42 because of the fact that this view is a cross-sectional view.

On each side of the plate 494 we provide recesses 496 (see Figure 44) and also fingers or comb-teeth 497. The recesses 496 and the teeth 497 are so positioned that the depending fingers of each of the bars 362 may pass freely through the recesses 496. The teeth 497 are so positioned that one of the pinned fingers 366 will pass between each pair of the teeth 497. Thus, in Figure 44, the rear end of one of the pins 367 is shown.

As each of the bars 362 approaches the comb-plate 494, the corresponding elliptical ends 365 impinge upon the flanges 495 and swing the bar 362 into the oblique position shown in Figures 42 and 43. The commencement of this swing is shown in Figure 42 and the condition which exists after the bar has been swung still further is shown in Figure 43. The swinging movement is enabled to take place because of the registry between the fingers on the bar 362 and the recesses 496 of the comb-plate 494. It is obvious, however, that as each bar 362 is swung through the position of Figure 42 and into the position of Figure 43, the comb-teeth 497 will be cause to bear against the rear marginal portion of the splinted length 400. The continued swinging of the bar 362, coupled with the downward movement of the chain 348, results ultimately in forcing the splinted length 400 off of its bar 362. In Figure 43, one of the splinted lengths 400 is shown almost discharged from the pins 367. As soon as each splinted length has been thus discharged, and as soon as the corresponding bar 362 has moved downwardly past the plate 494, the bar 362 will again resume its normal position as shown in Figure 42, in which condition it is ready to pick up another splinted length as heretofore described in connection with Figure 20. (In Figure 20, the bars 362 passing downwardly around the sprocket 349 are shown empty for the purpose of simplicity. It will now be understood that these bars are actually carrying dried splinted lengths and are discharging them in the manner above described as they pass downwardly around the sprocket 349.)

The splinted length discharged from its bar 362 falls downwardly into a chute 498 whose lower end is positioned immediately above the chamber 490. A similar chute 499 receives the splinted lengths 403 as they are discharged from their corresponding engagements. The chutes 498 and 499 are provided with slots 500 and 501, permitting movement therethrough of the radial fingers 485 and 484 respectively. The movement of the radial fingers is indicated by dot and dash lines in Figure 42, and the purpose of the downward movements of these fingers is to force the two splinted lengths 400 and 403 simultaneously and in alignment with each other into the chamber 490 respectively positioned therefor. In the chamber 490, for example, we have shown a pair of splinted lengths snugly arranged side by side after having been guided into this position by the combined action of gravity and of the fingers 485 and 484.

While the fingers 485 and 484 are retracting to their normal positions shown in full lines in Figure 42, and while the next splinted lengths are in the course of being discharged by the comb-plate 494, the device mounted upon the shaft 489 is rotated by means of the Geneva movement, previously described, through 90°. This not only positions the empty chamber 493 in the receptive position previously occupied by the chamber 490 (ready to receive the next pair of splinted lengths), but it also advances the filled chamber 490 into the discharge position occupied in Figure 42 by the chamber 491.

Immediately upon reaching the discharge position above referred to, a set of friction rollers 501 (constantly rotating) engages the rear unsplinted portion of the splinted pair and forces it longitudinally and edgewise out of the chamber 491, as shown most clearly in Figure 45. To accommodate the rollers 501 and at the same time to permit continued intermittent rotation of the shaft 489, each of the chambers 490-493 is provided with the marginal recesses 502 shown in Figures 42 and 45.

In Figure 45 we have shown the manner in which the pair of splinted lengths is discharged from the chamber 491 and caused to pass through an intermediate guiding device 503 prior to its transfer to the cover blank. The device 503 does not rotate and is merely a chamber aligned with the chamber 491 (or with any of the other rotatable chambers as they successively come into the discharge position). The set of fixed rollers or pins 504 serve to guide the splinted lengths along one edge, and a set of spring-pressed pins 505 serve to guide the tipped edge of the splinted lengths. Friction rollers 506 extend upwardly into the guiding chamber 503 to advance the splinted lengths therethrough; and a set of pressure rollers 507 extend downwardly into the chamber 503 but are not positively rotated.

The rollers 501 and 506 are driven from any suitable source of power by means of the thong or belt 508 mounted upon the shaft 509 of one of the rollers 506. From the shaft 509, a series of belts or thongs 510 connect the several driven rollers and cause them all to rotate simultaneously.

Having passed through the guiding device 503, the two superposed splinted lengths are fed onto the table shown at the left of Figure 45 at predetermined times, as will be now described.

H. The wrapping of the splinted lengths

Before describing the details of the numerous mechanical operations relating to the wrapping of the splinted lengths, we will refer generally to the figures relating to this mechanism and outline the procedural steps accomplished thereby.

In Figure 47, we have shown a more or less diagrammatic plan view and a rotatable table which is provided with four radial arms or platforms upon which the wrapping is accomplished. This table rotates intermittently through 90° so as to position the radial platforms successively in four positions.

In Figure 47, we have designated these positions by the procedure therein accomplished respectively. Thus, in the position at the right we have designated the "cover feed position", which means that at this position a cover blank is fed onto the platform. At the bottom of Figure 47 is the "match feed position", at which point the superposed splinted lengths discharged toward the left in Figure 45 are laid upon the cover blank previously applied to the platform at the "cover feed position". At the left of Figure 47 is the "stapling position". Between the match feed position and the stapling position, the mechanism becomes operative to wrap the cover blank around the splinted lengths, so that when the stapling position is reached, the application of staples permanently attaches the cover blank in final wrapped condition around the splinted lengths, thereby forming a match book length ultimately severable into twelve individual and finished match books. At the top of Figure 47 is the discharge position, at which point the match book length is removed from the radial platform in an edgewise manner and transmitted to the cutting instrumentality hereinafter to be described.

The steps outlined in the preceding paragraph may be traced in a general way upon reference, for the moment, to Figures 59, 62, 63, and 64. In Figure 59, the mechanism is about to enclose the splinted lengths with the cover blank, this procedure being initiated at the match feed position and being completed as shown in Figures 62 and 63 by the time the stapling position is reached. In Figure 64, the stapled match book length is being longitudinally discharged from its supporting platform.

The rotatable table is illustrated in Figures 51 and 54. It is mounted upon a vertical shaft 511 deriving its intermittent movement from a Geneva gear arrangement shown most clearly in Figure 54. On the shaft 511 is the Geneva wheel or gear 512 provided with the customary elongated recesses 513. Cooperating with this gear is the Geneva actuating wheel or gear 514 mounted upon a vertical shaft 515. The gear 514 is provided with the roller 516 which successively enters the elongated recesses 513 as the wheel 514 rotates. The drive of the shaft 515 may be traced back through the beveled gears 517, 518, the shaft 519, the beveled gears 520 and 521, and the shaft 522 extending toward the bottom in Figure 51 and toward the left in Figure 54. The shaft 522 is therefore parallel to the travel of the splinted lengths in Figure 45, hence perpendicular to the plane of Figure 19.

At the top of the shaft 511 is the table previously referred to, comprising the hub 523 from which the four platforms radiate. The table is supported in its rotation by two sets of roller bearings, one set 524 being positioned beneath the hub 523, and the other set 525 being positioned beneath the periphery of the table. At this periphery, a circumferential ring 526 connects the outer ends of all the radiating platforms, thereby lending the necessary strength to the construction. The roller bearings 524 and 525 are suitably supported upon a foundation illustrated most clearly in Figure 53 and at the right of Figure 54, designated generally by the reference numeral 527 and supported by the standards 528. The various webs, bolts, and similar structural parts will not be specifically referred to inasmuch as they are unessential so far as the present invention is concerned.

The top of the foundation 527 above referred to is shaped like a huge bowl, and on the bottom 529 of the latter are three circumferential tracks upon which three corresponding rollers carried by each of the radial platforms ride during the rotative movement of the table. The inner track (see Figure 47) is designated by the reference numeral 530 and its side development is shown in Figure 49. On this track the roller 531 rides, and since the movement of the table is clockwise as viewed in Figure 51, this roller travels toward the left as viewed in Figure 49. The development of Figure 49 (and also of Figures 48 and 50) commences at the radial line A—A of Figure 47. As viewed in Figure 54, the roller 531 is traveling away from the observer.

The two outer tracks are designated in Figure 47 by the reference numerals 532 and 533 and are identical so far as their functions are concerned. The development of the track 533 is shown in Figure 48. Riding on this track is the roller 534, and riding on the track 532 is the roller 535.

Immediately beneath the roller bearings 524 and fixedly associated with the vertical bearing of the shaft 511 is the horizontally arranged cam 536. Since this cam accomplishes certain functions which cooperate with the functions of the tracks 530, 532, and 533, we have shown a development of the cam 536 in Figure 50, but this development is slightly different from that of the tracks 530 and 533 because of the obvious difference in operative nature of the cam 536. In Figure 50, the base line 537 is the development of a control having its center at the center of the shaft 511, and the different distances of the cam periphery radially from the center of the cam are shown in Figure 50.

Before describing the functions of the foregoing tracks and cam, we will refer now to Figure 52 wherein a longitudinal cross-section of one of the radial platforms has been shown. Figure 52 is taken in substantially the same direction as Figure 54, so far as this platform is concerned, except that Figure 52 is taken at the cover feed position of Figure 51, whereas Figure 54 is taken at the match feed position of Figure 51.

In Figure 52, we have shown one portion of the cam 536 and immediately above it the roller bearing 524 and above the latter the hub 523. The platform about to be described consists of a portion 538 rigidly secured to the hub 523 and attached at its outer end to the ring 526, the latter resting upon the roller bearings 525. In addition to this fixed portion of the platform, there is mounted beneath the latter and extending around the sides thereof a vertically reciprocable portion from which the rollers 534 and 535 depend. This portion is designated in Figure 52 by the reference numeral 539 and is normally pressed downwardly to keep the rollers upon the respective tracks by means of compression springs 540 extending upwardly into recesses provided in the under-side of the fixed portion 538.

Superposed upon the top of the platform is a bar 541 whose function will be hereinafter described and which is raised and lowered by means of the track 530. The bar 541 is fixed to a vertical rod 542 extending downwardly through the fixed portion 538 and carrying at its lower end the roller 531. The rod 542 is constantly urged downwardly by means of the compression spring 543 mounted within the portion 538. The rod 541 is guided in its reciprocal movement by means of the pin 544 carried by the portion 538.

In Figure 59, it will be seen that the movable portion 539 which carries the roller 535 spreads sideways at its upper end to sandwich the fixed portion 538 spread sideways to form the two parallel upstanding portions 545 and 546. Carried by each of these latter portions is a plate 547 with an upwardly extending key-shaped projection 548. Each of the portions 545—546 also carries a vertical bearing 549 adapted to receive a pivot pin 550 whose function will be presently described.

On each side of the fixed portion 538 is a plate which serves a particular function in connection with the enclosure of the splinted lengths. Thus, at the left of Figure 59, we have shown the plate 551 having the flange 552 extending toward the right and beveled on its under-surface. In Figure 59, the plate 551 is shown in its normal position with its upper surface flush with the upper surface of the fixed portion 538 of the platform. At its outer edge, the plate 551 carries the upstanding and inwardly turned guide flange 553.

Similarly, on the opposite side of the fixed portion 538 we have shown the plate 554 similarly provided with a flange 555 extending toward the left and somewhat thicker than the flange 552. The under-surface of the flange 555 is also beveled as shown in Figure 59. In Figure 59, the plate 554 is shown in its normal position with its upper surface flush with the upper surface of the fixed portion 538. An upstanding guide flange 556 is carried by the upper surface of the plate 554.

Before describing the mechanism which moves the plates 551 and 554, we will point out that at the cover feed position, a rectangular cover blank 557 is fed onto the platform as shown in Figure 55, and is of such a size as to extend transversely from the upstanding flange 556 all the way across the flange 555, the fixed portion 538, the flange 552, and the plate 551. The flanges 553 and 556 guide the cover blank 557 during its application into this position.

Ultimately, and in a manner hereinafter to be described, the plates 551 and 554 rise upwardly into the dotted positions of Figure 59, this being accomplished by the upward movement of the portion 539 riding upon the tracks 532 and 533. Thereafter, the plates 551 and 554 are moved inwardly into the position of Figure 63.

The upward movement of the roller 535 transmits this movement to the plates 551 and 554 through the key-shaped projection 548 previously referred to, the latter being positioned within a guide slot 558 provided in the side of a block 559 carried beneath each of the plates 551 and 554. As a matter of fact, there are two blocks 559 carried by each of the plates 551 and 554, as shown most clearly in Figure 54.

The inward and outward movement of the plates 551 and 554 is accomplished by means of the cam 536 and the following mechanism.

Referring to Figures 56 and 59, it will be seen that a pivot pin 560 extends downwardly from the plate 51. A link 561 is fastened at one end to the pin 560 and at the other end to the pivot pin 550 previously referred to. The pivot pin 550 is journaled within the bearing 549, which it will be recalled is fixedly carried by each of the portions 545–546. At its lower end the pivot pin 550 is fixed to one end of a bell-crank 562, the opposite end of which is articulated to a link 563. The other end of the link 563 carries a cam follower 564 and is articulated to a link 565 whose opposite end is pivoted as at 566 to the portion 545.

Coupled with the mechanism above described is a second pivot pin 567 carried by the plate 551 at a longitudinally spaced point. A link 568 is fastened at one end to the pin 567 and at the other end to a pivot pin 569 journaled in a bearing (similar to the pin 550) carried by the portion 545. The lower end of the pin 569 is attached to a link 570 whose free end is pivoted as at 571 to a connecting rod 572 which extends into pivoted relationship at 573 with the midportion of the bell-crank 562.

Upon reference to Figure 56, it will be seen that as the platform rotates in a clockwise direction, the cam follower 564 will be caused presently to move to swing the link 565 in a counter-clockwise direction. This will cause the bell-crank 562 to pivot in a counter-clockwise direction about the axis of the pivot pin 550, and this will cause the links 561 and 568 simultaneously to move in a counter-clockwise direction about the axes of the pins 550 and 569 respectively, thereby causing the plate 551 to move inwardly (which would be upwardly as viewed in Figure 56.)

A similar arrangement is provided underneath and in connection with the plate 554, but a detailed description will not be given because the construction is identical and symmetrical with respect to the one above described. We will point out, however, that this second and symmetrical arrangement includes the cam follower 574 which corresponds to the follower 564 and is acted upon by the cam 536 in a similar manner. Furthermore, upon reference to Figure 59, it will be seen that a tension spring 575 extends between the pivot points of the followers 564 and 574, thereby serving to draw these followers together, to hold them against the edge of the cam 536, and to urge the plates 551 and 554 normally into the outward position illustrated in Figure 59.

Referring to Figures 47 and 50, we will point out that the surface of the cam 546 has the following configuration. The smallest radius exists at the point A—A of Figure 47 and continues uniformly to a point midway between the match feed position and the stapling position, at which point a bump 576 causes the radius suddenly to increase. This increased radius is mantained through approximately 90° until a point is reached midway between the stapling position and the discharge position. Here a reverse bump 577 reduces the radius halfway back to the lowest extent, and this semi-maximum radius is maintained to a point substantially midway between the discharge positon and the cover feed positon, where a second reverse bump 578 brings the radius back to the minimum amount at the position A—A.

With respect to the track 533 (and also the track 532), this track is at a low level from the cover feed position to the match feed position, and at a high level from the match feed position through the stapling position and the discharge position back to the cover feed position. The roller 534 on the track 533 is not gradually raised or lowered, however, but is brought suddenly up to the higher level at the match feed position by means of a plunger 579 adapted to be moved from the lower level to the higher level at predetermined times. Similarly, at the cover feed position, a similar plunger 580 serves to lower the roller 534 almost instantaneously to the low portion of the track at predetermined times. Thus, in Figure 54, the plunger 579 is shown resting beneath the roller 534 and in its low position. The track 532 has not been shown developed, but is similarly provided with a plunger 581 corresponding to the plunger 579 and shown in Figure 4 resting beneath the roller 535.

The plungers 579 and 581 are actuated at predetermined times by cams 582 and 583 respectively, these cams pushing upwardly upon cam followers 584 and 585, the latter being mounted on the lower ends of the push-rods 586 and 587 respectively. A spring 588 normally urges the push-rod 586 downwardly to hold the plunger 579 in its lowest position; and a spring 589 serves to urge the push-rod 587 normally downwardly to hold the plunger 581 in its lowest position.

Referring to Figure 47, it will be noted that we have indicated the cams 583 and 582 in the match feed position. A similar set of cams 590 and 591 are arranged at the cover feed position but are not illustrated except in Figure 47. The cam 590 accomplishes the rising and lowering of the plunger 580 at predetermined times; and the cam 591 accomplishes the rising and lowering of the plunger corresponding to the plunger 580 and associated with the track 532 at the cover feed position.

In Figure 49, it will be seen that the track 530 is at a high level at the point A—A of Figure 47;

at the match feed position a plunger 592 is provided for lowering the roller 531 at a predetermined time to the lower level of the track 530. This lower level is maintained up to a point substantially midway between the stapling position and the discharge position, at which time the level is gradually raised, and reaches the high level at a point between the discharge position and the cover feed position. The plunger 592 is shown in Figure 54 immediately beneath the roller 531 and in its upward position. It is mounted upon a push-rod 593 terminating at its lower end in a cam follower 594, the latter riding upon a cam 595. A spring 596 normally urges the push-rod 593 downwardly.

The cams 582, 583, and 595 are mounted upon a shaft 597; and the cams 590 and 591 are mounted upon a shaft 598. These shafts are driven from the beveled gear 517 mounted upon the shaft 515. The drive of the two shafts 598 and 597 may be traced through the beveled gears 599 and 600 through the shaft 601, the beveled gears 602, 603, and 604, the shaft 605, the beveled gears 606 and 607, the shaft 608, and the beveled gears 609 and 610.

In order to hold the table accurately stationary at the proper 90° positions, we provide four blocks 611 (see Figure 54) upon the lower surface of the ring 526 and immediately beneath the radial platforms. Each of the blocks 611 is provided with an opening adapted to receive the upper end of a detent plunger 612. The plunger 612 is at the match feed position as shown in Figures 53 and 54 and a spring 613 urges it normally upwardly and it is moved downwardly during the rotative movements of the table, by means of a cam 614 acting upon a cam follower 615.

There are only two plungers of this character provided, the plunger 612 at the match feed position, and a similar plunger 616 at the cover feed position. In Figure 53, the plunger 616 is clearly illustrated. It is urged normally upwardly by the spring 617 and brought downwardly at predetermined times by the cam 618 acting upon the cam follower 619.

The cam 614 is mounted upon the shaft 597, and the cam 618 is mounted upon the shaft 598.

The operation of the rotatable table is as follows: In Figure 55 we have shown a plan view of one of the platforms in the cover feed position. The bar 541 is raised for the reason that the roller 531 is resting upon the raised portion of the track 530. The plates 551 and 554 are in the normal downward and spread position illustrated in full lines in Figure 59; this being due to the fact that the followers 564 and 574 are bearing against the low-radius portion of the cam 536, and that the roller 534 is resting upon the plunger 580, and the roller 535 is resting upon the corresponding plunger on the track 532, these plungers being in their lowest position. With the parts thus arranged, a cover feeding apparatus, designated generally in Figure 51 by the reference numeral 620, advances a cover blank 557 longitudinally onto the platform in the manner shown in Figure 55. The blank 557 extends transversely, as previously described, from the guide flange 556 to a point beneath the guide flange 553, and it is fed onto the platform beneath the bar 541, as shown in Figure 55. During this procedure, the detent pins 612 and 616 are held upwardly in engagement with the corresponding blocks 611 so that the platform is accurately held stationary in the desired position to receive the cover blank 557.

The machine is so timed that when the cover blank 557 is in proper position, the cams 614 and 618 lower the detent pins 612 and 616 to release the table; and the Geneva movement operates to swing the table through 90° to position the platform at the match feed position illustrated in Figure 56. As this position is reached, and as each succeeding position is reached, the detent pins 612 and 616 operate to hold the table against movement.

At the said match feed position, the superposed splinted lengths advance toward the left in Figure 45, and are pushed onto the platform and on top of the cover blank 557. The splinted lengths are also guided beneath the bar 541 and we will now refer more specifically to the shape of this bar as shown in Figure 59. This bar is angular, having a top inclined portion adapted to overlie the splinted sides of the splinted lengths and a vertical edge portion adapted to enclose the tipped ends of the splints.

After the splinted lengths have thus been fed onto the cover blank, the cam 595 operates to lower the plunger 592, thereby bringing the bar 541 firmly down into the position shown in Figure 59. It is to be noted that this low position of the bar 541 firmly holds the splinted lengths down upon the cover blank 557. At the same time, or immediately thereafter, the cams 582 and 583 operate to raise the plungers 579 and 581, thereby suddenly raising the rollers 534 and 535 to the high levels of the tracks 533 and 532 respectively. This raises the plates 551 and 554 to the dotted positions of Figure 59 and the effect of this raising upon the cover blank 557 is to bend the opposite longitudinal edges thereof upwardly, as shown in dotted lines in Figure 59. More specifically, the end which lays adjacent to the guide flange 556 is bent upwardly to form the narrow flap 621; and the edge which lays adjacent to the guide flange 553 is swung upwardly to form the wider or cover flap 622.

The Geneva movement now becomes operative again to rotate the platform toward the stapling position, and during this movement of the platform the flaps 621 and 622 are bent downwardly successively into the positions of Figures 62 and 63. More particularly, it is to be noted that the follower 564 encounters the bump 576 and shifts the plate 551 inwardly. This bends the cover flap 622 downwardly over the top portion of the plate 541, as indicated in Figure 62. As the platform continues to rotate, the follower 574 presently encounters the same bump 576 and shifts the plate 554 inwardly. This bends the flap 621 downwardly as shown in Figure 62. Since the follower 574 encounters the bump 576 after the follower 564, the shifting movements of the plates 551 and 554 are not simultaneous but follow each other. It is this successive shifting of the plates 551 and 554 which positions the larger or cover flap 662 beneath the shorter flap 621 as shown in Figures 62 and 63.

When the stapling position is reached, the stapling machine indicated generally in Figure 51 by the reference numeral 623 becomes operative to force a series of staples 624 through the narrow flap 621 and the unsplinted edge of the splinted lengths. The application of these staples is illustrated in Figure 57, and we will point out at this time that the plate 554 has its flange 555 provided with spaces or recesses 625 adapted to permit passage through them of the staples 624.

During the moving of the platform from the stapling position toward the discharge position, two things occur. The plates 551 and 554 are moved outwardly by a slight degree to the positions shown in Figure 64, this being due to the fact that the followers 564 and 574 successively pass over the bump 577 in the cam 536. At the same time, the bar 541 rises by a slight degree due to the fact that the track 530 has commenced its uphill gradation. The upward movement of the bar 541 obviously carries with it the stapled match book length, drawing the latter slightly off the top surface of the platform, as shown in Figure 64.

When the discharge position is reached, a series of friction rollers 626 become operative on the exposed upper surface of the match book length and frictionally withdraw the latter endwise from the bar 541. This procedure is illustrated most clearly in Figure 58, in which one of the rollers 626 is shown in dot and dash lines. The match book length thus discharged is fed into a cutting instrumentality hereinafter to be described.

During the movement of the platform from the discharge position toward the cover feed position, the plates 551 and 554 open to the maximum extent because of the fact that the followers 564 and 574 pass successively over the bump 578; and at the same time the bar 541 continues to rise until it reaches its raised position, this being due to the fact that the track 530 inclines upwardly until the high level is reached.

Upon again reaching the cover feed position, the plunger 580 and the corresponding plunger on the track 532 are operated simultaneously to suddenly lower the rollers 534 and 535 respectively to the low level of the tracks 533 and 532, at which time the parts are in the original position ready to receive another cover blank.

It will be understood that the proper application of the igniting material to the exterior of the flap 621 may be accomplished, if desired, prior to the feeding of the cover blanks onto the platform, or during any of the foregoing stages. Furthermore, all printing and other markings upon the cover blanks are preferably accomplished before the same are fed onto the platforms.

Referring for the moment to Figure 51, we will point out that the cover blank feeding device 620 may be advantageously operated from the beveled gear 599 by means of a shaft 627 aligned with the shaft 601 and driven by the beveled gear 628. The shaft 627 carries a sprocket wheel 629 driving one portion of the cover feed machine through the chain 630. The shaft 627 may also carry the cam 631 actuating the follower 632 mounted upon a pivoted lever 633, the latter being linked by the rod 634 with the shaft 635 of the feeding machine.

In Figure 51, we wish to point out further that the stapling machine may advantageously be driven from the shaft 522 through the intermediacy of the beveled gears 636 and 637.

Furthermore, so far as the roller or rollers 626 are concerned, these may be driven, if desired, from the shaft 515 by means of the belt or thong 638 operatively connected in a manner not shown with the belt 639 (see Figure 54). Similarly, the roller 626 (or others, where desired) may be raised and lowered into operative position at the desired times by means of the cam 640 mounted on the shaft 515 and reciprocating a push-rod 641 at predetermined times, the push-rod 641 being articulated in a manner not shown with the rod 642 which controls the pivoted position of the roller 626.

*I. The cutting of the match book lengths into match books and the delivery of the latter*

In Figure 65, the cutting machine is viewed in a direction corresponding to that from the right of Figure 58, the match book lengths being delivered to the machine of Figure 65 in the direction approaching the observer.

The mechanism of this machine is supported upon a suitable framework which will not be specifically referred to. A shaft 643 carries a set of circular cutters or knives 644, and is constantly driven from a suitable source of power such as the motor 645 through the intermediacy of the sprocket wheels 646, 647, and the chain 648. Reciprocating back and forth beneath the cutters 644 is a carriage 649 mounted upon the wheels 650 and 651, the latter riding upon a set of tracks 652. The carriage 649 is reciprocated by means of an arm 653 provided at its upper end with a yoke 654 engaging a spindle 655 carried by the carriage 649.

The lower end of the arm 653 is pivoted as at 656, and the arm 653 carries a cam follower 657 actuated by a cam or eccentric 658. The latter is mounted upon a shaft 659 constantly driven at the proper rate of speed by means of the relatively large gear 660 deriving its power from the smaller gear 661 driven by the belt or chain 662 from a suitable driving shaft of the machine. A fly-wheel 663 is preferably mounted upon the shaft of the gear 661. A tension spring 664 serves normally to pull the arm 653 toward the right, as viewed in Figure 65. Pivotally connected to a midportion of the arm 653 is a link 665 whose outer end is pivoted as at 666 to a lever 667. The latter is pivoted to a fixed portion of the frame at 668 and carries a yoke 669 at its upper end, whose function will be presently described.

Before describing the details of the mechanism, we will point out that the match book lengths are fed onto the carriage 649, guided by the latter underneath the knives 644, and the severed match books are ultimately discharged into the chutes 670, from which they fall into discharge conduits 671.

In Figure 66, we have shown the tracks 652 upon an enlarged scale, with all mechanism and framework in front of the carriage 649 omitted for the sake of clearness.

The top of the carriage 649 is formed to provide a platform 672 onto which the match book lengths are successively fed. One such length is designated in Figure 66 by the reference numeral 673. As soon as such length is fed onto the platform 672, and as soon as the platform starts to move toward the left in Figure 66, a set of fingers 674 moves downwardly under the action of a spring or springs (not shown) to hold the match book length firmly upon the platform 672.

The fingers 674 are mounted for oscillation upon a shaft 675 journaled in the carriage 649. At one end of the shaft a collar 676 is mounted provided with a projection 677, and at the opposite end of the shaft a similar collar is mounted and provided with the projection 678. The springs above referred to serve normally to urge the fingers 674 into the dot and dash position at the right of the cutter 644 in Figure 66; but when the carriage is all the way to the right, the projection 677 strikes a pin or abutment 679 and causes the fingers to be raised into the full-line position of Figure 66.

During the passage of the match book length under the knives 644, the fingers 674 hold the material firmly upon the platform 672; but as soon as the extreme left-hand position of the carriage is reached, as shown in dot and dash lines in Figure 66, the projection 678 encounters an abutment 680, similar to the abutment 679, and causes the fingers again to rise, as shown at the left of Figure 66.

The fingers 674 are so positioned as to engage over the midportion of that material which will ultimately form one completed match book. Thus, in Figure 68, it is to be noted that the finger at the left is midway between the first knife 644 and the left wall of the machine; similarly, the second finger from the left is midway between the first and second knives 644.

The platform 672 is provided with suitable grooves 681 to accommodate the lower edges of the cutters or blades 644 as the carriage is swung from right to left and back again. During the passage from right to left, the match book length will be severed by the rapidly rotating knives into a plurality of finished match books, preferably twelve.

Upon referring to Figure 69, we will point out that the left edge of the platform 672 is provided with a series of recesses 682 underlying fingers 674 respectively. The recesses 682 permit the platform 672 to be nested, at its extreme left position, with a fixed platform 683 adapted to receive the cut match books. The platform 683 is provided with the projecting portions 684 adapted to enter the recesses 682.

Mounted upon a suitably journaled spindle 685 are a series of spring-actuated fingers 686, each of which carries a pair of friction rollers 687 at its free end. These rollers are positioned almost exactly over the spaces between the projections 684. Accordingly, when the carriage moves to the left with its group of severed match books thereon, the latter will position themselves upon the projections 684 respectively, and each of the match books will be held firmly by the two rollers 687 on each side thereof. In other words, the fingers 674 hold the match book length during its passage under the knives, and hold the finished match books until they are firmly subjected to the engaging pressure of the friction rollers 687. At that time, the fingers 674 rise into the full-line position of Figure 67 and permit the carriage to be drawn back to the right with the platform 672 empty and ready to receive another match book length.

When the next group of match books is delivered toward the left by the platform 672, it forces the match books momentarily held beneath the rollers 687 toward the left, where they are caused to fall by gravity through individual chutes provided therefor. One of these chutes is shown at 670.

Extending across all of the chutes is a shaft 688 upon which a series of trip fingers 689 are mounted, one finger in each chute. The individual chutes are provided with slots in their walls to permit the rotation of the shaft 688 and with it of the fingers 689. The shaft 688 is constantly driven by means of a belt or the like 690 leading from the shaft 659 and driving a gear or sprocket wheel 691 carried by the shaft 688.

The purpose of each finger 689 is to trip every other match book and thereby to reverse its position, and the shaft 688 is rotated at just that speed which will cause the finger 689 to encounter every other match book delivered into the chute 670. Any match book which does not encounter the finger 689 will fall down into the delivery chute 671 in the inverted position occupied by the match book 692 in Figure 67. Any match book which encounters the finger 689 will be tripped and inverted as indicated by the dotted lines and will fall into the conduit 671 in the position occupied by the match book 693.

The yoke 669 previously referred to engages a pin 694 carried by a plunger 695 which reciprocates into and out of the conduit 671 and pushes the group of cut and staggered match books toward the left. After each movement of the plunger 695 toward the left, a space is provided into which the succeeding match book falls. As a result of this, each delivery conduit 671 contains a stack of completed and staggered match books ready for packing in any desired manner.

J. *The packing of the match books*

In a preferred form of packing the match books, the stack of match books formed in each conduit 671 is automatically divided into groups, each group having a predetermined number, for example, twenty-five. Since the match book length which has passed under the cutting knives consisted of twelve groups of splints, there are twelve chutes 670, and twelve conduits 671, and, accordingly, twelve stacks of match books. It is a particular feature of our invention to feed match books from two adjacent columns or stacks into a common container. In other words, we have shown the manner of packing into one container a group of twenty-five match books from one conduit 671, and also a similar group of twenty-five match books from the adjacent conduit 671. In the form herein illustrated, there is therefore a mechanism for simultaneously filling six containers with the match books delivered by the twelve conduits 671.

In Figure 65, we have shown a shaft 696 upon which a sprocket wheel 697 is mounted. A chain 698 of particular construction extends around this sprocket wheel and around a similar sprocket wheel 699 shown at the left of Figure 70. The sprocket wheel 697, the chain 698, and the sprocket wheel 699 are each of a duplex character but operate in unison. In other words, one portion of the chain 698 is in front of the bank of conduits 671, as the same are viewed in Figure 65, and the other portion of the chain is at the rear.

Extending between the chain portions are the bars 700, these bars being carried by certain spaced links of the chain portions and being arranged in pairs, as shown most clearly in Figure 70. The bars are so spaced that a column or stack of twenty-five match books may be accommodated between each two adjacent bars, as shown in Figure 70.

Carried by the shaft 696 is a ratchet wheel 701 having a plurality of relatively small teeth which, in the illustrated form, are twenty-nine in number. This ratchet wheel is actuated by a pawl 702 carried by an arm 703 which pivots around the shaft 696. Similarly carried by the shaft 696 is a ratchet wheel 704 which, in the illustrated form, has one tooth, this tooth being actuated by a pawl 705 of relatively large size and sweep, the pawl 705 being carried by an arm 706 similarly pivotable around the shaft 696 and preferably formed integrally with the arm 703. A link 707 associated with the link 665 controls the oscillation of the arms 703 and 706.

The parts are so proportioned that the pawl 702 will in each revolution advance the chain 698 twenty-five separate times, at the end of which time the pawl 705 will engage with the ratchet wheel 704 to advance the chain in a single movement through a distance equivalent to the advance of four movements of the smaller pawl 702.

Referring now for the moment to Figure 67, we will point out that the plunger 695 is so shaped as to accommodate the passage of the bars 700. At the end of the plunger 695, we provide a pivoted finger 708 normally urged into the full-line position of Figure 67 by means of a spring. The operation of the plunger 695 results in the formation of a stack or group of twenty-five books in each conduit 671. After such group has been formed, one of the bars 700 engages the rear match book of the group and holds such group between such bar and the bar immediately preceding. These groups of stacked match books are designated by the reference numeral 709 in Figure 70. The yieldable pivotal mounting of the finger 708 permits the same to be swung into the dotted position of Figure 67 when the bar 700 passes underneath the plunger 695 and engages the rear end of the group of match books just formed.

The next match book falling down into the conduit 671 falls behind the next succeeding bar 700 for the reason that the large pawl 705 has in the interim advanced the chain a sufficient distance to position such bar in advance of such succeeding match book.

The match book group 709 of Figure 70 is guided along a table 710, being advanced by the bars 700. At the left of Figure 70, we have shown an apparatus provided with six plungers 711 normally held upwardly but forced downwardly at predetermined times to force two adjacent groups 709 into a common container.

The table 710 ends at the right side of the mechanism of Figure 70, and the adjacent groups of match books are supported upon yieldable lateral fingers or shelves 712 as they pass beneath the plungers 711.

Beneath each plunger we provide depending ribs 713 adapted to receive containers 714, these containers being frictionally held in suspension by the ribs 713, and being applied by hand by operators standing at the left of the mechanism of Figure 70.

As soon as two groups of match books have been positioned beneath each plunger 711, the latter becomes operative to move downwardly and force these two groups into the container 714 beneath them. To permit this to be accomplished, the shelves 712 are held in the full-line positions of Figure 71 by means of springs, and are yieldable into the dotted positions as the plunger descends. Furthermore, the plunger descends to such an extent as to force the container 714 downwardly off the ribs 713 and onto a constantly moving conveyor belt 715 which carries the filled boxes laterally away.

Obviously, if it is desired to feed the match books into the containers in the horizontal condition instead of the vertical condition illustrated, mechanism may be provided for shifting each column or stack of match books through 90° prior to the actual packing operation.

The containers containing the two parallel rows or groups of match books may then be covered by hand and wrapped, transported, or treated in any other desired manner.

Having thus described our invention and illustrated its use, what we claim as new and desire to secure by Letters Patent is:—

1. A machine for manufacturing match books comprising means for feeding a strip of cardboard stock, means for forming spaced groups of splints on the opposite longitudinal edges of said strip, means for severing said strip longitudinally into two splinted strips, means for severing each splinted strip into a series of splinted lengths, means for feeding said splinted lengths in pairs on to cover blanks, means for associating a cover blank with a pair of splinted lengths to form a match book length, and means for severing said match book length into a plurality of match books.

2. A machine for manufacturing match books comprising means for feeding a strip of cardboard stock, means for forming spaced groups of splints on the opposite longitudinal edges of said strip, means for severing said strip longitudinally into two splinted strips, means for severing each splinted strip into a series of splinted lengths, means for feeding said splinted lengths in pairs on to cover blanks, means for associating each cover blank with a pair of splinted lengths to form a match book length, means for severing said match book length into a plurality of match books, and means for feeding the match books so formed into a plurality of paths.

3. A machine for manufacturing match books comprising means for feeding a strip of cardboard stock, means for forming spaced groups of splints on the opposite longitudinal edges of said strip, means for severing said strip longitudinally into two splinted strips, means for severing each splinted strip into a series of splinted lengths, means for feeding said splinted lengths in pairs on to cover blanks, means for associating each cover blank with a pair of splinted lengths to form a match book length, means for severing said match book length into a plurality of match books, and means for feeding the match books so formed into a plurality of paths corresponding in number to the number of match books formed from each match book length.

4. A machine for manufacturing match books comprising means for feeding a strip of cardboard stock, means for forming spaced groups of splints on the opposite longitudinal edges of said strip, means for severing said strip longitudinally into two splinted strips, means for severing each splinted strip into a series of splinted lengths, means for feeding said splinted lengths in pairs on to cover blanks, means for associating each cover blank with a pair of splinted lengths to form a match book length, means for severing said match book length into a plurality of match books, means for feeding the match books so formed into a plurality of paths corresponding in number to the number of match books formed from each match book length, and means for separating the match books fed to each path into a plurality of groups.

5. A machine for manufacturing match books comprising means for feeding a strip of cardboard stock, means for forming spaced groups of splints on the opposite longitudinal edges of said strip, means for severing said strip longitudinally into two splinted strips, means for severing each splinted strip into a series of splinted lengths, means for feeding said splinted lengths in pairs on to cover blanks, means for associating each cover blank with a pair of splinted lengths to form a match book length, means for severing said match book length into a plurality of match books, means for feeding the match books so formed into a plurality of paths corresponding in number to the number of match books formed from each match book length, means for separating the match books fed to each path into a plurality of groups, and means for assembling groups fed along adjacent paths for book packaging purposes.

6. A machine for manufacturing match books comprising means for feeding a strip of cardboard stock, means for forming spaced groups of splints on the opposite longitudinal edges of said strip, means for severing said strip longitudinally into two splinted strips, means for severing each splinted strip into a series of splinted lengths, means for feeding said splinted lengths in pairs on to cover blanks, means for associating each cover blank with a pair of splinted lengths to form a match book length, means for severing said match book length into a plurality of match books, means for feeding the match books so formed into a plurality of paths corresponding in number to the number of match books formed from each match book length, means for separating the match books fed to each path into a plurality of groups, and means for assembling groups fed along adjacent paths for book packaging purposes, and means for feeding two laterally related groups into a container.

7. A machine for manufacturing match books comprising means for feeding a strip of cardboard stock, means for forming spaced groups of splints on a longitudinal edge of said strip, means for severing said strip into series of splinted lengths, means for feeding said splinted lengths into cover blanks to form a match book length, means for severing said match book lengths into a plurality of match books, and means for feeding the match books formed into a plurality of paths.

8. A machine for manufacturing match books comprising means for feeding a strip of cardboard stock, means for forming spaced groups of splints on a longitudinal edge of said strip, means for severing said strip into series of splinted lengths, means for feeding said splinted lengths into cover blanks to form a match book length and means for severing said match book lengths into a plurality of match books, and means for feeding the match books formed into a plurality of paths corresponding in number to the number of match books formed from each match book length.

9. A machine for manufacturing match books comprising means for feeding a strip of cardboard stock, means for forming spaced groups of splints on a longitudinal edge of said strip, means for severing said strip into series of splinted lengths, means for feeding said splinted lengths into cover blanks to form a match book length, means for severing said match book lengths into a plurality of match books, means for feeding the match books formed into a plurality of paths to form columns of match books, and means for separating each column into groups.

10. A machine for manufacturing match books comprising means for feeding a strip of cardboard stock, means for forming spaced groups of splints on a longitudinal edge of said strip, means for severing said strip into series of splinted lengths, means for feeding said splinted lengths into cover blanks to form a match book length, means for severing said match book lengths into a plurality of match books, means for feeding the match books formed into a plurality of paths to form columns of match books, means for separating each column into groups, and means for feeding a group from each of two columns into a container.

11. A machine for manufacturing match books comprising means for feeding a strip of cardboard stock, means for forming spaced groups of splints on a longitudinal edge of said strip, means for severing said strip into series of splinted lengths, means for feeding said splinted lengths into cover blanks to form a match book length and means for severing said match book lengths into a plurality of match books, means for feeding the match books formed into a plurality of paths corresponding in number to the number of match books formed from each match book length, and means for advancing a group of match books from each of two adjacent paths for match book packaging purposes.

12. A machine for manufacturing match books, comprising means for feeding and treating sheet material to convert said material into a match book length, means for severing said length into a plurality of match books, means for feeding the corresponding match books from successive match book lengths into separate paths of feed so as to provide a plurality of columns of match books, means for feeding match books from two adjacent columns respectively into a common container.

13. A machine for manufacturing match books, comprising means for feeding and treating sheet material to convert said material into a match book length, means for severing said length into a plurality of match books, means for feeding the corresponding match books from successive match book lengths into separate paths of feed so as to provide a plurality of columns of match books, means for separating each column into groups, and means for feeding groups from two adjacent columns respectively into a common container.

14. A match making machine comprising means for feeding a strip of cardboard stock, means for feeding wrappers, means for converting cardboard stock into splinted lengths, means for associating the splinted lengths with wrappers to form book lengths, means for severing the book lengths into match books and means for feeding each match book of a book length along a separate path to form as many columns as there are match books formed from each length, and means for packaging a container from a group of two adjacent columns.

15. A match making machine comprising means for feeding a strip of cardboard stock, means for feeding wrappers, means for converting cardboard stock into splinted lengths, means for associating the splinted lengths with wrappers to form book lengths, means for severing the book lengths into match books and means for feeding each match book of a book length along a separate path to form as many columns as there are match books formed from each length with the alternate books in each column in reversed position and means for packaging a container from a group of two adjacent columns.

16. A match making machine comprising means for feeding a strip of cardboard stock, means for feeding wrappers, means for converting cardboard stock into splinted lengths, means for associating the splinted lengths with wrappers to form book lengths, means for severing the book lengths into match books and means for feeding each match book of a book length along a separate path to form as many columns as there are match books formed from each length with the alternate books in each column in reversed position, means for packaging a container from a group of two adjacent columns, and means for separating each column into groups.

17. A match making machine comprising means for feeding a strip of cardboard stock, means for feeding wrappers, means for converting cardboard stock into splinted lengths, means for associating the splinted lengths with wrappers to form book lengths, means for severing the book lengths into match books, means for feeding each match book of a book length along a separate path to form as many columns as there are match books formed from each length with the alternate books in each column in reversed position, means for packaging a container from a group of two adjacent columns, means for separating each column into groups, and means for feeding a group from each of two adjacent columns into a container.

18. A machine for manufacturing match books comprising means for feeding a strip of cardboard stock, means for forming spaced groups of splints on the opposite longitudinal edges of said strip, means for severing said strip longitudinally into two splinted strips, and means for positioning said splinted strips in parallel spaced relation.

19. A machine for manufacturing match books comprising means for feeding a strip of cardboard stock, means for forming spaced groups of splints on the opposite longitudinal edges of said strip, means for severing said strip longitudinally into two splinted strips, means for positioning said splinted strips in parallel spaced relation, and means for severing said strips into splinted lengths.

20. A machine for manufacturing match books comprising means for feeding a strip of cardboard stock, means for forming spaced groups of splints on the opposite longitudinal edges of said strip, means for severing said strip longitudinally into two splinted strips, means for positioning said splinted strips in parallel spaced relation, means for severing said strips into splinted lengths, a pair of dryers, and means for feeding the splinted lengths of one of the strips to one of the dryers and the splinted lengths of the other strip to the other dryer.

21. A machine for manufacturing match books comprising means for feeding a strip of cardboard stock, means for forming spaced groups of splints on the opposite longitudinal edges of said strip, means for severing said strip longitudinally into two splinted strips, means for positioning said splinted strips in parallel spaced relation, means for severing said strips into splinted lengths, a pair of dryers, means for feeding the splinted lengths of one of the strips to one of the dryers, and the splinted lengths of the other strip to the other dryer, and means for assembling each splinted length on one of the dryers with a splinted length on the other dryer.

22. A machine for manufacturing match books comprising means for feeding a strip of cardboard stock, means for forming spaced groups of splints on the opposite longitudinal edges of said strip, and means for severing said strip longitudinally into two splinted strips.

23. A machine for manufacturing match books comprising means for feeding a strip of cardboard stock, means for forming spaced groups of splints on the opposite longitudinal edges of said strip, means for severing said strip longitudinally into two splinted strips and means for severing each splinted strip into a series of splinted lengths.

24. A machine for manufacturing match books comprising means for feeding a strip of cardboard stock, means for forming spaced groups of splints on the opposite longitudinal edges of said strip, means for severing said strip longitudinally into two splinted strips, means for severing each splinted strip into a series of splinted lengths and means for assembling the splinted strips into groups of two.

25. A machine for manufacturing match books comprising means for feeding a strip of cardboard stock, means for forming spaced groups of splints on the opposite longitudinal edges of said strip, means for severing said strip longitudinally into two splinted strips, means for severing each splinted strip into a series of splinted lengths and means for assembling the splinted strips into groups of two in superposed relation.

26. A machine for manufacturing match books comprising means for feeding a plurality of splinted lengths, a pair of dryers, means for feeding the lengths to the dryers and means for assembling each splinted length on one of the dryers with a splinted length on the other dryer.

W. JOHN PRICE.
WILLIAM ANSCOTT.